US 9,275,473 B2

(12) United States Patent
Hori

(10) Patent No.: US 9,275,473 B2
(45) Date of Patent: Mar. 1, 2016

(54) IMAGE PROCESSING APPARATUS, IMAGE PROCESSING METHOD, AND PROGRAM

(71) Applicant: OLYMPUS CORPORATION, Shibuya-ku, Tokyo (JP)

(72) Inventor: Fumio Hori, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 47 days.

(21) Appl. No.: 14/102,455

(22) Filed: Dec. 10, 2013

(65) Prior Publication Data

US 2014/0098091 A1   Apr. 10, 2014

Related U.S. Application Data

(63) Continuation of application No. PCT/JP2012/065124, filed on Jun. 13, 2012.

(30) Foreign Application Priority Data

Jun. 16, 2011  (JP) .................................. 2011-134341

(51) Int. Cl.
  *G06T 7/60* (2006.01)
  *G06T 19/20* (2011.01)
  (Continued)

(52) U.S. Cl.
  CPC ................. *G06T 7/602* (2013.01); *G06T 17/00* (2013.01); *G06T 17/20* (2013.01); *G06T 19/00* (2013.01); *G06T 19/20* (2013.01); *G06T 2207/10068* (2013.01); *G06T 2207/20101* (2013.01); *G06T 2207/30164* (2013.01)

(58) Field of Classification Search
  None
  See application file for complete search history.

(56) References Cited

U.S. PATENT DOCUMENTS 4,989,083 A    1/1991   Eino
5,153,721 A    10/1992  Eino et al.
(Continued)

FOREIGN PATENT DOCUMENTS

JP    03-102202 A    4/1991
JP    04-218708 A    8/1992
(Continued)

OTHER PUBLICATIONS

Extended European Search Report dated Nov. 12, 2014 issued in counterpart European Application No. 12800391.0.
(Continued)

*Primary Examiner* — Ulka Chauhan
*Assistant Examiner* — Saptarshi Mazumder
(74) *Attorney, Agent, or Firm* — Holtz, Holtz & Volek PC

(57) ABSTRACT

An image processing apparatus includes a display unit that displays an image of a measurement object and an image of an object which corresponds to the measurement object and has a 3-dimensional (3D) shape which is calculated in advance, a designating unit that designates a first point on the image of the measurement object and a second point on the image of the object, a calculating unit that performs a geometric calculation of a first figure, an adjusting unit that adjusts a pose or a position of at least one of the image of the measurement object and the image of the object based on a result of the geometric calculation, and a measuring unit that calculates spatial coordinates on the object corresponding to a measurement position designated after the pose or the position is adjusted, and calculates a size of the object based on the calculated spatial coordinates.

8 Claims, 49 Drawing Sheets

(51) Int. Cl.
*G06T 17/00* (2006.01)
*G06T 19/00* (2011.01)
*G06T 17/20* (2006.01)

(56) References Cited

U.S. PATENT DOCUMENTS

| | | | |
|---|---|---|---|
| 7,581,191 B2* | 8/2009 | Rice et al. | 715/764 |
| 2009/0096790 A1 | 4/2009 | Wiedemann et al. | |
| 2009/0208079 A1* | 8/2009 | Vaillant et al. | 382/131 |
| 2010/0098324 A1* | 4/2010 | Fujieda | 382/154 |
| 2010/0317920 A1* | 12/2010 | Doi et al. | 600/109 |
| 2011/0298800 A1* | 12/2011 | Schlichte et al. | 345/420 |

FOREIGN PATENT DOCUMENTS

| | | |
|---|---|---|
| JP | 08-178636 A | 7/1996 |
| JP | 2003-187223 A | 7/2003 |
| JP | 2005-173336 A | 6/2005 |
| JP | 2009-093611 A | 4/2009 |

OTHER PUBLICATIONS

Ector, et al., "Biplane three-deminsional augmented fluoroscopy as single navigation tool for ablation of atrial fibrillation: Accuracy and clinical value", Heart Rhythm, Elsevier, US; vol. 5, No. 7, Jul. 2008, pp. 957-964.

International Search Report (ISR) dated Aug. 28, 2012 (and English translation thereof) issued in International Application No. PCT/JP2012/065124.

* cited by examiner

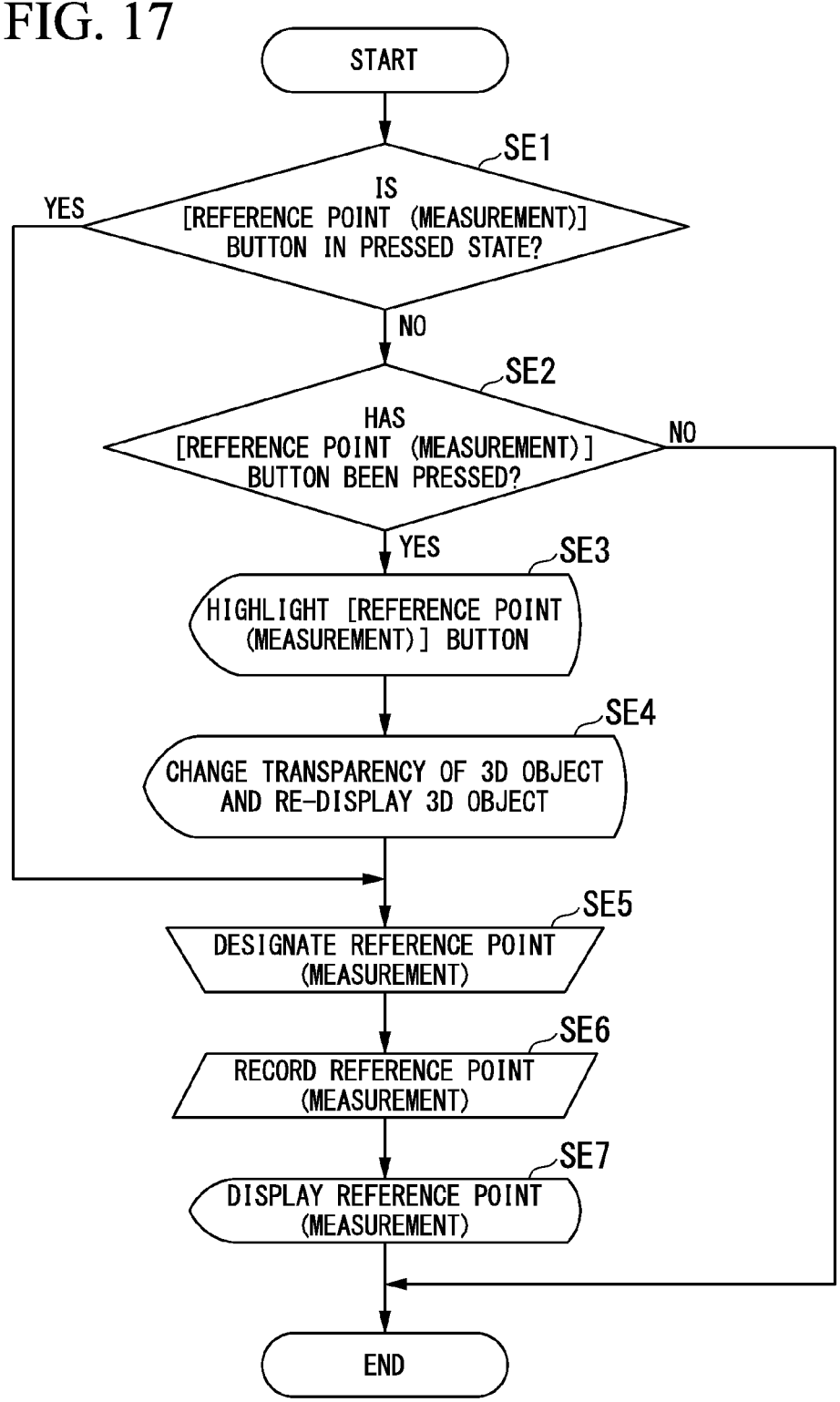

FIG. 25

|  | X | Y | Z |  |
|---|---|---|---|---|
| Pos1 | -9.9 | -8.5 | 347.8 | mm |
| Pos2 | 6.1 | 5.6 | 314.7 | mm |

Distance  39.3  mm

COORDINATES OF MEASUREMENT POINT

DISTANCE BETWEEN TWO POINTS

| ROTATIONAL ANGLE | |
|---|---|
| PAN | TILT |
| −30 | −30 |
| −30 | −29 |
| −30 | −28 |
| −30 | −27 |

← ADD ROW BY ROW

FIG. 33B

| ROTATIONAL ANGLE | | VERTEX ANGLE (3D) | | |
|---|---|---|---|---|
| PAN | TILT | A1 | A2 | A3 |
| −30 | −30 | 55.9 | 83.9 | 40.2 |
| −30 | −29 | 55.1 | 84.3 | 40.6 |
| −30 | −28 | 54.4 | 84.8 | 40.8 |
| −30 | −27 | 54.0 | 85.2 | 40.8 |

← ADD ROW-BY-ROW IN ASSOCIATION WITH ROTATIONAL ANGLE

FIG. 33C

| ROTATIONAL ANGLE | | VERTEX ANGLE (3D) | | |
|---|---|---|---|---|
| PAN | TILT | A1 | A2 | A3 |
| −30 | −30 | 55.9 | 83.9 | 40.2 |
| −30 | −29 | 55.1 | 84.3 | 40.6 |
| −30 | −28 | 54.4 | 84.8 | 40.8 |
| −30 | −27 | 54.0 | 85.2 | 40.8 |
| −30 | −26 | 53.6 | 85.7 | 40.7 |
| −30 | −25 | 53.1 | 86.0 | 40.9 |
| ⋮ | ⋮ | ⋮ | ⋮ | ⋮ |
| 30 | 28 | 40.0 | 110.3 | 29.7 |
| 30 | 29 | 39.8 | 111.4 | 28.8 |
| 30 | 30 | 39.7 | 111.8 | 28.5 |

61 × 61 ROWS

| ROTATIONAL ANGLE | | VERTEX ANGLE (3D) | | | DIFFERENCE OF VERTEX ANGLE | | |
|---|---|---|---|---|---|---|---|
| PAN | TILT | A1 | A2 | A3 | D1 | D2 | D3 |
| -30 | -30 | 55.9 | 83.9 | 40.2 | 14.1 | 2.1 | 16.2 |
| -30 | -29 | 55.1 | 84.3 | 40.6 | 14.9 | 1.7 | 16.6 |
| -30 | -28 | 54.4 | 84.8 | 40.8 | 15.6 | 1.2 | 16.8 |
| -30 | -27 | 54.0 | 85.2 | 40.8 | 16.0 | 0.8 | 16.8 |
| -30 | -26 | 53.6 | 85.7 | 40.7 | 16.4 | 0.3 | 16.7 |
| -30 | -25 | 53.1 | 86.0 | 40.9 | 16.9 | 0.0 | 16.9 |
| ⋮ | ⋮ | ⋮ | ⋮ | ⋮ | ⋮ | ⋮ | ⋮ |
| 30 | 28 | 40.0 | 110.3 | 29.7 | 30.0 | 24.3 | 5.7 |
| 30 | 29 | 39.8 | 111.4 | 28.8 | 30.2 | 25.4 | 4.8 |
| 30 | 30 | 39.7 | 111.8 | 28.5 | 30.3 | 25.8 | 4.5 |

ADD DIFFERENCE OF VERTEX ANGLE

| ROTATIONAL ANGLE | | VERTEX ANGLE (3D) | | | DIFFERENCE OF VERTEX ANGLE | | | AVERAGE VALUE |
|---|---|---|---|---|---|---|---|---|
| PAN | TILT | A1 | A2 | A3 | D1 | D2 | D3 | |
| -30 | -30 | 55.9 | 83.9 | 40.2 | 14.1 | 2.1 | 16.2 | 10.8 |
| -30 | -29 | 55.1 | 84.3 | 40.6 | 14.9 | 1.7 | 16.6 | 11.1 |
| -30 | -28 | 54.4 | 84.8 | 40.8 | 15.6 | 1.2 | 16.8 | 11.2 |
| -30 | -27 | 54.0 | 85.2 | 40.8 | 16.0 | 0.8 | 16.8 | 11.2 |
| -30 | -26 | 53.6 | 85.7 | 40.7 | 16.4 | 0.3 | 16.7 | 11.1 |
| -30 | -25 | 53.1 | 86.0 | 40.9 | 16.9 | 0.0 | 16.9 | 11.3 |
| ⋮ | ⋮ | ⋮ | ⋮ | ⋮ | ⋮ | ⋮ | ⋮ | ⋮ |
| 30 | 28 | 40.0 | 110.3 | 29.7 | 30.0 | 24.3 | 5.7 | 20.0 |
| 30 | 29 | 39.8 | 111.4 | 28.8 | 30.2 | 25.4 | 4.8 | 20.1 |
| 30 | 30 | 39.7 | 111.8 | 28.5 | 30.3 | 25.8 | 4.5 | 20.2 |

ADD AVERAGE VALUE

FIG. 35

| ROTATIONAL ANGLE | | | VERTEX ANGLE (3D) | | | DIFFERENCE OF VERTEX ANGLE | | | AVERAGE VALUE |
|---|---|---|---|---|---|---|---|---|---|
| PAN | TILT | | A1 | A2 | A3 | D1 | D2 | D3 | |
| −30 | −30 | | 55.9 | 83.9 | 40.2 | 14.1 | 2.1 | 16.2 | 10.8 |
| −30 | −29 | | 55.1 | 84.3 | 40.6 | 14.9 | 1.7 | 16.6 | 11.1 |
| −30 | −28 | | 54.4 | 84.8 | 40.8 | 15.6 | 1.2 | 16.8 | 11.2 |
| −30 | −27 | | 54.0 | 85.2 | 40.8 | 16.0 | 0.8 | 16.8 | 11.2 |
| −30 | −26 | | 53.6 | 85.7 | 40.7 | 16.4 | 0.3 | 16.7 | 11.1 |
| −30 | −25 | | 53.1 | 86.0 | 40.9 | 16.9 | 0.0 | 16.9 | 11.3 |
| ... | ... | | ... | ... | ... | ... | ... | ... | ... |
| −5 | 15 | | 70.2 | 85.3 | 24.5 | 0.2 | 0.7 | 0.5 | 0.5 |
| ... | ... | | ... | ... | ... | ... | ... | ... | ... |
| 30 | 28 | | 40.0 | 110.3 | 29.7 | 30.0 | 24.3 | 5.7 | 20.0 |
| 30 | 29 | | 39.8 | 111.4 | 28.8 | 30.2 | 25.4 | 4.8 | 20.1 |
| 30 | 30 | | 39.7 | 111.8 | 28.5 | 30.3 | 25.8 | 4.5 | 20.2 |

ASSOCIATED ROTATION ANGLE

SEARCH FOR MINIMUM VALUE

ROTATE IN ROLL DIRECTION

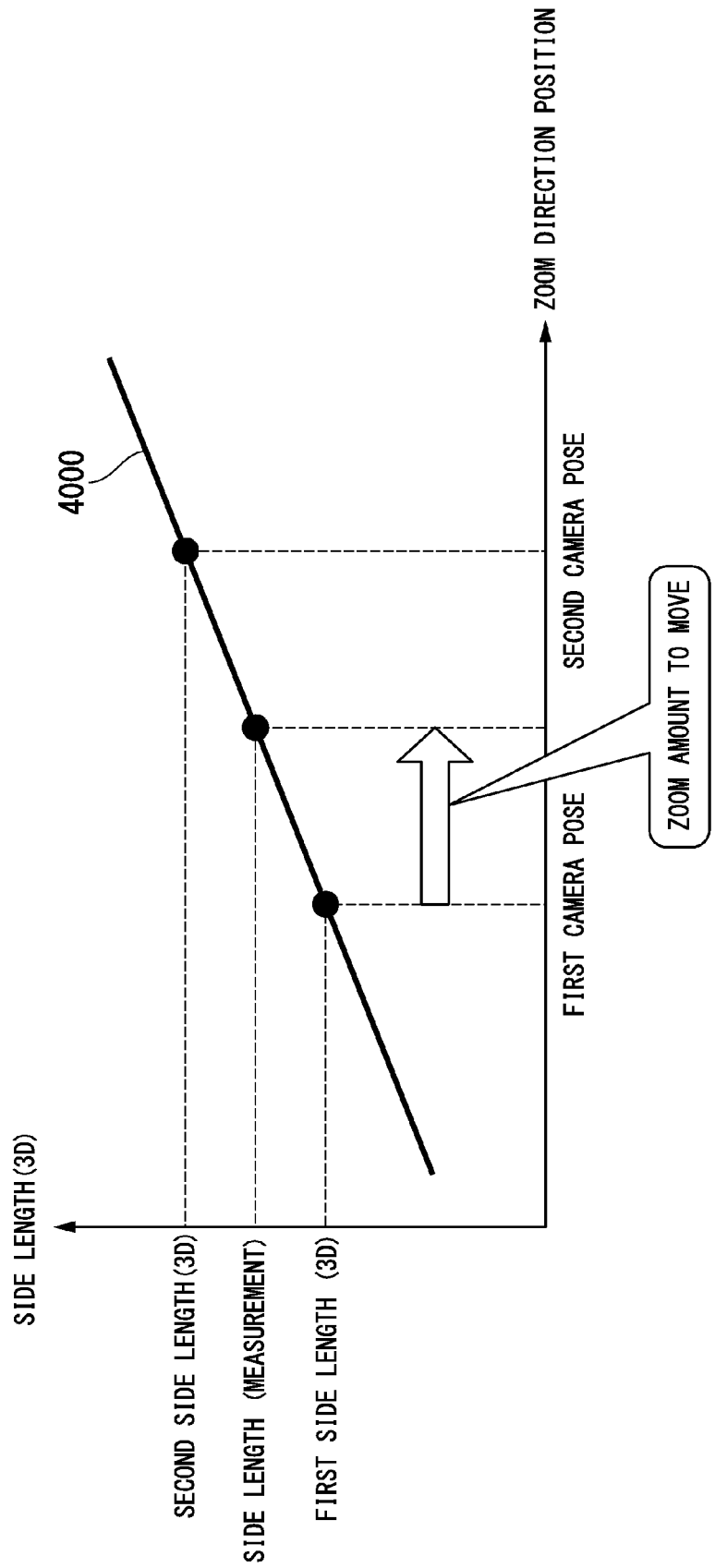

MOVE IN SHIFT DIRECTION

CENTER OF GRAVITY POINTS APPROXIMATELY MATCH

IMAGE PROCESSING APPARATUS, IMAGE PROCESSING METHOD, AND PROGRAM

This application is a continuation application based on a PCT Patent Application No. PCT/JP2012/065124, filed on Jun. 13, 2012, whose priority is claimed on Japanese Patent Application No. 2011-134341, filed on Jun. 16, 2011. The contents of both the PCT Application and the Japanese Application are incorporated herein by reference.

BACKGROUND OF THE INVENTION

1. Field of the Invention

The present invention relates to an image processing apparatus, an image processing method, and a program, which are capable of processing an image of a measurement object to measure the size of the measurement object.

2. Description of Related Art

In the past, measurement of a blade or the like in a jet engine has been performed using an observation tool such as an endoscope. Japanese Unexamined Patent Application, First Publication No. H3-102202A discloses a technique applied to measurement of the blade or the like. In the technique disclosed in Japanese Unexamined Patent Application, First Publication No. H3-102202A, a subject image obtained by imaging a subject and a CG image generated by Computer Graphics are displayed on a monitor. Then, the CG image is changed based on a user's instruction so that a state of an object in the CG image matches a state of a subject in the subject image. Thus, according to the technique disclosed in Japanese Unexamined Patent Application, First Publication No. H3-102202A, it is possible to measure a desired portion of the CG image.

However, in the technique disclosed in Japanese Unexamined Patent Application, First Publication No. H3-102202A, when measurement is performed on each subject image while switching a plurality of subject images which differ in appearance of a subject, an operation of matching the state of the object in the CG image with the state of the subject in the subject image needs to be performed each time a subject image is switched.

Meanwhile, a technique of automatically matching a 2-dimensional (2D) image obtained by imaging a subject with a 3-dimensional (3D) object based on data obtained using a computer-aided design (CAD) is disclosed in U.S. Patent Application, Publication No. 2009/0096790. In the technique disclosed in U.S. Patent Application, Publication No. 2009/0096790, first, when a 3D object is observed from a plurality of virtual points of view, projection diagrams of the 3D object observed at the respective points of view are generated. When the projection diagrams are generated, the plurality of projection diagrams are stored together as a 2D model. Then, matching between the 2D image and the generated 2D model is performed. Then, a projection diagram which is highest in similarity with the 2D model is searched for, and a relative position of a subject shown in the 2D image and a camera that has imaged the 2D image is calculated based on the position of a point of view when the projection diagram is generated.

SUMMARY OF THE INVENTION

According to a first aspect of the present invention, an image processing apparatus includes a display unit that displays an image of a measurement object and an image of an object which corresponds to the measurement object and has a 3-dimensional (3D) shape which is calculated in advance, a designating unit that designates a first point on the image of the measurement object and a second point on the image of the object based on an instruction input through an input device, a calculating unit that performs a geometric calculation of a first figure based on the first point and a second figure based on the second point, an adjusting unit that adjusts a pose or a position of at least one of the image of the measurement object and the image of the object based on a result of the geometric calculation, and a measuring unit that calculates spatial coordinates on the object corresponding to a measurement position designated based on an instruction input through the input device after the pose or the position is adjusted, and calculates a size of the object based on the calculated spatial coordinates.

According to a second aspect of the present invention, in the image processing apparatus according to the first aspect, each of the first point and the second point may include three or more points designated based on the instruction input through the input device.

According to a third aspect of the present invention, the calculating unit included in the image processing apparatus according to the second aspect, may perform the geometric calculation such that the first point is associated with the second point based on an order in which the first point is designated and an order in which the second point is designated.

According to a fourth aspect of the present invention, the calculating unit included in the image processing apparatus according to the first aspect, may perform a geometric calculation of a first figure on a plane based on the first point and a second figure on a space based on a point in a space of the object corresponding to the second point.

According to a fifth aspect of the present invention, the calculating unit included in the image processing apparatus according to the fourth aspect, may perform a geometric calculation of a first figure on the plane and a third figure obtained such that the second figure in the space is projected onto the plane.

According to a sixth aspect of the present invention, the designating unit included in the image processing apparatus according to the first aspect, may further set a transparency of the image of the object when the first point is designated higher than a transparency of the image of the object when the second point is designated.

According to a seventh aspect of the present invention, the display unit included in the image processing apparatus according to the first aspect, may maintain poses and positions of the image of the measurement object and the image of the object until the geometric calculation ends after displaying the image of the measurement object and the image of the object. Then, the display unit may re-display the image of the measurement object and the image of the object whose pose or position has been adjusted after the geometric calculation ends.

According to an eighth aspect of the present invention, an image processing method includes a step of displaying an image of a measurement object and an image of an object which corresponds to the measurement object and has a 3-dimensional (3D) shape which is calculated in advance, a step of designating a first point on the image of the measurement object and a second point on the image of the object based on an instruction input through an input device, a step of performing a geometric calculation of a first figure based on the first point and a second figure based on the second point, a step of adjusting a pose or a position of at least one of the image of the measurement object and the image of the object based on a result of the geometric calculation, and a step of calculating spatial coordinates on the object corresponding to a measurement position designated based on an instruction input through the input device after the pose or the position is adjusted, and calculating a size of the object based on the calculated spatial coordinates.

According to a ninth aspect of the present invention, in the image processing method according to the eighth aspect, each of the first point and the second point may include three or more points designated based on the instruction input through the input device, and the calculating unit may perform the geometric calculation such that the first point is associated with the second point based on an order in which the first point is designated and an order in which the second point is designated.

According to a tenth aspect of the present invention, a computer program product having a program stored there in for causing a computer to function as that a display unit that displays an image of a measurement object and an image of an object which corresponds to the measurement object and has a 3-dimensional (3D) shape which is calculated in advance, a designating unit that designates a first point on the image of the measurement object and a second point on the image of the object based on an instruction input through an input device, a calculating unit that performs a geometric calculation of a first figure based on the first point and a second figure based on the second point, an adjusting unit that adjusts a pose or a position of at least one of the image of the measurement object and the image of the object based on a result of the geometric calculation, and a measuring unit that calculates spatial coordinates on the object corresponding to a measurement position designated based on an instruction input through the input device after the pose or the position is adjusted, and calculates a size of the object based on the calculated spatial coordinates.

BRIEF DESCRIPTION OF THE DRAWINGS

FIG. 17 is a flowchart illustrating a process of an operation performed by the 3D measurement software according to the embodiment of the present invention.

FIG. 25 is a reference diagram for describing the content of the measurement process according to the embodiment of the present invention.

FIG. 33A is a reference diagram illustrating a data list according to the embodiment of the present invention.

FIG. 33B is a reference diagram illustrating the data list according to the embodiment of the present invention.

FIG. 33C is a reference diagram illustrating the data list according to the embodiment of the present invention.

FIG. 35 is a reference diagram illustrating a data list according to the embodiment of the present invention.

FIG. 40 is a graph illustrating a relationship between a side length (3D) and a zoom direction position of a camera pose according to the embodiment of the present invention.

DETAILED DESCRIPTION OF THE INVENTION

Figure 1:
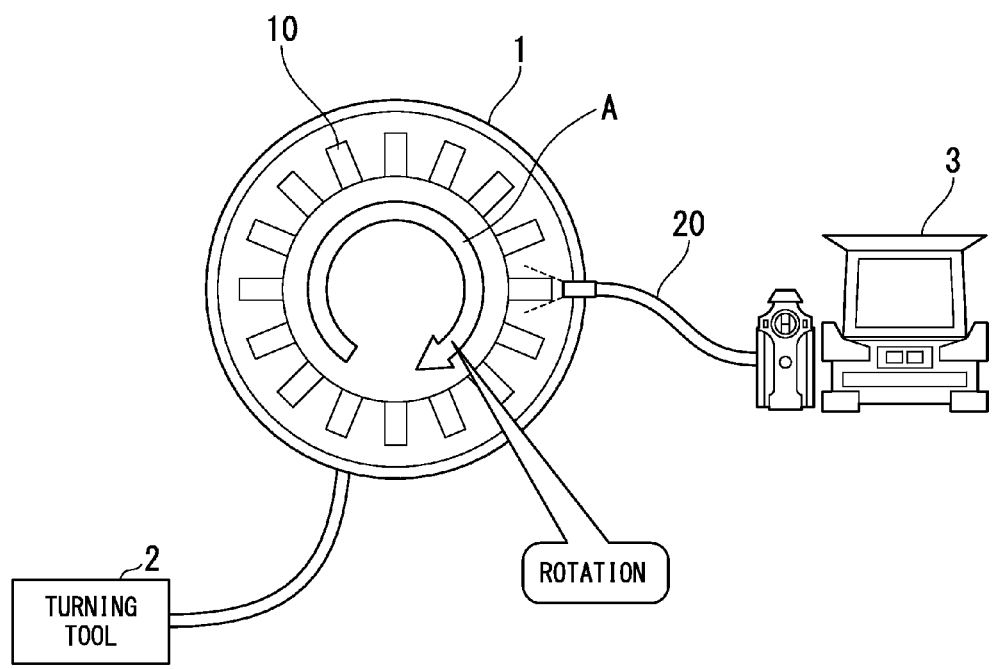
FIG. 1 is a block diagram illustrating a configuration of a blade inspection system according to an embodiment of the present invention.

Hereinafter, exemplary embodiments of the present invention will be described with reference to the accompanying drawings. FIG. 1 illustrates a configuration of a blade inspection system according to an embodiment of the present invention. In a jet engine 1, a plurality of turbine blades 10 (or compressor blades) which are inspection objects, are periodically arranged at predetermined intervals. The jet engine 1 is connected to a turning tool 2 that rotates the turbine blades 10 in a rotational direction A at a predetermined velocity. In the present embodiment, the turbine blades 10 are always in a rotational state while an image of the turbine blades 10 is being acquired.

In the present embodiment, an endoscope apparatus 3 (image processing apparatus) is used to acquire an image of the turbine blades 10. An endoscope-inserting unit 20 of the endoscope apparatus 3 is inserted into the jet engine 1. A video of the turbine blades 10 being rotated is acquired by the endoscope-inserting unit 20. 3D measurement software for performing 3D measurement of the turbine blades 10 is stored in the endoscope apparatus 3.

Figure 2:
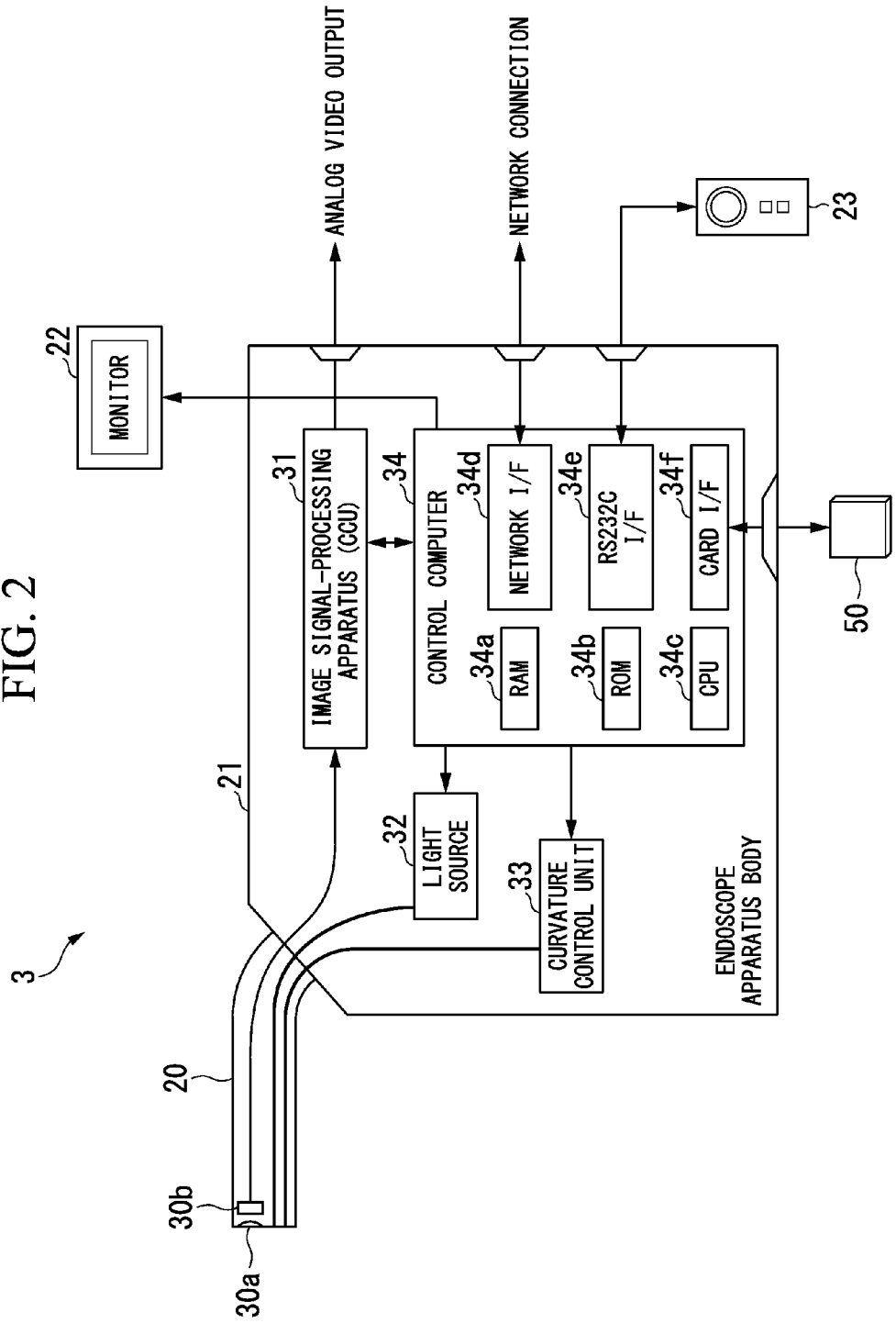
FIG. 2 is a block diagram illustrating a configuration of an endoscope apparatus equipped in the blade inspection system according to the embodiment of the present invention.

FIG. 2 illustrates a configuration of the endoscope apparatus 3. The endoscope apparatus 3 includes the endoscope-inserting unit 20, an endoscope apparatus body 21, a monitor 22, and a remote controller 23. An imaging optical system 30a and an imaging element 30b are equipped in the distal end of the endoscope-inserting unit 20. An image signal-processing apparatus (CCU) 31, a light source 32, a curvature control unit 33, and a control computer 34 are equipped in the endoscope apparatus body 21.

In the endoscope-inserting unit 20, the imaging optical system 30a collects light from a subject (an inspection object), and forms a subject image on an image-forming plane of the imaging element 30b. The imaging element 30b performs photoelectric conversion on the subject image, and generates an imaging signal. The imaging signal output from the imaging element 30b is input to the image signal-processing apparatus 31.

In the endoscope apparatus body 21, the image signal-processing apparatus 31 converts the imaging signal received from the imaging element 30b into a video signal such as an NTSC signal, supplies the video signal to the control computer 34, and outputs the video signal to the outside as an analog video as necessary.

The light source 32 is connected to the distal end of the endoscope-inserting unit 20 through an optical fiber or the like, and can externally radiate light. The curvature control unit 33 is connected to the distal end of the endoscope-inserting unit 20, and can bend the distal end vertically or laterally. The light source 32 and the curvature control unit 33 are controlled by the control computer 34.

The control computer 34 includes a RAM 34a, a ROM 34b, a CPU 34c, and external interfaces such as a network I/F 34d, an RS232C I/F 34e, and a card I/F 34f. The RAM 34a is used to temporarily store data such as image information necessary for a software operation. The ROM 34b stores a series of software (programs) for controlling the endoscope apparatus 3. 3D measurement software which will be described later is stored in the ROM 34b as well. The CPU 34c executes an operation for various kinds of controls using data stored in the RAM 34a according to a command code of software stored in the ROM 34b.

The network I/F 34d is an interface used to connect an external PC with a LAN cable. The network I/F 34d can cause video information output from the image signal-processing apparatus 31 to be developed in an external PC. The RS232C I/F 34e is an interface used for a connection with the remote controller 23. The remote controller 23 can control various kinds of operations of the endoscope apparatus 3 in response to the user's operation. The card I/F 34f is configured so that various kinds of memory cards 50 which are recording media can be removably mounted in the card I/F 34f. As the memory card 50 is mounted, under control of the CPU 34c, it is possible to acquire data such as image information stored in the memory card 50 or record data such as image information in the memory card 50.

Figure 3:
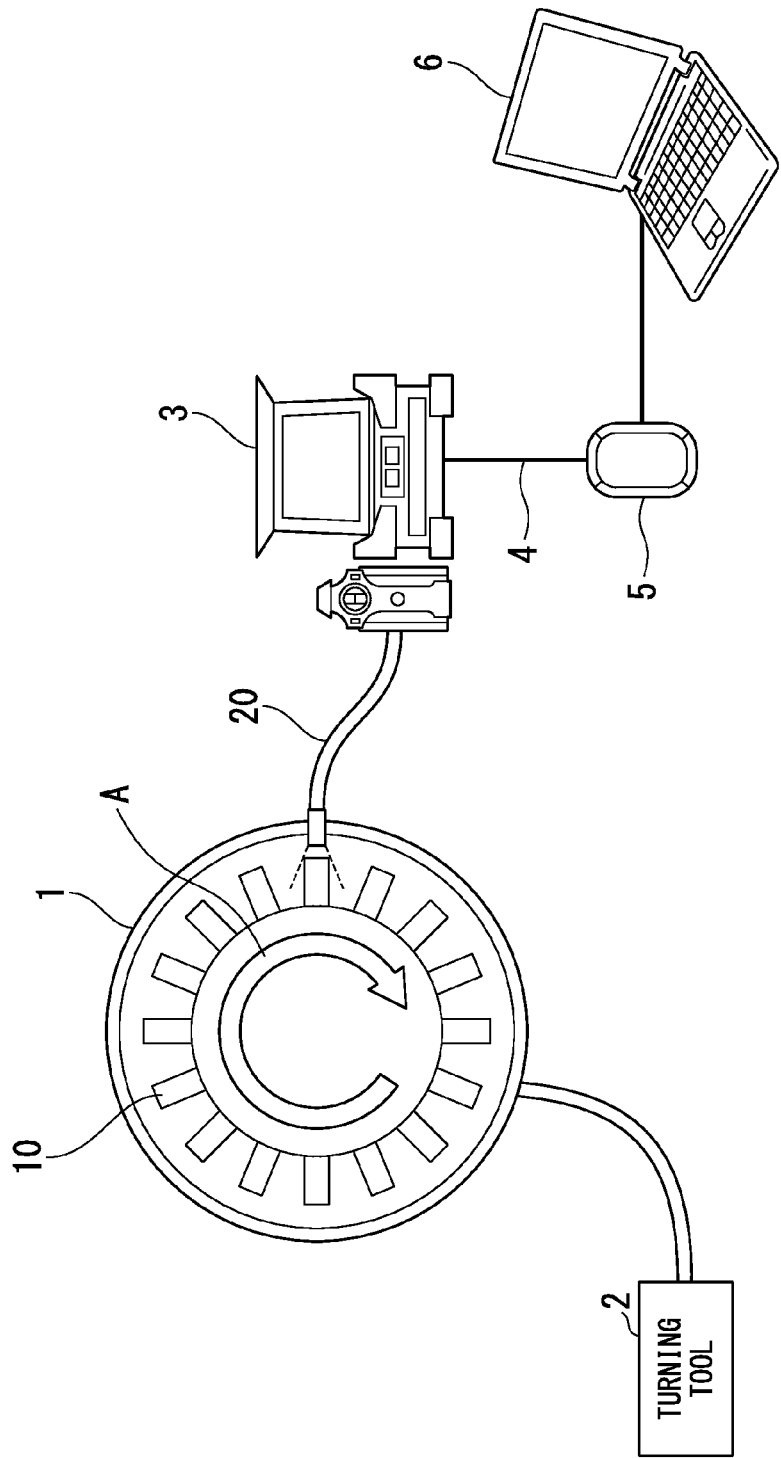
FIG. 3 is a block diagram illustrating a configuration of a blade inspection system (modified example) according to the embodiment of the present invention.

A configuration illustrated in FIG. 3 may be used as a modified example of the configuration of the blade inspection system according to the present embodiment. In the present modified example, a video terminal cable 4 and a video capture card 5 are connected to the endoscope apparatus 3. According to the configuration, a video acquired by the endoscope apparatus 3 is also capable of being acquired by a PC 6 (image processing apparatus). The PC 6 is illustrated as a laptop PC in FIG. 3, but a desktop PC or the like may be used. The PC 6 stores 3D measurement software for performing 3D measurement of the turbine blade 10.

Figure 4:
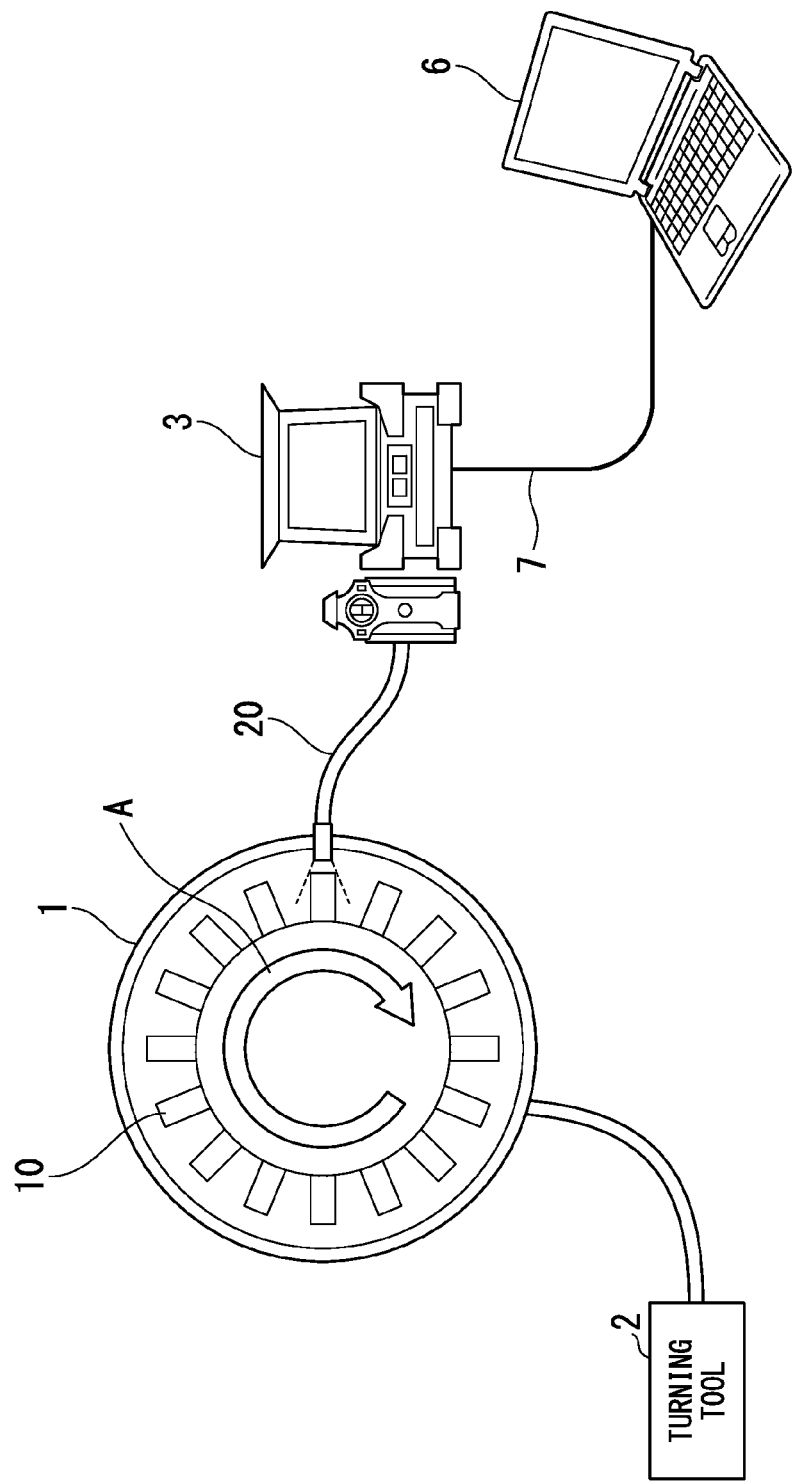
FIG. 4 is a block diagram illustrating a configuration of a blade inspection system (modified example) according to the embodiment of the present invention.

In FIG. 3, a video is transferred to the PC 6 using the video terminal cable 4 and the video capture card 5, but a LAN cable 7 may be used as illustrated in FIG. 4. The endoscope apparatus 3 includes the network I/F 34d capable of developing the acquired video on a LAN network. Further, a video may be transferred to the PC 6 through the LAN cable 7.

Figure 5:
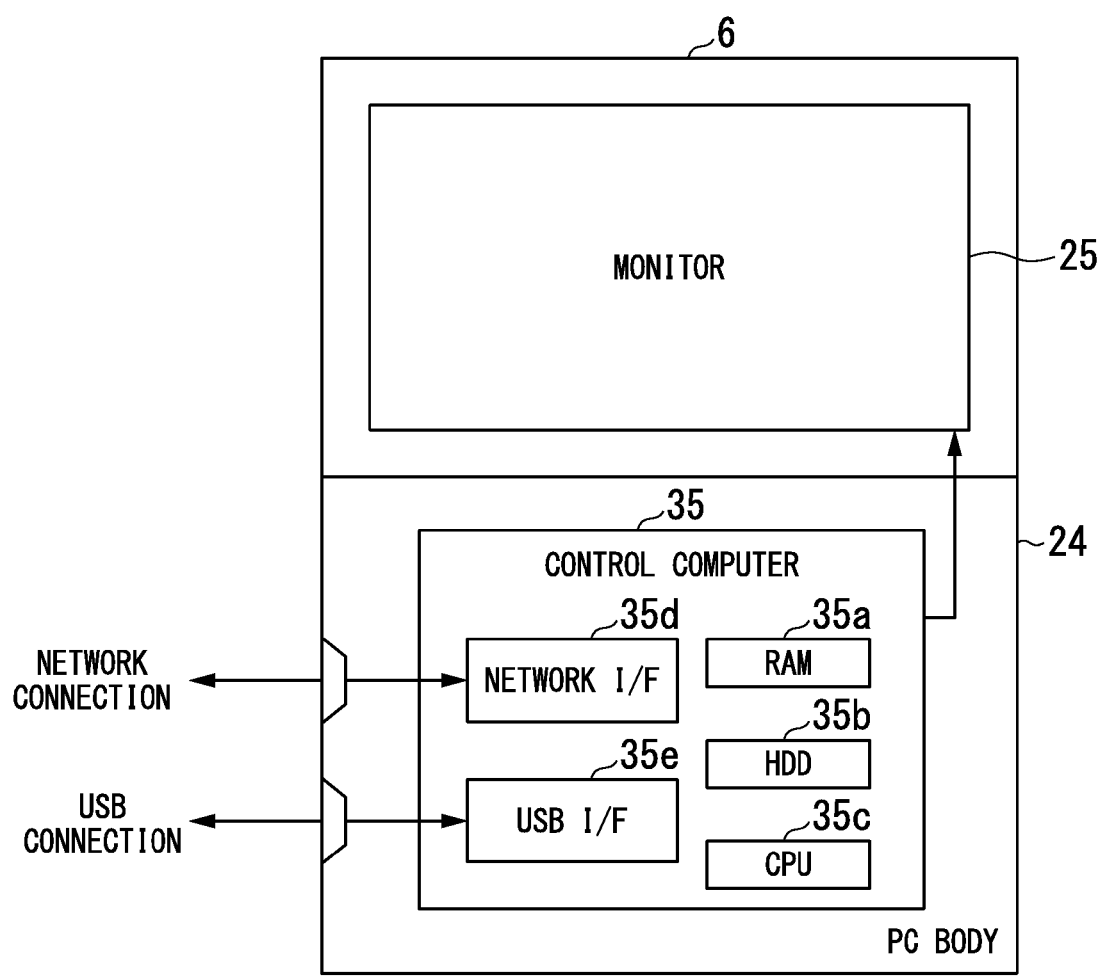
FIG. 5 is a block diagram illustrating a configuration of a PC equipped in a blade inspection system (modified example) according to the embodiment of the present invention.

FIG. 5 illustrates a configuration of the PC 6. The PC 6 includes a PC body 24 and a monitor 25. A control computer 35 is equipped in the PC body 24. The control computer 35 includes a RAM 35a, a hard disk drive (HDD) 35b, a CPU 35c, and external interfaces such as a network I/F 35d and a USB I/F 35e. The control computer 35 is connected to the monitor 25, and video information, a screen of software, and the like are displayed on the monitor 25.

The RAM 35a is used to temporarily store data such as image information necessary for a software operation. A series of software for controlling the endoscope apparatus is stored in the HDD 35b, and the 3D measurement software is stored in the HDD 35b as well. Further, in the present embodiment, a folder for storing an image of the turbine blade 10 is set in the HDD 35b. For example, the CPU 35c executes an operation for various kinds of control using data stored in the RAM 35a according to a command code of software stored in the HDD 35b.

The network I/F 35d is an interface for connecting the PC 6 with the endoscope apparatus 3 through the LAN cable 7. Video information output from the endoscope apparatus via a LAN is capable of being input to the PC 6 through the network I/F 35d. The USB I/F 35e is an interface for connecting the PC 6 with the endoscope apparatus 3 through the video capture card 5. Video information of an analog video output from the endoscope apparatus 3 is capable of being input to the PC 6 through the USB I/F 35e.

In the blade inspection systems illustrated in FIGS. 3 and 4, the same effects as in the blade inspection system illustrated in FIG. 1 can be obtained. Particularly, when the endoscope apparatus is lower in performance than a PC and an operating speed of the endoscope apparatus or the like is not sufficient, the blade inspection systems illustrated in FIGS. 3 and 4 are effective.

Figure 6:
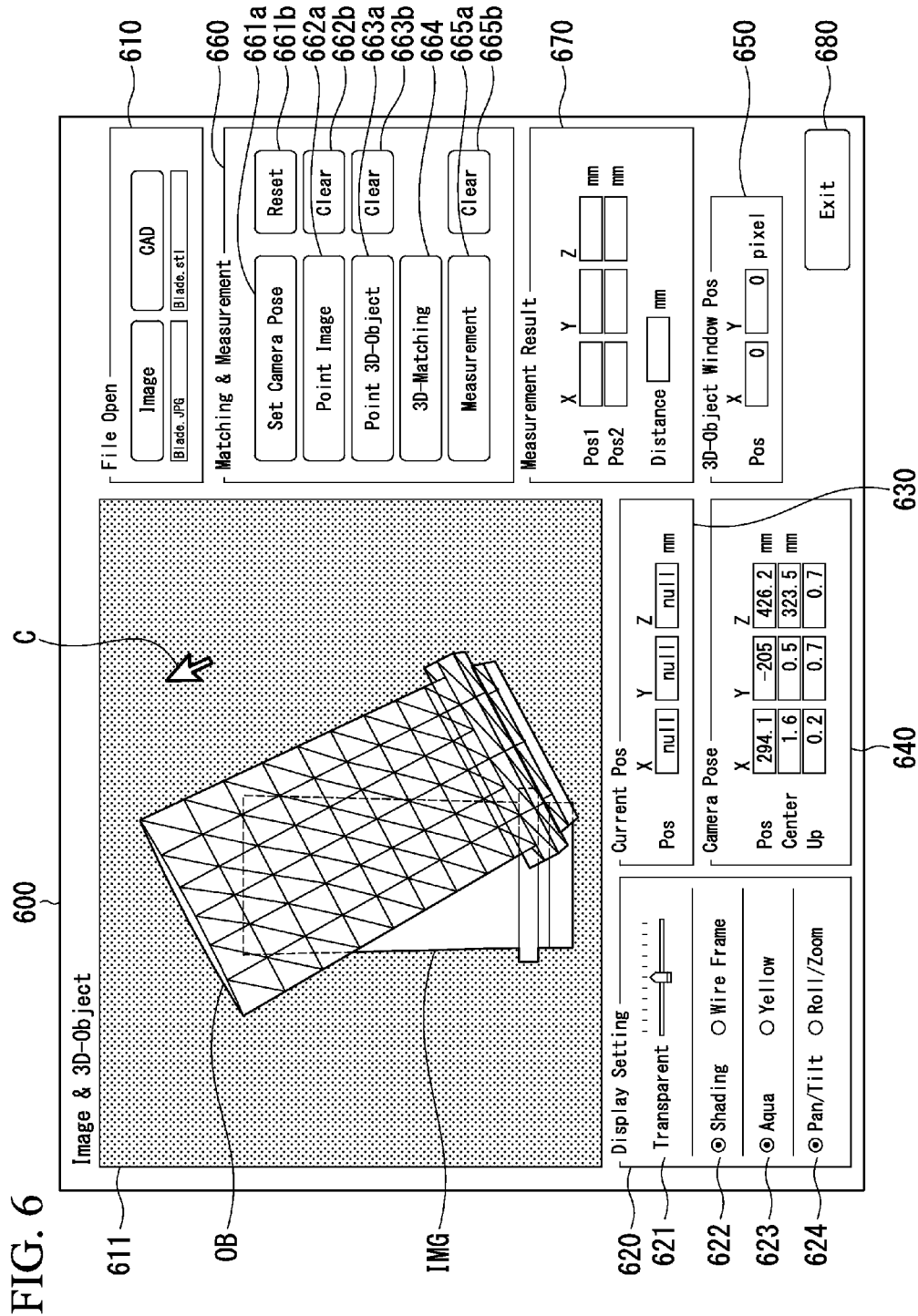
FIG. 6 is a reference diagram illustrating a screen of 3D measurement software according to the embodiment of the present invention.

Next, a screen of a 3D measurement software will be described. FIG. 6 illustrates a main window of the 3D measurement software. The main window 600 illustrated in FIG. 6 is displayed on the monitor 22 when the user activates the 3D measurement software. The CPU 34c performs processing based on various kinds of graphical user interface (GUI) operations in the main window 600 according to the 3D measurement software.

Display of the main window 600 is controlled by the CPU 34c. The CPU 34c generates a graphic image signal (a display signal) for displaying the main window 600, and outputs the graphic image signal to the monitor 22. Further, when a video (hereinafter referred to as a "measurement image") acquired by the endoscope apparatus 3 is displayed on the main window 600 in a superimposed manner, the CPU 34c performs a process of causing image data acquired from the image signal-processing apparatus 31 to be superimposed onto the graphic image signal, and outputs the processed signal (display signal) to the monitor 22.

Further, when a display state of the GUI on the main window 600 is updated, the CPU 34c generates a graphic image signal corresponding to the updated main window 600, and performs the same process as described above. Processing related to a display of a window other than the main window 600 is performed in a similar manner. Hereinafter, a process of generating a graphic image signal by the CPU 34c in order to display (or update) the main window 600 or the like is referred to as a process for displaying the main window 600 or the like.

The user can perform various GUI (Graphical User Interface) operations of the main window 600 by using the GUI functions such as operating the main window 600 through the remote controller 23, moving a cursor C displayed on the main window 600 in the superimposed manner, and inputting an instruction by an click operation. Various GUI functions will be described below.

A [File Open] box 610 is arranged on the upper right portion of the main window 600. An [Image & 3D-Object] box 611 is arranged on the upper left portion of the main window 600. The [File Open] box 610 is a box used to select a measurement image to be displayed on the [Image & 3D-Object] box 611 and select CAD data corresponding to a 3D object to be displayed on the [Image & 3D-Object] box 611.

CAD data represents 3D shape data of the turbine blade 10 calculated in advance using a computer-aided design (CAD). For example, a standard triangulated language (STL) format is used as a format of CAD data. A 3D object is a CG object constructed based on content of CAD data. A description of the details of a GUI and an operation in the [File Open] box 610 will be omitted.

The [Image & 3D-Object] box 611 is a box used to display a measurement image IMG obtained by imaging the turbine blade 10 which is a measurement object and display a 3D object OB to be superimposed onto the measurement image IMG. As will be described later, the user operates the [Image & 3D-Object] box 611, for example, to change a camera pose, designate a reference point, or designate a measurement point.

A [Display Setting] box 620 is arranged on the lower left portion of the main window 600. A GUI related to a display setting of the 3D object OB displayed on the [Image & 3D-Object] box 611 is arranged in the [Display Setting] box 620. The [Display Setting] box 620 has the following GUI functions.

A [Transparent] bar 621 is a bar used to set a display transparency of a 3D object.

The [Transparent] bar 621 is configured to be moveable (slidable) in the horizontal direction (the transverse direction). The user changes display transparency of the 3D object by moving the [Transparent] bar 621.

For example, when the transparency is set high, the 3D object OB is displayed with transparency close to full transparency. When the transparency is set low, the 3D object OB is displayed without transparency. As will be described later, when the user designates a reference point on the measurement image IMG in the [Image & 3D-Object] box 611, it is preferable to set the transparency of the 3D object OB high so that the measurement image IMG is clearly viewed. Further, when the user designates a reference point on the 3D object OB, it is preferable to set the transparency of the 3D object OB low so that the 3D object OB is clearly viewed.

A [display method] radio button 622 is a radio button used to set a display method of the 3D object OB. The [display method] radio button 622 includes two setting items of [Shading] and [Wire Frame]. When [Shading] is selected, the 3D object OB is displayed in a state in which a wire frame and a surface are filled. When [Wire Frame] is selected, the 3D object OB is displayed in a state of only a wire frame as illustrated in FIG. 6.

A [display method] radio button 623 is a radio button used to set a display color of the 3D object OB. According to the present embodiment, for example, the [display method] radio button 623 includes two setting items of [Aqua] and [Yellow]. A display color of the 3D object OB is capable of being switched by a setting of the [display method] radio button 623.

A [moving direction] radio button 624 is a radio button used to set a moving direction of a camera pose. The camera pose is a parameter representing a pose of the 3D object OB, that is, a parameter representing a direction and a position in which the 3D object OB is viewed. The [moving direction] radio button 624 includes two setting items such as [Pan/Tilt] and [Roll/Zoom]. When [Pan/Tilt] is selected, the user can rotate the camera pose in a pan/tilt direction by moving the cursor C vertically or laterally in the [Image & 3D-Object] box 611. Further, when [Roll/Zoom] is selected, the camera pose can be rotated in the roll/zoom direction through a similar operation.

A [Current Pos] box 630 is arranged below the [Image & 3D-Object] box 611.

The [Current Pos] box 630 is a box used to display surface coordinates of the 3D object OB at the cursor position in real time. The surface coordinates of the 3D object OB are represented in units of mm using coordinates of the spatial coordinate system. In the [Image & 3D-Object] box 611, the user can change a value of the [Current Pos] box 630 in real-time by moving the cursor C. For example, when the cursor C is positioned on the 3D object OB, the surface coordinates of the 3D object OB are calculated and displayed on the [Current Pos] box 630. When the cursor C is not positioned on the 3D object OB, "null" is displayed on the [Current Pos] box 630. A method of calculating the surface coordinates of the 3D object OB will be described later with reference to FIGS. 26 to 29.

A [Camera Pose] box 640 is arranged below the [Current Pos] box 630 in the main window 600. The [Camera Pose] box 640 is a box used to display a camera pose in real-time. The user can change a value of the [Camera Pose] box 640 in real-time by changing a camera pose. The camera pose is represented in units of mm using coordinates of the spatial coordinate system.

A [3D-Object Windows Pos] box 650 is arranged on the right side of the [Camera Pose] box 640 in the main window 600. The [3D-Object Windows Pos] box 650 is a box used to display the shift position of the 3D object OB in the [Image & 3D-Object] box 611. The shift position of the 3D object OB is represented in units of pixels using coordinates of the plane coordinate system.

The 3D object OB is displayed on the central portion of the [Image & 3D-Object] box 611. Even when the camera pose is changed, the display position of the 3D object OB does not change. However, an inspection object shown in the measurement image IMG is not always necessarily positioned on the central portion of the image. For this reason, after a 3D-matching process that matches the measurement image IMG with the 3D object OB is executed, the 3D object OB has to be positioned on the inspection object shown in the measurement image rather than the central portion of the [Image & 3D-Object] box 611.

The shift position represents a relative position of the 3D object OB from the central portion of the [Image & 3D-Object] box 611. Hereinafter, a moving direction of a shift position in the plane coordinate system is referred to as a "shift direction." It is difficult for the user to manually change the shift position voluntarily. The shift position is calculated by the CPU 34c after the 3D-matching process is executed.

A [Matching & Measurement] box 660 is arranged below the [File Open] box 610. A GUI related to the 3D-matching process and measurement is arranged in the [Matching & Measurement] box 660. The [Matching & Measurement] box 660 has the following GUI functions.

A [Set Camera Pose] button 661a is a button used to change the camera pose. The user can change the camera pose by moving the cursor C vertically or laterally in the [Image & 3D-Object] box 611 after the [Set Camera Pose] button 661a is pressed. Further, a [Reset] button 661b is arranged on the right side of the [Set Camera Pose] button 661a, and when the [Reset] button 661b is pressed, the camera pose is set to an initial value.

A [Point Image] button 662a is a button used to designate a reference point (measurement) of the measurement image IMG. The reference point (measurement) is a point on the measurement image IMG used as a reference when the CPU 34c executes the 3D-matching process. The user can designate a reference point (measurement) on an inspection object shown in the measurement image IMG by moving the cursor C and performing a click operation or the like at a desired position in the [Image & 3D-Object] box 611 after the [Point Image] button 662a is pressed. The reference point (measurement) is represented in units of pixels using coordinates of the plane coordinate system. Further, when the [Point Image] button 662a is pressed, the display transparency of the 3D object OB is automatically set high, so that the measurement image IMG is clearly viewed. Further, a [Clear] button 662b is arranged on the right side of the [Point Image] button 662a. When the [Clear] button 662b is pressed, all of already designated reference points (measurement) are cleared, and a state before designation is made is recovered.

A [Point 3D-Object] button 663a is a button used to designate a reference point (3D) of the 3D object OB. The reference point (3D) is a point on the 3D object used as a reference when the CPU 34c executes the 3D-matching process, similarly to the reference point (measurement). The user can designate the reference point (3D) on the 3D object OB by moving the cursor C and performing a click operation or the like at a position at which the reference point (3D) is desired to be designated in the [Image & 3D-Object] box 611 after the [Point 3D-Object] button 663a is pressed. The reference point (3D) is represented in units of mm using coordinates of the spatial coordinate system. Further, after the [Point 3D-Object] button 663a is pressed, the display transparency of the 3D object OB is automatically set low, so that the 3D object OB is clearly viewed. Further, a [Clear] button 663b is arranged on the right side of the [Point 3D-Object] button 663a, and when the [clear] button 663b is pressed, all of the already designated reference points (3D) are cleared, and a state before designation is recovered.

A [3D-Matching] button 664 is a button used to execute the 3D-matching process. After the [3D-Matching] button 664 is pressed, the CPU 34c executes the 3D-matching process based on two sets of reference points (the reference point (measurement) and the reference point (3D)) designated by the user. At this time, the CPU 34c performs the 3D-matching process so that positions of the two sets of reference points match each other. As a result of the 3D-matching process, the inspection object and the 3D object OB in the measurement image IMG are displayed to approximately match each other, and thus the inspection object and the 3D object OB in the measurement image IMG enter a suitable state for measurement.

A [Measurement] button 665a is a button used to designate a measurement point. The measurement point is a point used as a reference when measurement is performed. The user can designate the measurement point in the 3D object OB by moving the cursor C and performing a click operation or the like at a position at which the measurement point is desired to be designated in the [Image & 3D-Object] box 611 after the [Measurement] button 665a is pressed. The CPU 34c executes a measurement process based on the designated measurement point. Further, a [Clear] button 665b is arranged on the right side of the [Measurement] button 665a. When the [Clear] button 665b is pressed, all of already designated measurement points are cleared, and a state before designation is recovered.

A [Measurement Result] box 670 is arranged below the [Matching & Measurement] box 660. The [Measurement Result] box 670 is a box used to display a measurement result. When the user designates the measurement point in the [Image & 3D-Object] box 611, measurement is performed based on the designated measurement point, and a measurement result is displayed on the [Measurement Result] box 670.

An [Exit] button 680 is arranged on the lower right portion of the main window 600. The [Exit] button 680 is a button used to end the 3D measurement software. When the [Exit] button 680 is pressed, all software operations end, and the main window 600 is closed (not displayed).

Figure 7:
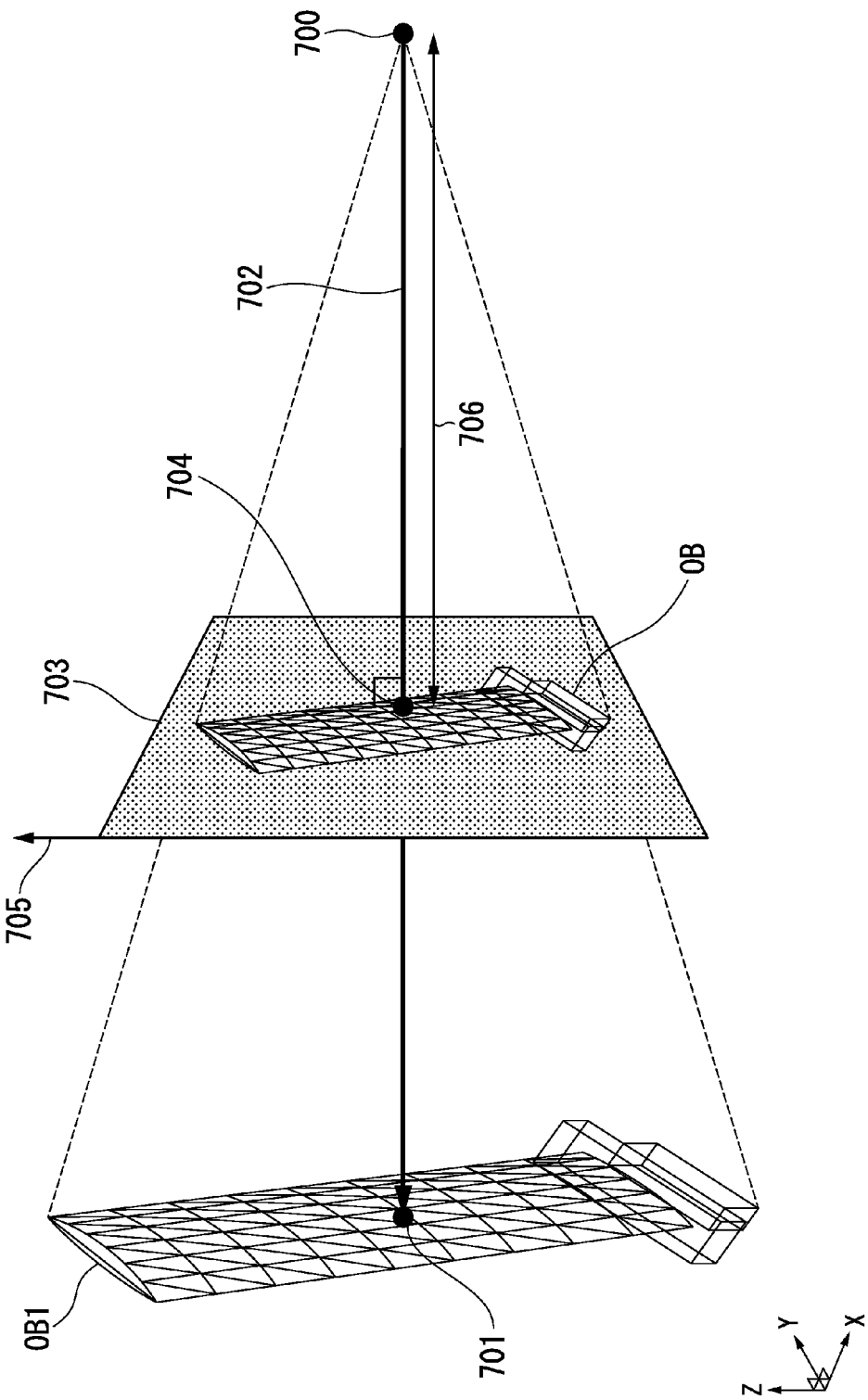
FIG. 7 is a reference diagram illustrating a relationship between a 3D object and a camera pose according to the embodiment of the present invention.

Next, a relationship between the 3D object and the camera pose will be described with reference to FIG. 7. A 3D object OB1 and a viewpoint 700 are present in virtual space corresponding to real space as illustrated in FIG. 7. The position of the 3D object OB1 is fixed, but the position of the viewpoint 700 can be freely changed by the user. A center of sightline 701 is present at a center of gravity position of the 3D object OB1, and a straight line extending from the viewpoint 700 in a line-of-sight direction 702 is directed toward the center of sightline 701. The position of the center of sightline 701 is fixed.

A rectangular screen plane 703 is present between the 3D object OB1 and the viewpoint 700. The screen plane 703 corresponds to the [Image 3D-Object] box 611. The sizes of the screen plane 703 in the longitudinal direction and the transverse direction are fixed values. A projection image in which the 3D object OB1 is projected onto the screen plane 703 is the 3D object OB displayed on the [Image 3D-Object] box 611.

The screen plane 703 is always perpendicular to the line-of-sight direction 702, and a straight line extending from the viewpoint 700 in the line-of-sight direction 702 always passes through a center 704 of the screen plane 703. A distance 706 from the viewpoint 700 to the center 704 of the screen plane 703 is a fixed value, but a distance from the viewpoint 700 to the center of sightline 701 can be freely changed by the user.

A direction in which the screen plane 703 faces is represented by an upward vector 705. The upward vector 705 is a unit vector which is parallel to the screen plane 703 and represents a direction of the screen plane 703 such as an upper direction.

Among items illustrated in FIG. 7, parameters configuring a camera pose include three parameters of a viewpoint position, a center of sightline position, and an upward vector. Next, a relationship between the 3D object and the camera pose when the camera pose is changed will be described with reference to FIGS. 8A to 10B.

Figure 8A:
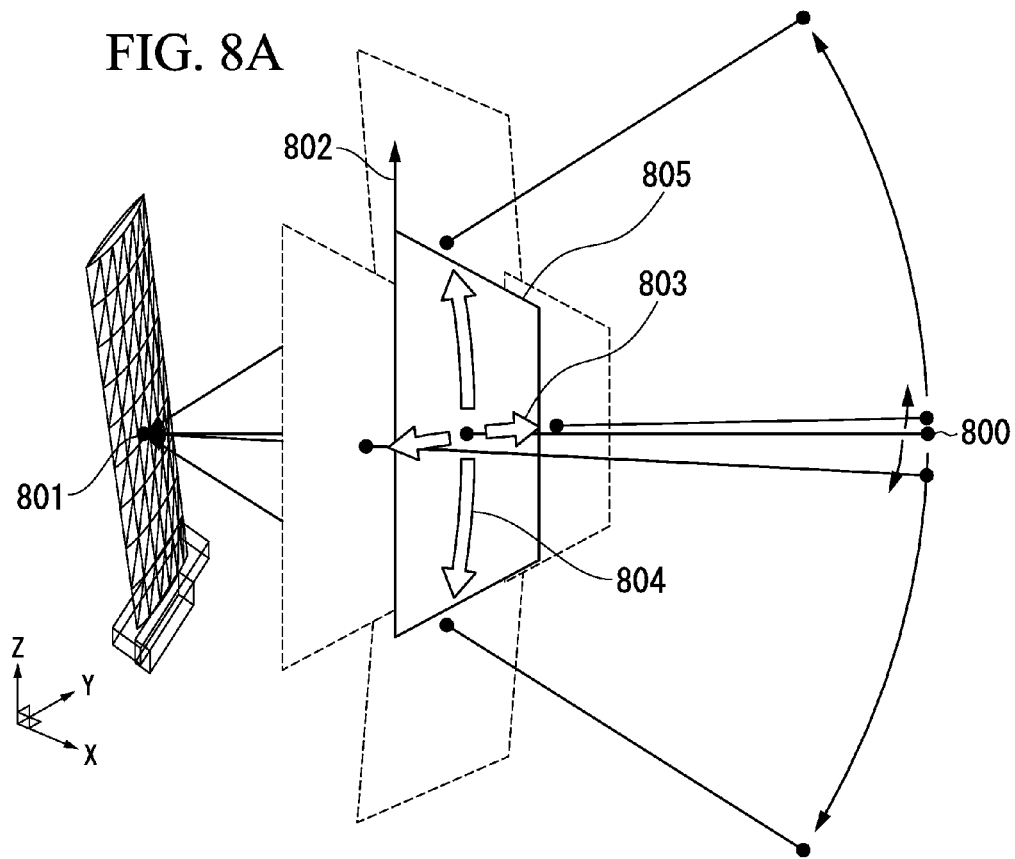
FIG. 8A is a reference diagram illustrating a relationship between the 3D object and the camera pose according to the embodiment of the present invention.
Figure 8B:
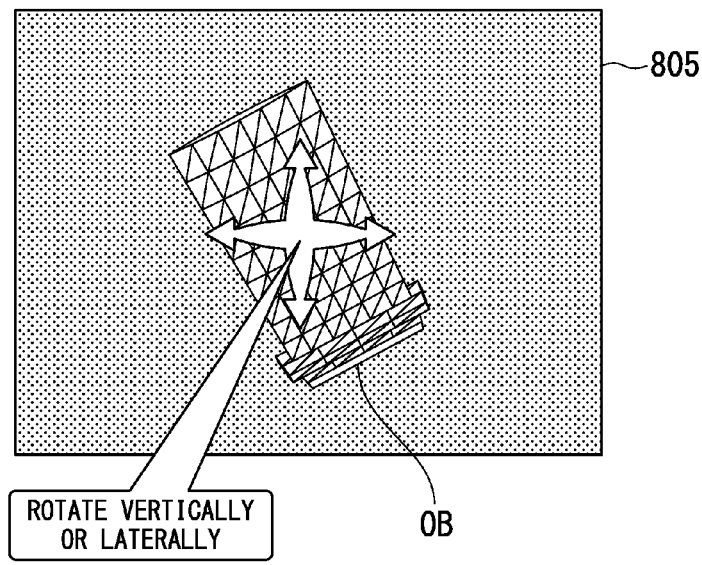
FIG. 8B is a reference diagram illustrating a relationship between the 3D object and the camera pose according to the embodiment of the present invention.

FIG. 8A shows a relationship between the 3D object and the camera pose when the camera pose is changed in a pan/tilt direction. A pan direction is a direction (a pan direction 803) in which a viewpoint 800 is moved perpendicularly to an upward vector 802 in the state in which a distance from the viewpoint 800 to a center of sightline 801 is fixed. A tilt direction is a direction (a tilt direction 804) in which the viewpoint 800 is moved in parallel to the upward vector 802 in the state in which the distance from the viewpoint 800 to the center of sightline 801 is fixed. When the camera pose is changed in the pan/tilt direction as illustrated in FIG. 8A, a 3D object OB projected onto a screen plane 805 is rotated in the vertical direction and the horizontal direction as illustrated in FIG. 8B.

Figure 9A:
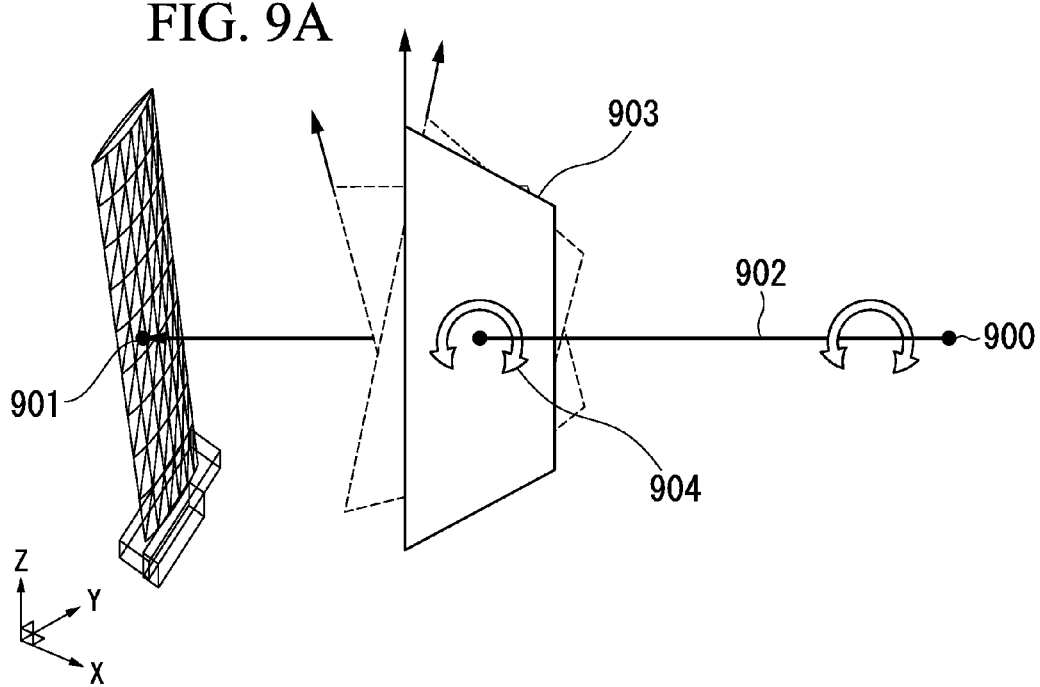
FIG. 9A is a reference diagram illustrating a relationship between the 3D object and the camera pose according to the embodiment of the present invention.
Figure 9B:
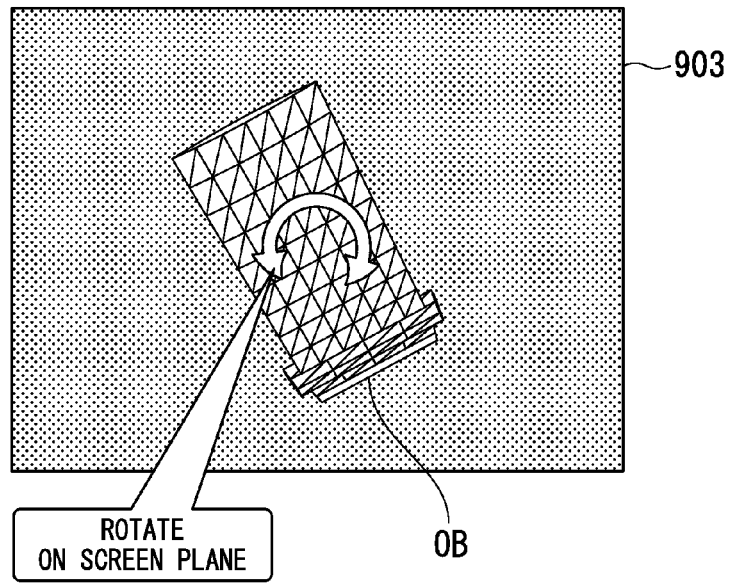
FIG. 9B is a reference diagram illustrating a relationship between the 3D object and the camera pose according to the embodiment of the present invention.

FIG. 9A illustrates a relationship between the 3D object and the camera pose when the camera pose is changed in a roll direction. The roll direction is a direction (a roll direction 904) in which a screen plane 903 is rotated on an axis in a direction of viewpoint 902 facing a center of viewpoint 901 from a viewpoint 900 in the state in which the position of the point of view 900 is fixed. When the camera pose is changed in the roll direction as illustrated in FIG. 9A, a 3D object OB projected onto the screen plane 903 is rotated on the center of the screen plane 903 as illustrated in FIG. 9B.

Figure 10A:
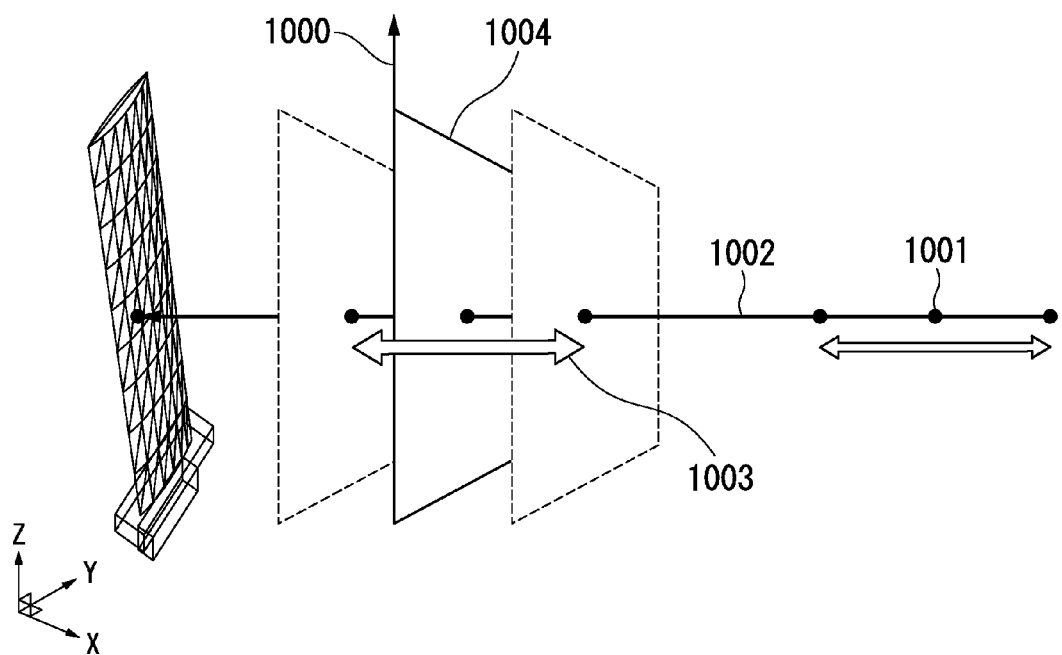
FIG. 10A is a reference diagram illustrating a relationship between the 3D object and the camera pose according to the embodiment of the present invention.
Figure 10B:
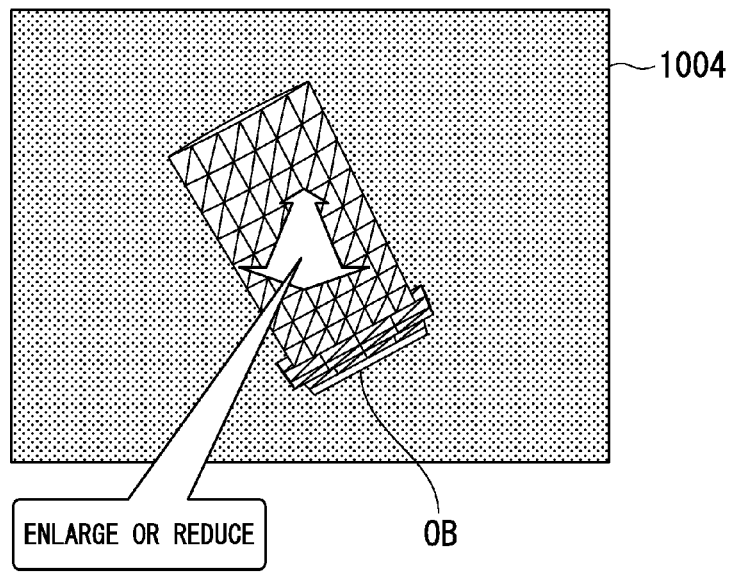
FIG. 10B is a reference diagram illustrating a relationship between the 3D object and the camera pose according to the embodiment of the present invention.

FIG. 10A illustrates a relationship between the 3D object and the camera pose when the camera pose is changed in a zoom direction. The zoom direction is a direction (a zoom direction 1003) in which a viewpoint 1001 is moved in parallel to a direction of sightline 1002 in the state in which an upward vector 1000 is fixed. When the camera pose is changed in the zoom direction as illustrated in FIG. 10A, a 3D object OB projected onto a screen plane 1004 is enlarged or reduced as illustrated in FIG. 10B.

As described above, when the camera pose is changed, the position and the direction of the screen plane are changed. Due to this change, a display of a 3D object projected onto the screen plane is changed. As a result, a display of a 3D object displayed on the [Image & 3D-Object] box 611 is changed as well. The CPU 34c detects a camera pose change instruction input through the remote controller 23 by the user, and performs a process of causing a 3D object to be displayed on the [Image & 3D-Object] box 611 according to the camera pose change instruction.

Figure 11:
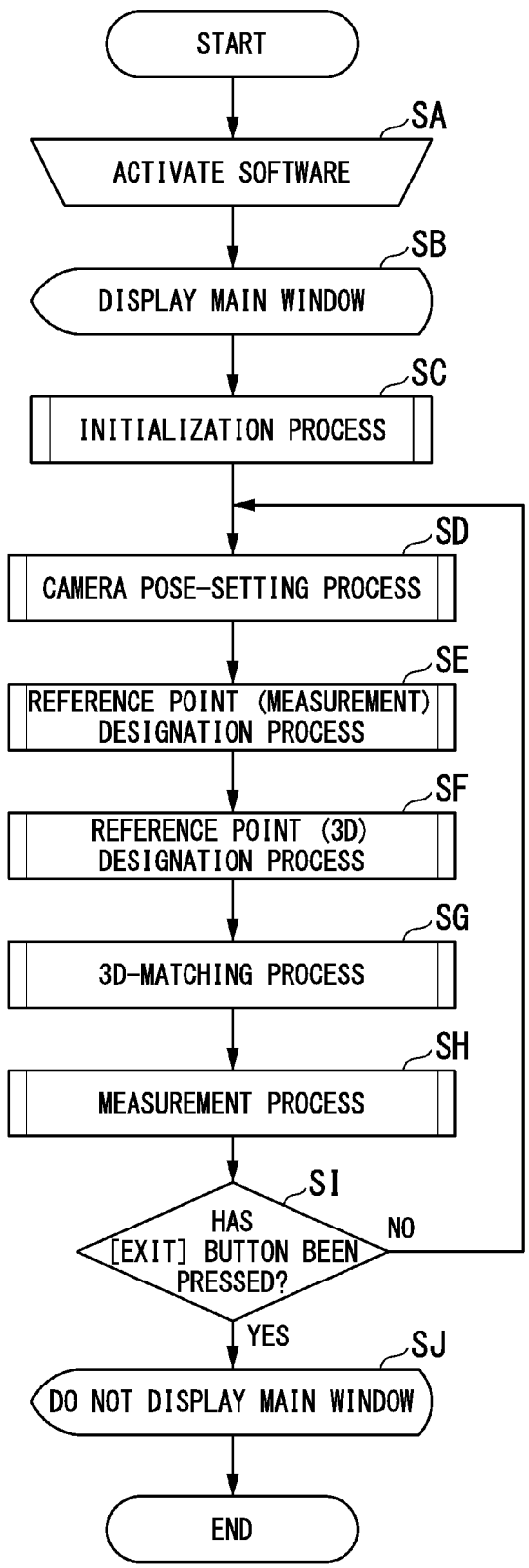
FIG. 11 is a flowchart illustrating a process of an operation performed by 3D measurement software according to the embodiment of the present invention.

Next, the operation flow of the 3D measurement software will be described with reference to FIG. 11. In the following, only operations related to some GUIs will be described rather than operations related to all GUIs in the main window 600. Specifically, operations which relate to the [Image & 3D-Object] box 611, the [Set Camera Pose] button 661a, the [Point Image] button 662a, the [Point 3D-Object] button 663a, the [3D-matching] button 664, the [Measurement] button 665a, the [Measurement Result] box 670, and the [Exit] button 680 will be described, and a description of operations related to the remaining GUIs will be omitted.

In step SA, the CPU 34c activates the 3D measurement software. Specifically, the CPU 34c causes the 3D measurement software stored in the ROM 34b to be read into the RAM 34a based on an activation instruction input through the remote controller 23 by the user, and starts an operation according to the 3D measurement software. In step SB, the CPU 34c performs a process for displaying the main window 600.

In step SC, the CPU 34c performs an initialization process. The initialization process refers to a process of setting an initial state of various kinds of GUIs in the main window 600 and setting initial values of various kinds of data recorded in the RAM 34a. The details of the initialization process will be described later.

In step SD, the CPU 34c performs a camera-pose-setting process. The camera-pose-setting process refers to a process of roughly matching an inspection object with a 3D object in a measurement image of the [Image & 3D-Object] box 611 based on an instruction to change the camera pose which is input by the user. The details of the camera-pose-setting process will be described later.

In step SE, the CPU 34c performs a reference point (measurement) setting process. The reference point (measurement) setting process refers to a process of designating (setting) a reference point based on an instruction which is input by the user and designates a position on an inspection object shown in the measurement image of the [Image & 3D-Object] box 611. The details of the reference point (measurement) setting process will be described later.

In step SF, the CPU 34c performs a reference point (3D) setting process. The reference point (3D) setting process refers to a process of designating (setting) a reference point based on an instruction which is input by the user and designates a position on the 3D object of the [Image & 3D-Object] box 611. The details of the reference point (3D) setting process will be described later.

In step SG, the CPU 34c performs a 3D-matching process. The 3D-matching process refers to a process of matching the measurement image displayed on the [Image & 3D-Object] box 611 with the 3D object based on two sets of reference points (the reference point (measurement) and the reference point (3D)) designated by the user. The details of the 3D-matching process will be described later.

In step SH, the CPU 34c performs the measurement process. The measurement process refers to a process of designating (setting) a measurement point based on an instruction which is input by the user to designate a position on the 3D object in the [Image & 3D-Object] box 611 and calculating the size of the inspection object based on the designated measurement point. The details of the measurement process will be described later.

In step SI, the CPU 34c checks whether or not the user has pressed the [Exit] button 680. When the user has pressed the [Exit] button 680, the process proceeds to step SJ. Further, when the user has not pressed the [Exit] button 680, the process proceeds to step SD. In step SJ, the CPU 34c does not display the main window 600, and the operation of the 3D measurement software ends.

Figure 12:
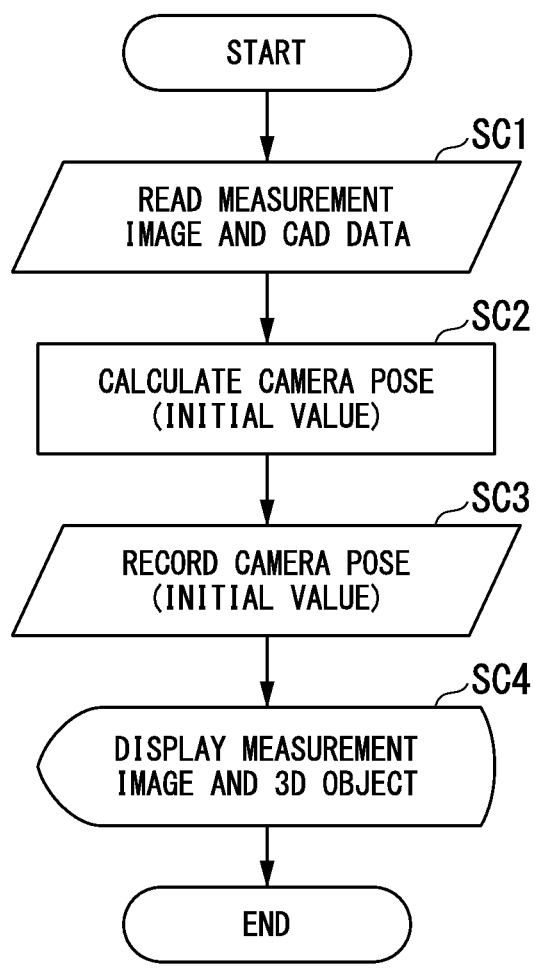
FIG. 12 is a flowchart illustrating a process of an operation performed by the 3D measurement software according to the embodiment of the present invention.

Next, the operation flow of the initialization process of step SC will be described with reference to FIG. 12. In step SC1, the CPU 34c causes a predetermined measurement image file and CAD data recorded in the memory card 50 to be read into the RAM 34a. In step SC2, the CPU 34c calculates a camera pose (initial value) based on the read CAD data.

Figure 13:
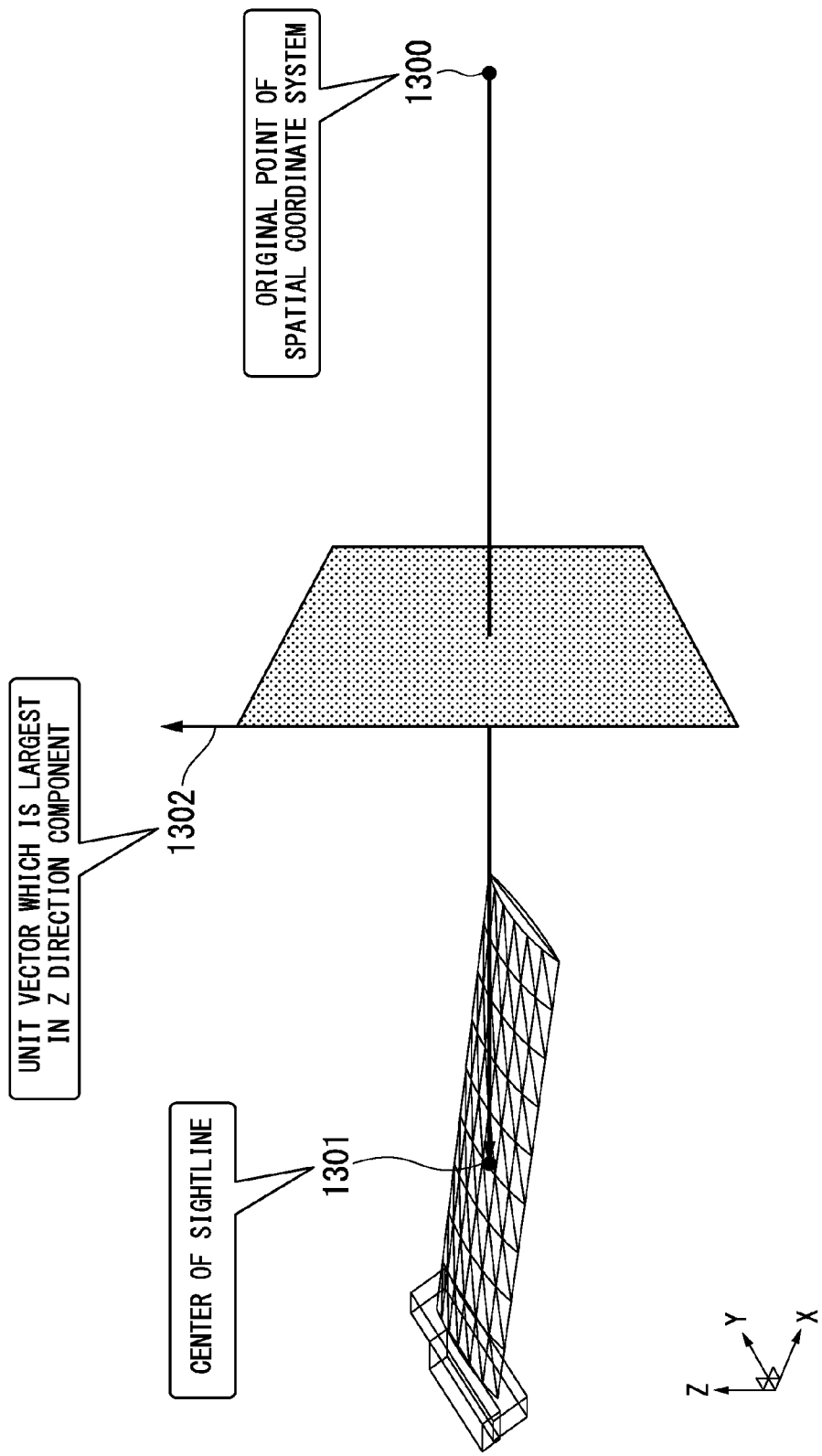
FIG. 13 is a reference diagram for describing an initial value of a camera pose according to the embodiment of the present invention.

Among camera poses, for a viewpoint position, the CPU 34c sets coordinates (x,y,z) (=(0,0,0)) of an original point of the spatial coordinate system as an initial value (a viewpoint 1300) as illustrated in FIG. 13. Among the camera poses, for position of a center of sightline, the CPU 34c calculates a position of center of gravity position for all spatial coordinates in the CAD data, and sets the coordinates as an initial value (a center of sightline 1301) as illustrated in FIG. 13. The position of the center of sightline has a value that is specific to each piece of CAD data and does not change even when the camera pose is changed later. Among the camera poses, for an upward vector, the CPU 34c sets a unit vector which is largest in a Z direction component among unit vectors perpendicular to a straight line connecting the viewpoint 1300 with the center of sightline 1301 as an initial value (an upward vector 1302) as illustrated in FIG. 13. Here, a unit vector which is largest in a Z direction component is set as an initial value of an upward vector, but the initial value of the upward vector is not limited to the unit vector which is largest in the Z direction component.

In step SC3, the CPU 34c records the camera pose (initial value) calculated in step SC2 in the RAM 34a as a current camera pose. The current camera pose refers to a currently set camera pose. A 3D object is displayed based on the current camera pose.

Figure 14:
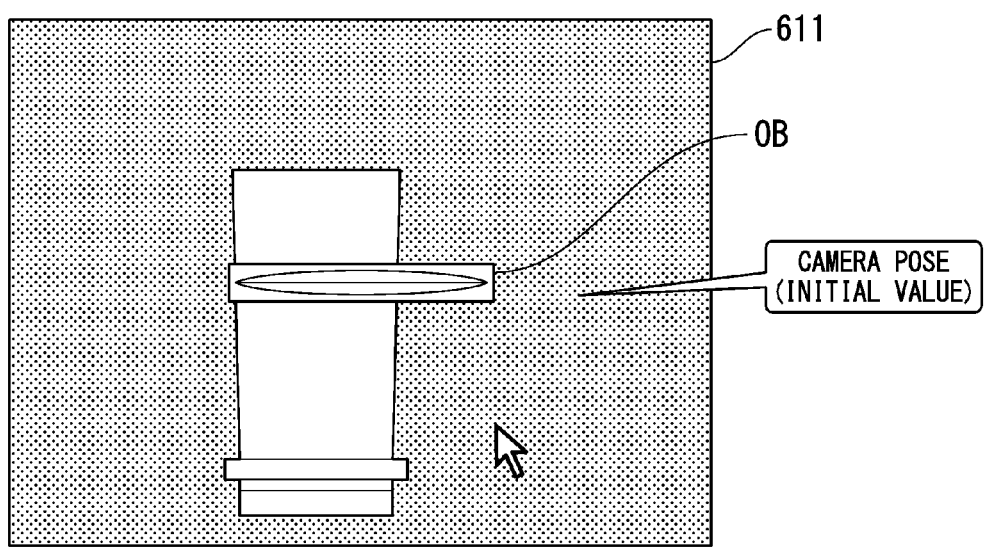
FIG. 14 is a reference diagram for describing the initial value of the camera pose according to the embodiment of the present invention.

In step SC4, the CPU 34c executes a process of causing the measurement image IMG to be displayed on the [Image & 3D-Object] box 611 and then causing the 3D object OB to be displayed on the measurement image IMG in the superimposed manner with predetermined transparency as illustrated in FIG. 14. At this time, the 3D object OB is displayed as a plane view projected onto the screen plane based on the calculated camera pose (initial value). When the process of step SC4 ends, the initialization process ends.

Figure 15:
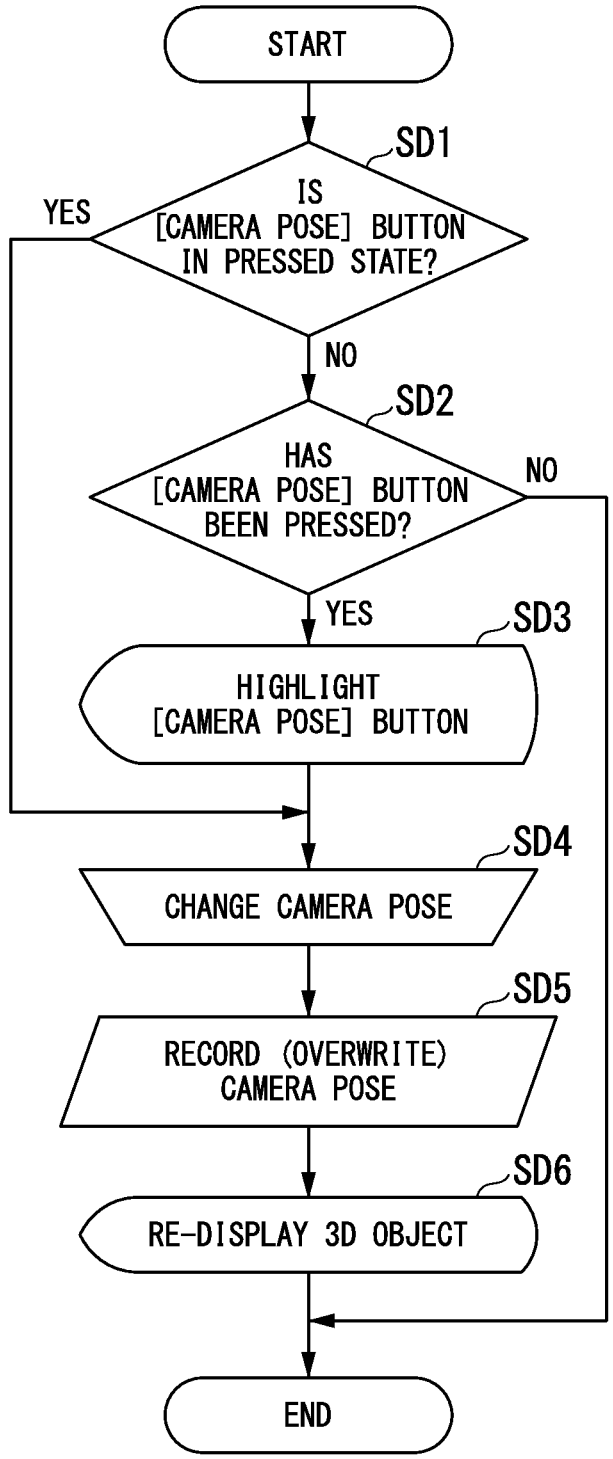
FIG. 15 is a flowchart illustrating a process of an operation performed by the 3D measurement software according to the embodiment of the present invention.

Next, the flow of the camera-pose-setting process of step SD will be described with reference to FIG. 15. In step SD1, the CPU 34c checks whether or not the [Set Camera Pose] button 661a is in the already pressed state (the state in which the process of step SD3 has already been performed). When the [Set Camera Pose] button 661a is in the pressed state, the process proceeds to step SD4, but when the [Set Camera Pose] button 661a is not in the pressed state, the process proceeds to step SD2.

In step SD2, the CPU 34c checks whether or not the [Set Camera Pose] button 661a has been pressed by the user. When the [Set Camera Pose] button 661a has been pressed, the process proceeds to step SD3. When the [Set Camera Pose] button 661a has not been pressed, the camera-pose-setting process ends.

Figure 16A:
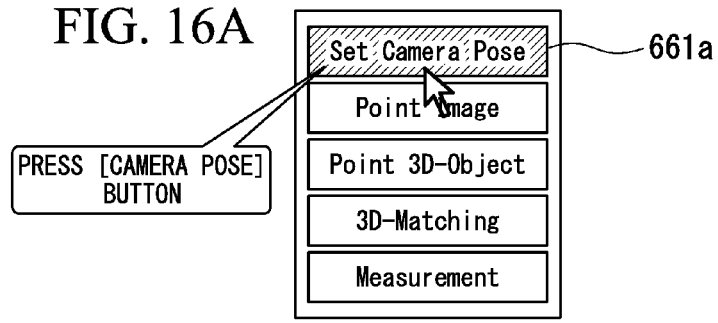
FIG. 16A is a reference diagram for describing content of a camera pose-setting process according to the embodiment of the present invention.

In step SD3, the CPU 34c performs a process of emphasizing and highlighting the [Set Camera Pose] button 661a as illustrated in FIG. 16A. The [Set Camera Pose] button 661a is highlighted to notify the user of the fact that the camera pose is currently changeable.

Figure 16B:
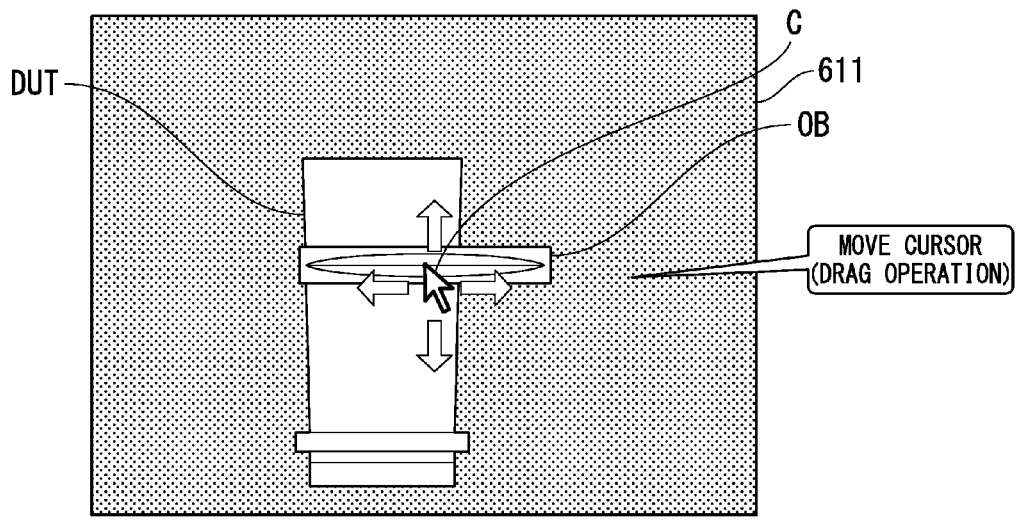
FIG. 16B is a reference diagram for describing content of the camera pose-setting process according to the embodiment of the present invention.

In step SD4, the CPU 34c detects the user's operation (drag operation) of moving the cursor C vertically or horizontally while operating the remote controller 23 to perform a click operation or the like through the cursor C in the [Image & 3D-Object] box 611 as illustrated in FIG. 16B, and changes the camera pose based on the result of detecting the operation of the cursor C. At this time, the user changes the camera pose so that an inspection object DUT shown in the measurement image roughly matches the 3D object OB. The camera pose is capable of being changed in the pan/tilt, roll, or zoom direction. The CPU 34c detects an operation instruction of the cursor C input through the remote controller 23, and calculates a changed camera pose based on the operation instruction.

Figure 16C:
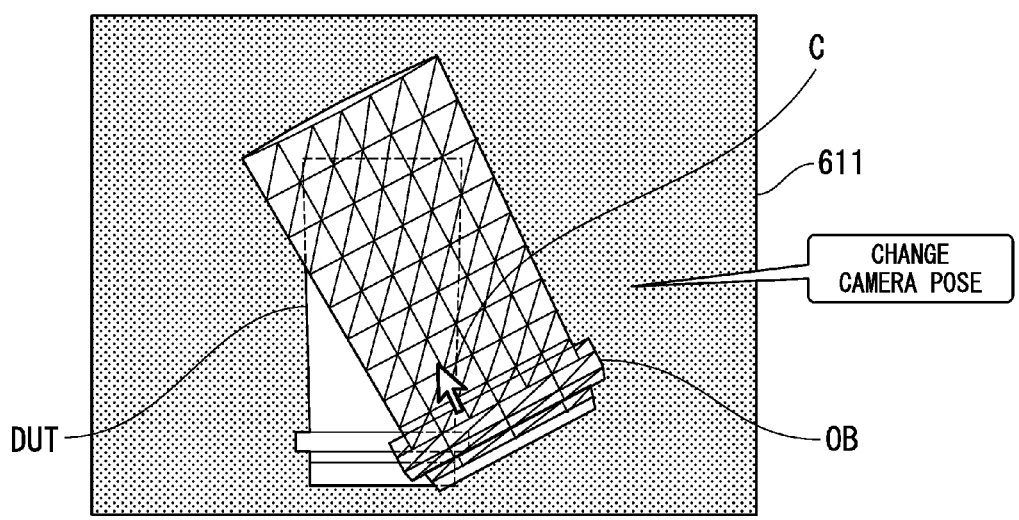
FIG. 16C is a reference diagram for describing the content of the camera pose-setting process according to the embodiment of the present invention.

In step SD5, the CPU 34c records the changed camera pose as the current camera pose in the RAM 34a in an overwriting manner. In step SD6, the CPU 34c performs a process of re-displaying a 3D object based on the current camera pose. As a result, as illustrated in FIG. 16C, the 3D object OB in which the camera pose has been changed is displayed on the [Image & 3D-Object] box 611. When the process of step SD6 ends, the camera-pose-setting process ends.

Next, the flow of the reference point (measurement) setting process of step SE will be described with reference to FIG. 17. In step SE1, the CPU 34c checks whether or not the [Point Image] button 662a is already in the pressed state (the state in which the process of steps SE3 and SE4 has been performed). When the [Point Image] button 662a is in the pressed state, the process proceeds to step SE5. When the [Point Image] button 662a is not in the pressed state, the process proceeds to step SE2.

In step SE2, the CPU 34c checks whether or not the [Point Image] button 662a has been pressed by the user. When the [Point Image] button 662a has been pressed, the process proceeds to step SE3, but when the [Point Image] button 662a has not been pressed, the reference point (measurement) setting process ends.

Figure 18A:
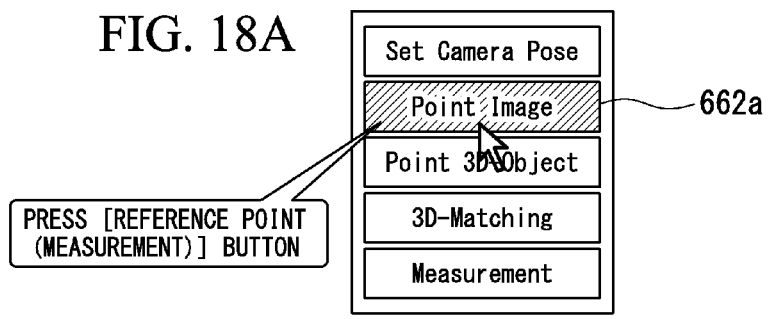
FIG. 18A is a reference diagram for describing content of a reference point (measurement) setting process according to the embodiment of the present invention.

In step SE3, the CPU 34c performs a process of highlighting the [Point Image] button 662a as illustrated in FIG. 18A. The [Point Image] button 662a is highlighted to notify the user of the fact that a reference point is currently capable of being designated in the measurement image.

Figure 18B:
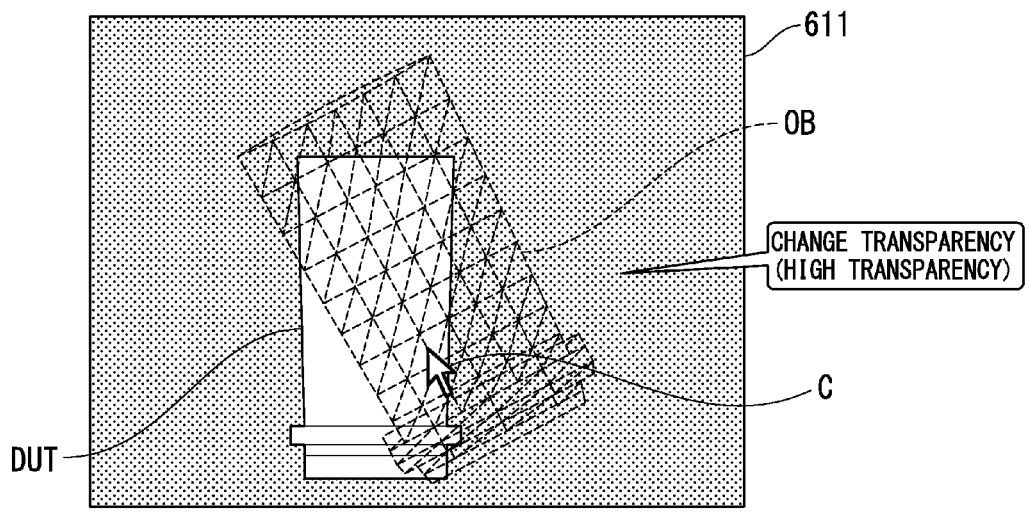
FIG. 18B is a reference diagram for describing the content of the reference point (measurement) setting process according to the embodiment of the present invention.

In step SE4, the CPU 34c performs a process of changing the transparency of the 3D object OB and then re-displaying the 3D object OB with the changed transparency as illustrated in FIG. 18B. Here, the transparency is set to a larger value than the value before the transparency is changed, and the 3D object OB enters a state close to full transparency, so that the measurement image is clearly viewed. Particularly, although not shown, when there is an already designated reference point (3D), the 3D object OB temporarily enters a non-display state. This is a process for allowing the measurement image to be clearly viewed.

In step SE5, the CPU 34c detects the user's operation such as operating the remote controller 23 and clicking through the cursor C in order to designate the reference point (measurement) to the inspection object DUT shown in the measurement image in the [Image & 3D-Object] box 611, and calculates coordinates of the designated reference point based on a result of detecting the operation of the cursor C. At this time, the calculated coordinates of the reference point (measurement) are plane coordinates (in units of pixels) in the measurement image.

Figure 18C:
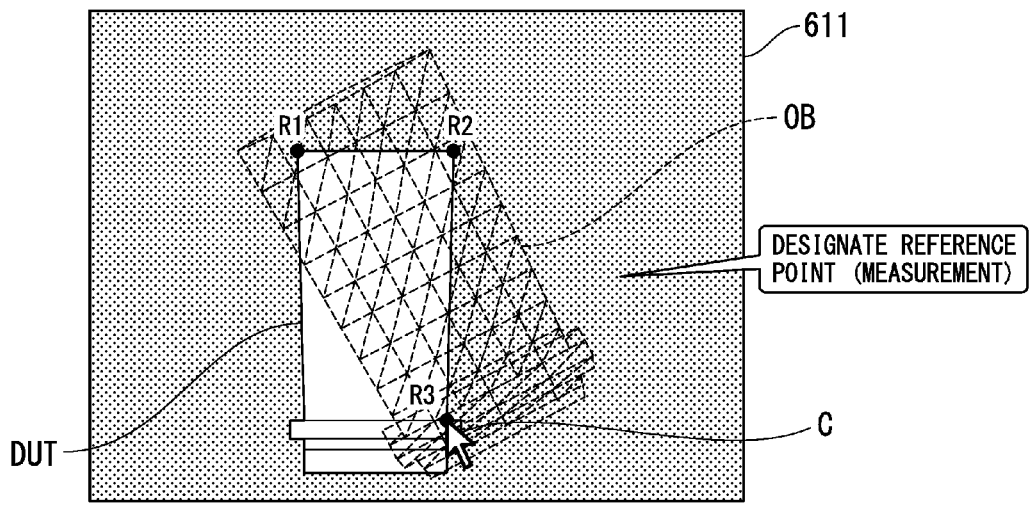
FIG. 18C is a reference diagram for describing the content of the reference point (measurement) setting process according to the embodiment of the present invention.

In step SE6, the CPU 34c records the coordinates of the designated reference point (measurement) in the RAM 34a. In step SE7, the CPU 34c performs a process of causing the designated reference point (measurement) to be displayed on the measurement image in the superimposed manner. As a result, as illustrated in FIG. 18C, reference points (measurement) R1, R2, and R3 are displayed on the measurement image in the superimposed manner. When the process of step SE7 ends, the reference point (measurement) setting process ends.

Figure 19:
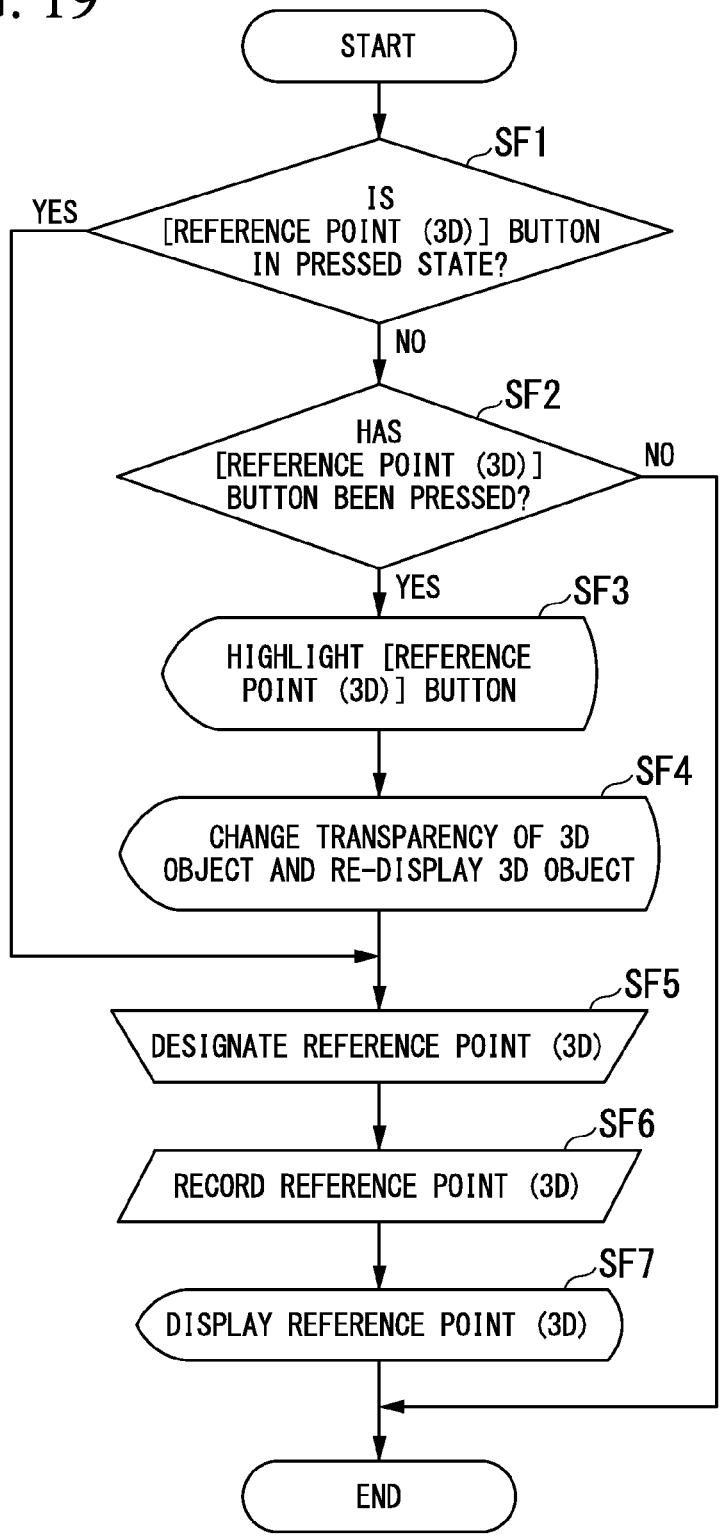
FIG. 19 is a flowchart illustrating a process of an operation performed by the 3D measurement software according to the embodiment of the present invention.

Next, the flow of the reference point (3D) setting process of step SF will be described with reference to FIG. 19. In step SF1, the CPU 34c checks whether or not the [Point 3D-Object] button 663a is already in the pressed state (the state in which the process of steps SF3 and SF4 has been performed). When the [Point 3D-Object] button 663a is in the pressed state, the process proceeds to step SF5. When the [Point 3D-Object] button 663a is not in the pressed state, the process proceeds to step SF2.

In step SF2, the CPU 34c checks whether or not the [Point 3D-Object] button 663a has been pressed by the user. When the [Point 3D-Object] button 663a has been pressed, the process proceeds to step SF3, but when the [Point 3D-Object] button 663a has not been pressed, the reference point (3D) setting process ends.

Figure 20A:
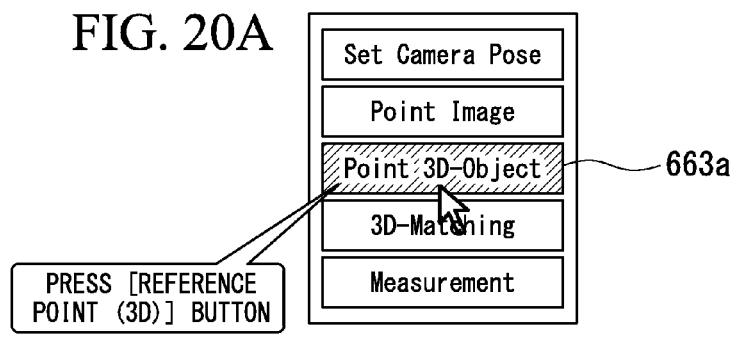
FIG. 20A is a reference diagram for describing content of a reference point (3D) setting process according to the embodiment of the present invention.

In step SF3, the CPU 34c performs a process of highlighting the [Point 3D-Object] button 663a as illustrated in FIG. 20A. The [Point 3D-Object] button 663a is highlighted to notify the user of the fact that a reference point is currently capable of being designated in a 3D object.

Figure 20B:
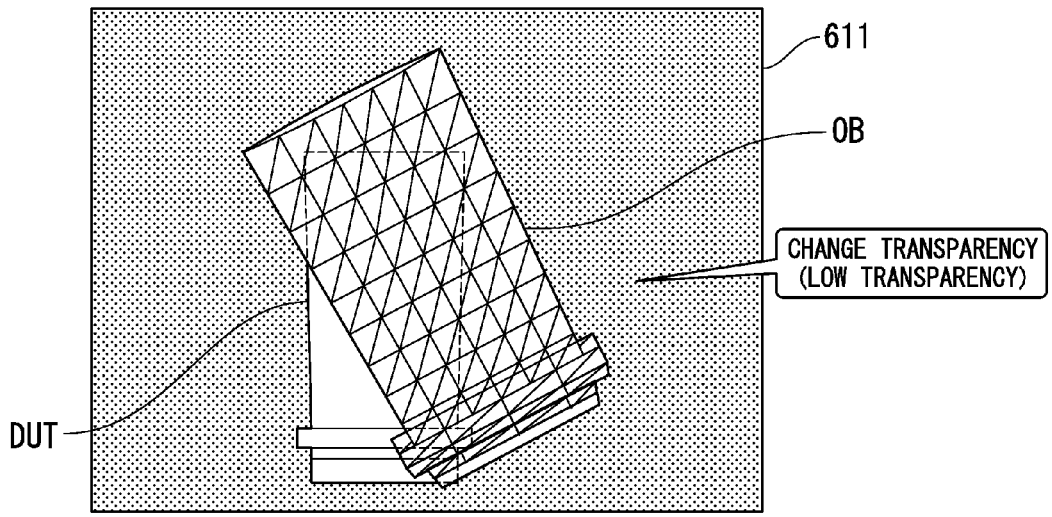
FIG. 20B is a reference diagram for describing the content of the reference point (3D) setting process according to the embodiment of the present invention.

In step SF4, the CPU 34c performs a process of changing the transparency of the 3D object OB and re-displaying the 3D object OB with the changed transparency as illustrated in FIG. 20B. Here, the transparency is set to a smaller value than the value before the transparency is changed, so that the 3D object OB is clearly viewed. At this time, particularly, although not shown, when there is an already designated reference point (measurement), the measurement image temporarily enters a non-display state. This is a process for allowing the 3D object OB to be clearly viewed.

In step SF5, the CPU 34c detects the user's operation such as operating the remote controller 23 and clicking through the cursor C in order to designate the reference point (3D) to the inspection object DUT shown in the measurement image in the [Image & 3D-Object] box 611, and calculates coordinates of the designated reference point based on a result of detecting the operation of the cursor C. At this time, the calculated coordinates of the reference point (3D) are spatial coordinates (in units of mm) in the 3D object surface. The CPU 34c first calculates plane coordinates (in units of pixels) of the designated reference point, and then calculates the spatial coordinates (in units of mm) from the calculated plane coordinates.

The reference point (3D) designated by the user should be associated with the already designated reference point (measurement). In the present embodiment, the CPU 34c associates the reference point (3D) with the reference point (measurement) based on the order in which the user designates the reference point (measurement) and the order in which the reference point (3D) is designated. More specifically, the CPU 34c associates a point firstly designated among the reference points (measurement) with a point firstly designated among the reference points (3D), associates a point secondly designated among the reference points (measurement) with a point secondly designated among the reference points (3D), . . . , and associates a point n-thly designated among the reference points (measurement) with a point n-thly designated among the reference points (3D). The above-mentioned method is an example of the present invention, but the present invention is not limited to the example.

Figure 20C:
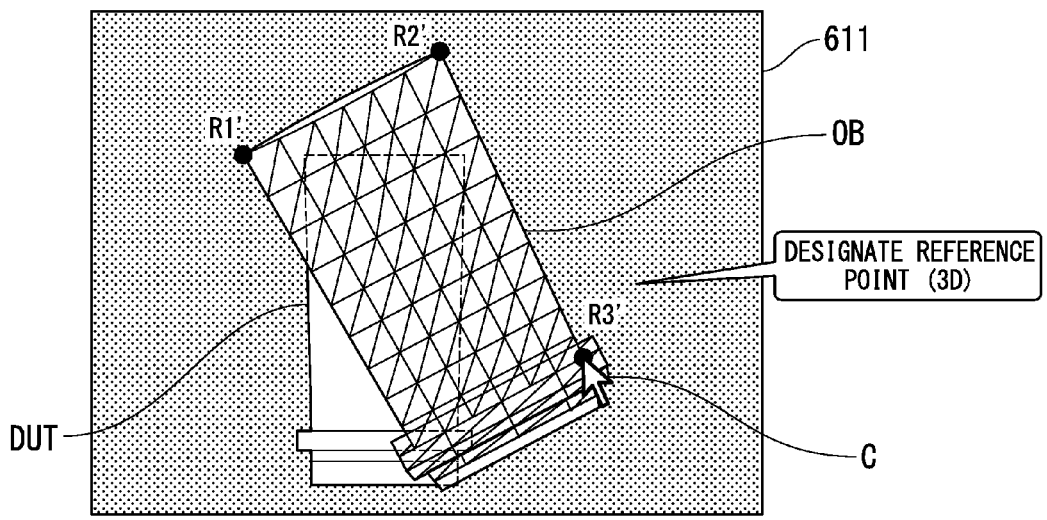
FIG. 20C is a reference diagram for describing the content of the reference point (3D) setting process according to the embodiment of the present invention.

As illustrated in FIG. 18C, the reference point (measurement) R1 on the upper left of the inspection object DUT, the reference point (measurement) R2 on the upper right thereof, and the reference point (measurement) R3 on the lower right are designated. After the designation of the reference points (measurement) ends, the user designates the reference points (3D) on the 3D object OB corresponding to the reference points (measurement) on the inspection object DUT in the same order as the reference points (measurement) are designated. As illustrated in FIG. 20C, reference points (3D) R1', R2', and R3' are designated at positions on the 3D object corresponding to the reference points (measurement) R1, R2, and R3 on the inspection object DUT.

In step SF6, the CPU 34c records coordinates of the designated reference points (3D) in the RAM 34a. In step SF7, the CPU 34c performs a process of allowing the designated reference points (3D) to be displayed on the 3D object in the superimposed manner. As a result, the reference points (3D) R1', R2', and R3' are displayed on the 3D object OB in the superimposed manner as illustrated in FIG. 20C.

When the process of step SF7 ends, the reference point (3D) setting process ends.

The CPU 34c may record coordinates of the designated reference points (3D) in CAD data or record coordinates of the designated reference points (3D) in another file associated with CAD data. Thus, when the same CAD data is read again in the step SC1, the process of the steps SF1 to SF5 may be omitted. Further, the reference point (3D) need not necessarily be designated in step SF, and the reference point (3D) may be recorded in CAD data in advance through the endoscope apparatus 3, the PC 6, or the like or may be recorded in another file associated with CAD data.

Figure 21:
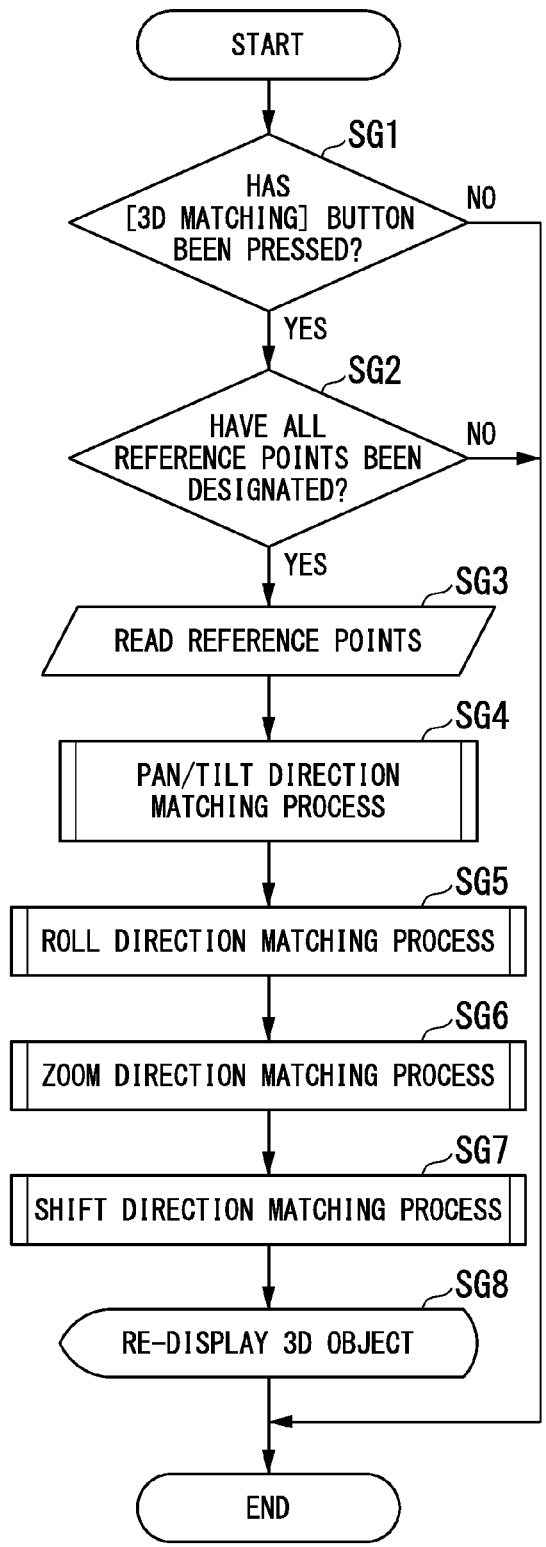
FIG. 21 is a flowchart illustrating a process of an operation performed by the 3D measurement software according to the embodiment of the present invention.

Next, the flow of the 3D-matching process of step SG will be described with reference to FIG. 21. In step SG1, the CPU 34c checks whether or not the [3D-Matching] button 664 has been pressed by the user. When the [3D-Matching] button 664 has been pressed, the process proceeds to step SG2. When the [3D-Matching] button 664 has not been pressed, the 3D-matching process ends.

In step SG2, the CPU 34c checks whether or not all reference points have been designated. Specifically, the CPU 34c checks whether or not three reference points (measurement) and three reference points (3D) have already been designated. When all reference points have been designated, the process proceeds to step SG3. When any one reference point has not been designated, the 3D-matching process ends. In step SG3, the CPU 34c reads coordinates of all reference points recorded in the RAM 34a.

In step SG4, the CPU 34c performs a pan/tilt direction-matching process based on the coordinates of the designated reference points. The details of the pan/tilt direction-matching process will be described later. In step SG5, the CPU 34c performs a roll direction-matching process based on the coordinates of the designated reference points. The details of the roll direction-matching process will be described later.

In step SG6, the CPU 34c performs a zoom direction-matching process based on the coordinates of the designated reference points. The details of the zoom direction-matching process will be described later.

In step SG7, the CPU 34c performs a shift direction-matching process based on the coordinates of the designated reference points. The details of the shift direction-matching process will be described later.

Figure 22:
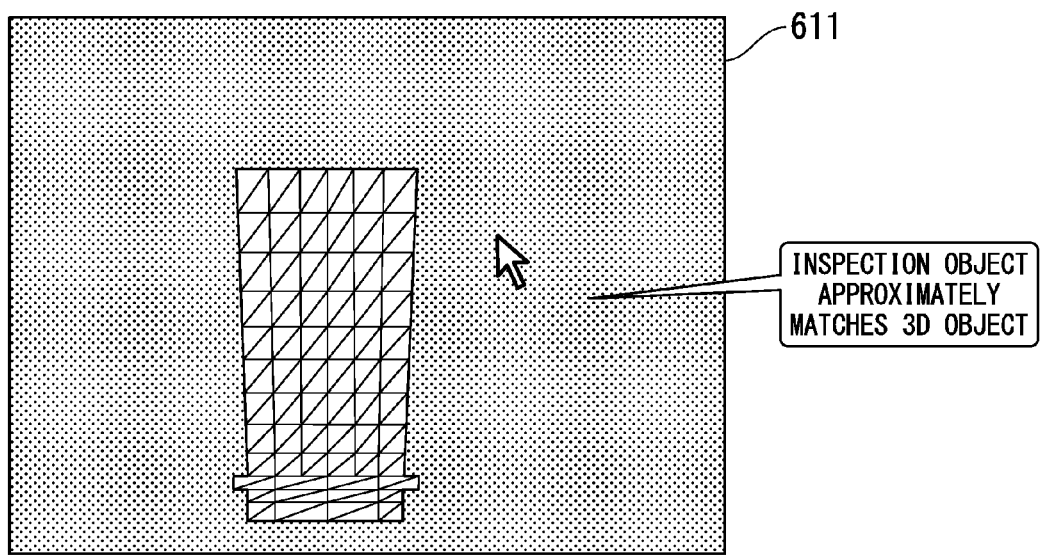
FIG. 22 is a reference diagram for describing content of a matching process according to the embodiment of the present invention.

In step SG8, the CPU 34c performs a process of re-displaying the 3D object in the [Image & 3D-Object] box 611. At this time, the pose and the position of the 3D object are adjusted based on the camera pose and the shift position finally calculated in steps SG4 to SG7, and then the 3D object is displayed. FIG. 22 illustrates an inspection object shown in a measurement image and a 3D object which have been subjected to the matching process. As illustrated in FIG. 22, it can be understood that the inspection object shown in the measurement image and the 3D object almost match, that is, match well. When the process of step SG8 ends, the 3D-matching process ends.

Figure 23:
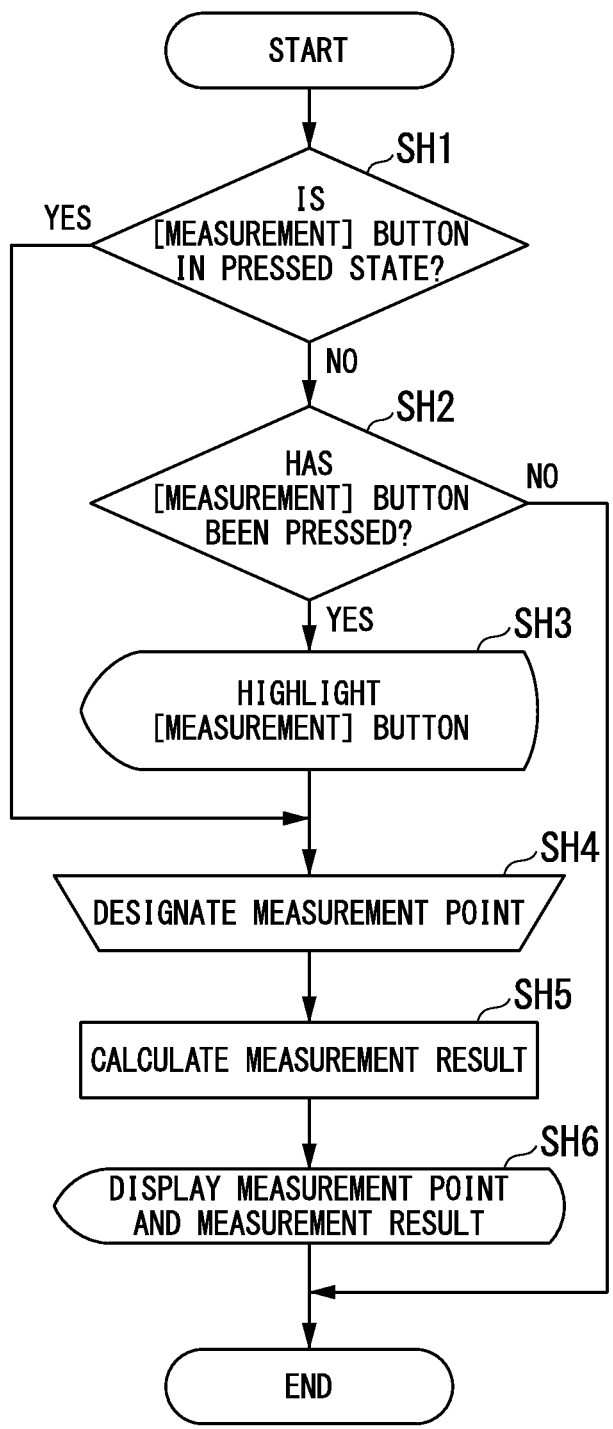
FIG. 23 is a flowchart illustrating a process of an operation performed by the 3D measurement software according to the embodiment of the present invention.

Next, the flow of the measurement process of step SH will be described with reference to FIG. 23. In step SH1, the CPU 34c checks whether or not the [Measurement] button 665a is in the already pressed state (the state in which step SH3 has already been performed). When the [Measurement] button 665a is in the pressed state, the process proceeds to step SH4. When the [Measurement] button 665a is not in the pressed state, the process proceeds to step SH2.

In step SH2, the CPU 34c checks whether or not the [Measurement] button 665a has been pressed by the user. When the [Measurement] button 665a has been pressed, the process proceeds to step SH3. When the [Measurement] button 665a has not been pressed, the measurement process ends.

Figure 24A:
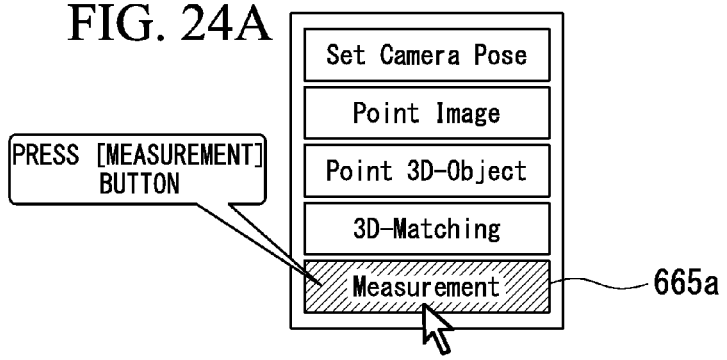
FIG. 24A is a reference diagram for describing content of a measurement process according to the embodiment of the present invention.

In step SH3, the CPU 34c performs a process of highlighting the [Measurement] button 665a as illustrated in FIG. 24A. The [Measurement] button 665a is highlighted to notify the user of the fact that a measurement point is currently capable of being designated to the 3D object.

In step SH4, the CPU 34c detects the user's operation of operating the remote controller 23 and clicking through the cursor C or the like in order to designate a measurement point to the 3D object in the [Image & 3D-Object] box 611, and calculates coordinates of the designated measurement point based on a result of detecting the operation of the cursor C. The CPU 34c records the calculated coordinates of the measurement point in the RAM 34a. At this time, the recorded coordinates of the measurement point are spatial coordinates (units of mm) in the 3D object surface.

In step SH5, the CPU 34c calculates a measurement result based on the coordinates of the designated measurement point, and records the calculated measurement result in the RAM 34a. In the present embodiment, a spatial distance (a distance between two points) between 2 measurement points is measured. The measurement result calculated in step SH5 is a spatial distance between two measurement points which are previously designated. When there is only one designated measurement point, the measurement result is not calculated, and the process proceeds to step SH6.

Figure 24B:
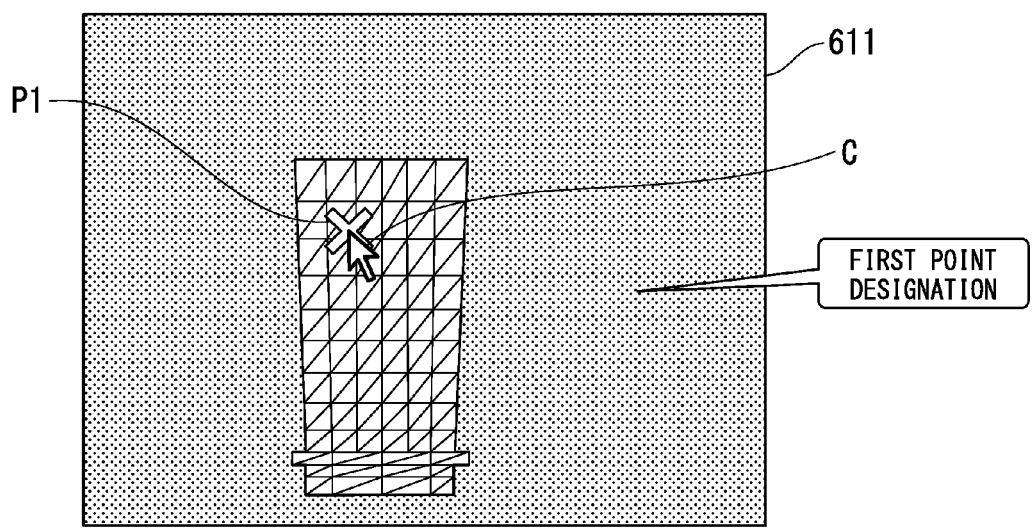
FIG. 24B is a reference diagram for describing the content of the measurement process according to the embodiment of the present invention.
Figure 24C:
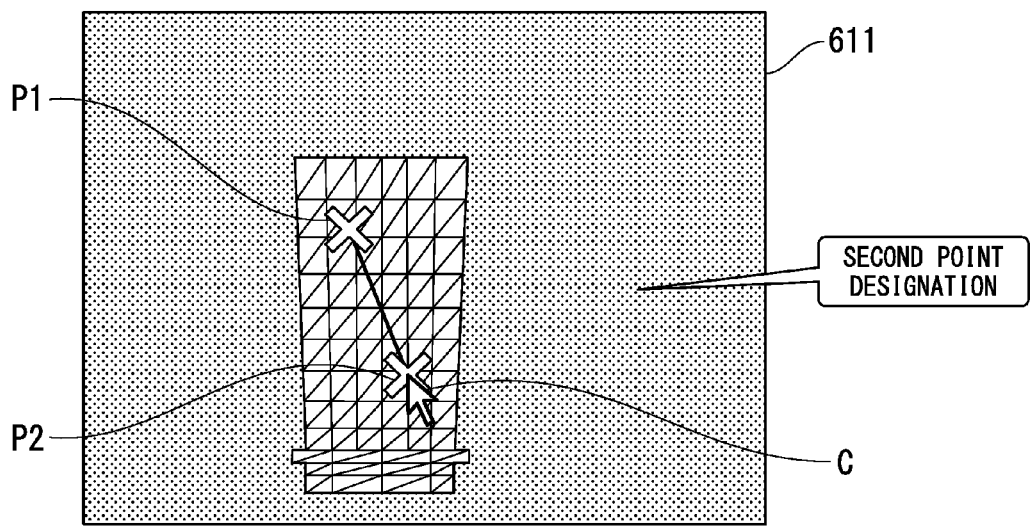
FIG. 24C is a reference diagram for describing the content of the measurement process according to the embodiment of the present invention.

In step SH6, the CPU 34c performs a process of causing the designated measurement point to be displayed on the 3D object in the superimposed manner as illustrated in FIGS. 24B and 24C. FIG. 24B illustrates the [Image & 3D-Object] box 611 when a first measurement point P1 is designated, and FIG. 24C illustrates the [Image & 3D-Object] box 611 when a second measurement point P2 is designated. Further, the CPU 34c performs a process of causing the calculated measurement result to be displayed on the [Measurement Result] box 670 as illustrated in FIG. 25. When there is only one measurement point, the measurement result is not displayed, and the process of step SH6 ends.

When the process of step SH6 ends, the measurement process ends. The above description has been made in connection with the example in which a distance between two points is measured, but the above process is similarly applied, for example, when an area in which three or more measurement points are designated is measured.

Figure 26:
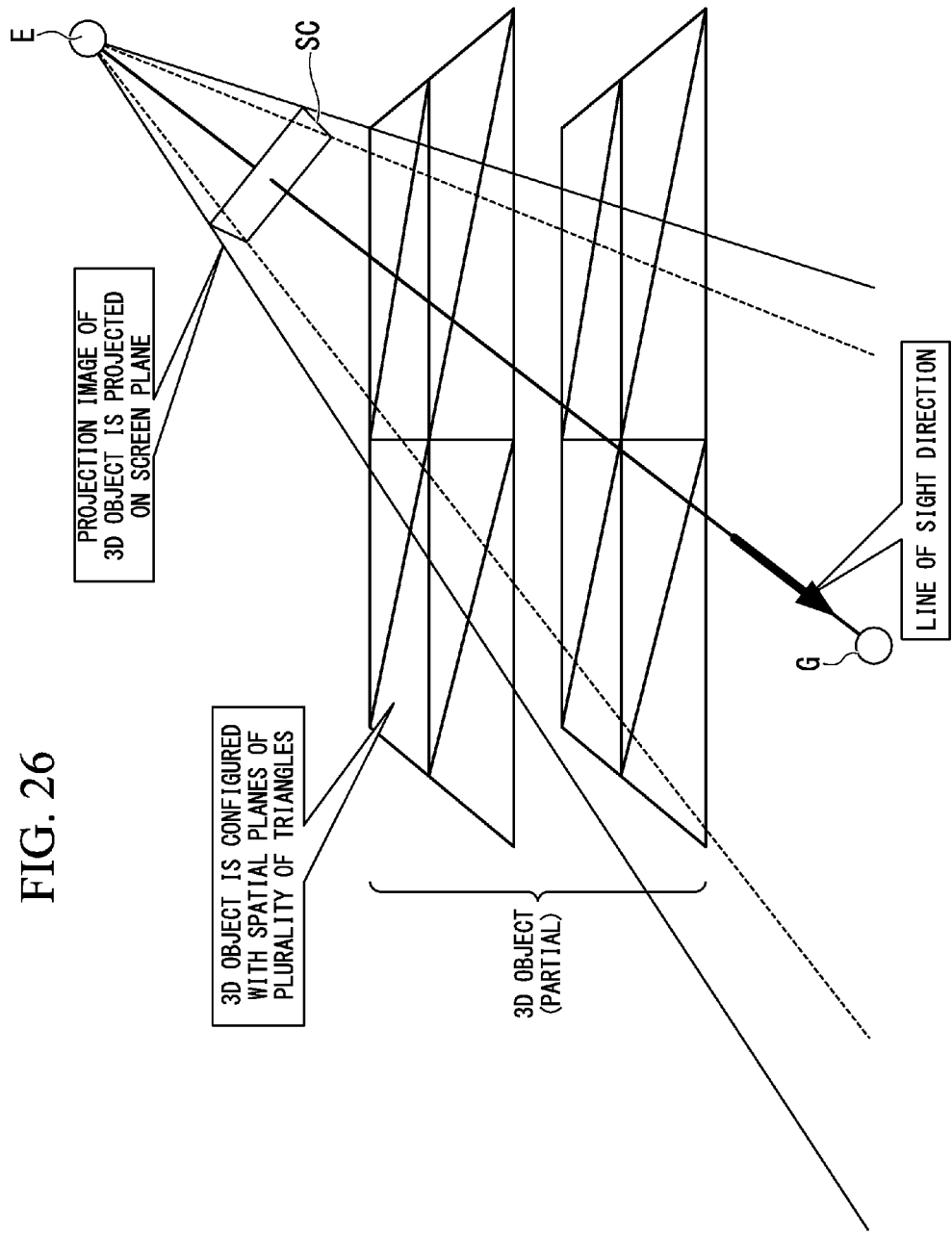
FIG. 26 is a reference diagram for describing a spatial coordinate calculation method according to the embodiment of the present invention.

Next, a method of calculating spatial coordinates (3D coordinates) of designated measurement points in the 3D object surface will be described with reference to FIGS. 26 to 29. FIG. 26 illustrates a relationship between a part of a 3D object and a viewpoint E in a 3D space.

The 3D object is configured with a plurality of triangular spatial planes. A direction which is directed from the viewpoint E toward a center of gravity point G of a 3D object is referred to as a direction of sightline. A screen plane SC crossing the direction of sightline at a right angle is set between the viewpoint E and the 3D object.

Figure 27:
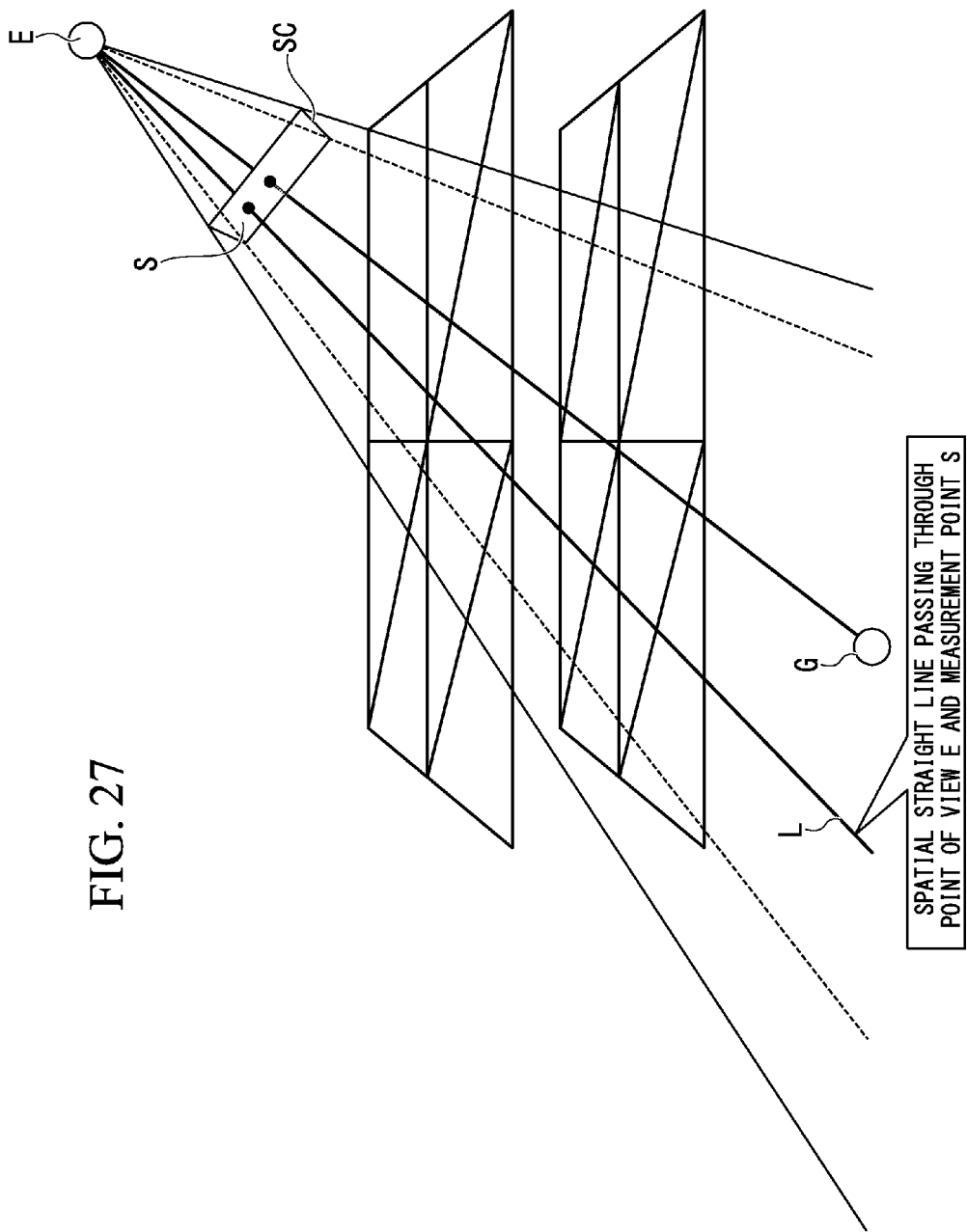
FIG. 27 is a reference diagram for describing the spatial coordinate calculation method according to the embodiment of the present invention.
Figure 28:
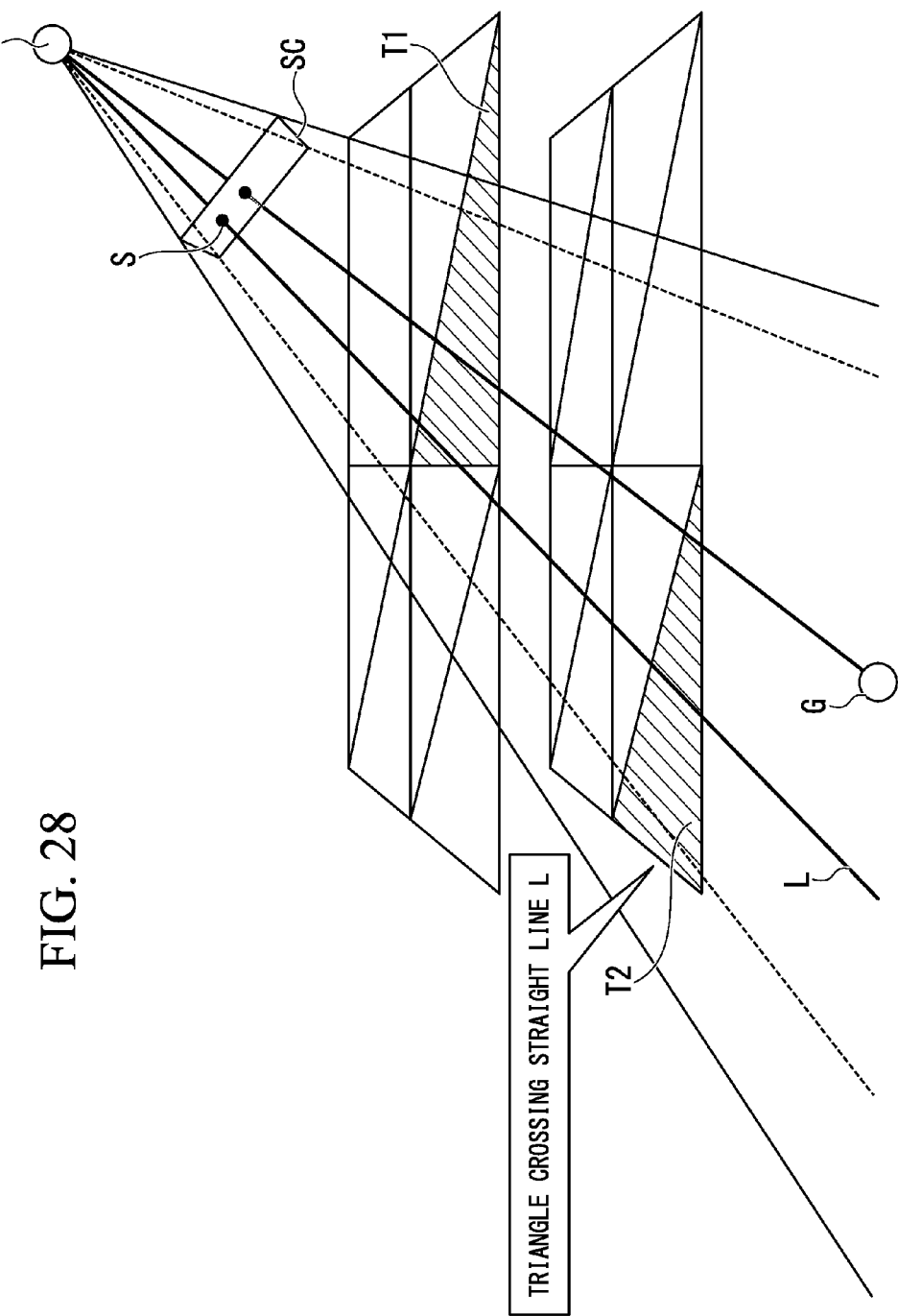
FIG. 28 is a reference diagram for describing the spatial coordinate calculation method according to the embodiment of the present invention.

When the user designates a measurement point on the 3D object in the [Image & 3D-Object] box 611, the CPU 34c designates a measurement point S on the screen plane SC as illustrated in FIG. 27. A spatial straight line passing through the measurement point S and the viewpoint E is referred to as a straight line L. Then, the CPU 34c searches for all triangles crossing the straight line L from among a plurality of triangles constituting the 3D object. As a method of determining whether or not the straight line crosses the spatial triangle, for example, an intersection determination algorithm by Tomas Moller may be used. In this example, triangles T1 and T2 are determined as triangles crossing the straight line L as illustrated in FIG. 28.

Figure 29:
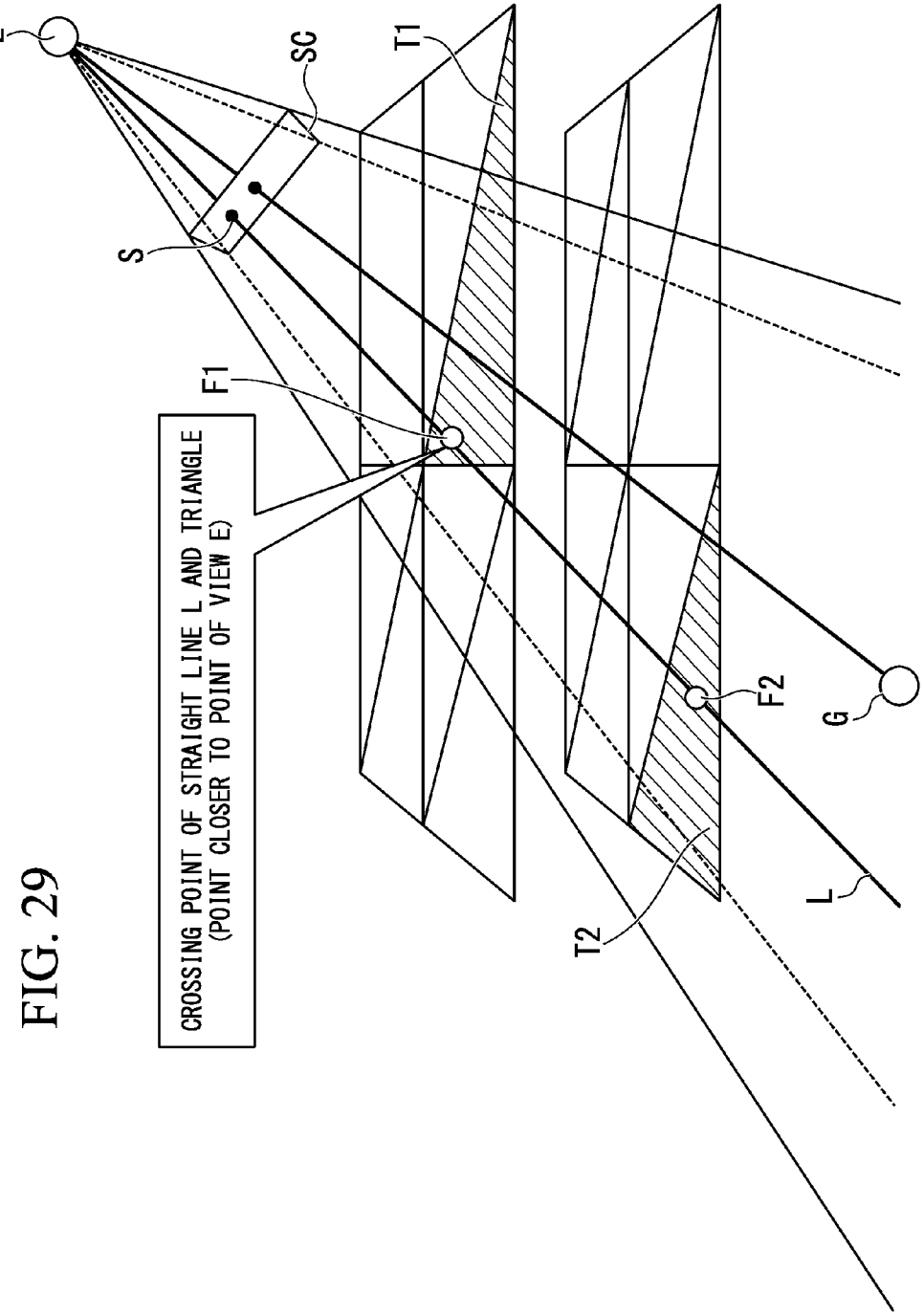
FIG. 29 is a reference diagram for describing the spatial coordinate calculation method according to the embodiment of the present invention.

Then, as illustrated in FIG. 29, the CPU 34c calculates crossing points of the straight line L and the triangles T1 and T2, and the calculated crossing points are referred to as crossing points F1 and F2, respectively. Here, since it is desired to calculate spatial coordinates in the 3D object surface, the CPU 34c selects one of the crossing points F1 and F2 which is closer to the viewpoint E. In this case, the CPU 34c calculates spatial coordinates of the crossing point F1 as spatial coordinates in the 3D object surface. In the above example, only two triangles are determined as crossing the straight line L, but more triangles may be determined as crossing depending on the shape of the 3D object or the line of sight direction. In this case, crossing points of the straight line L and the triangles are obtained, and one of the obtained crossing points which is closest to the viewpoint E is selected.

As described above, the spatial coordinates of the measurement point can be calculated. The spatial coordinates of the reference point (3D) in step SF5 can be calculated in a manner similar to the above-described method.

Figure 30:
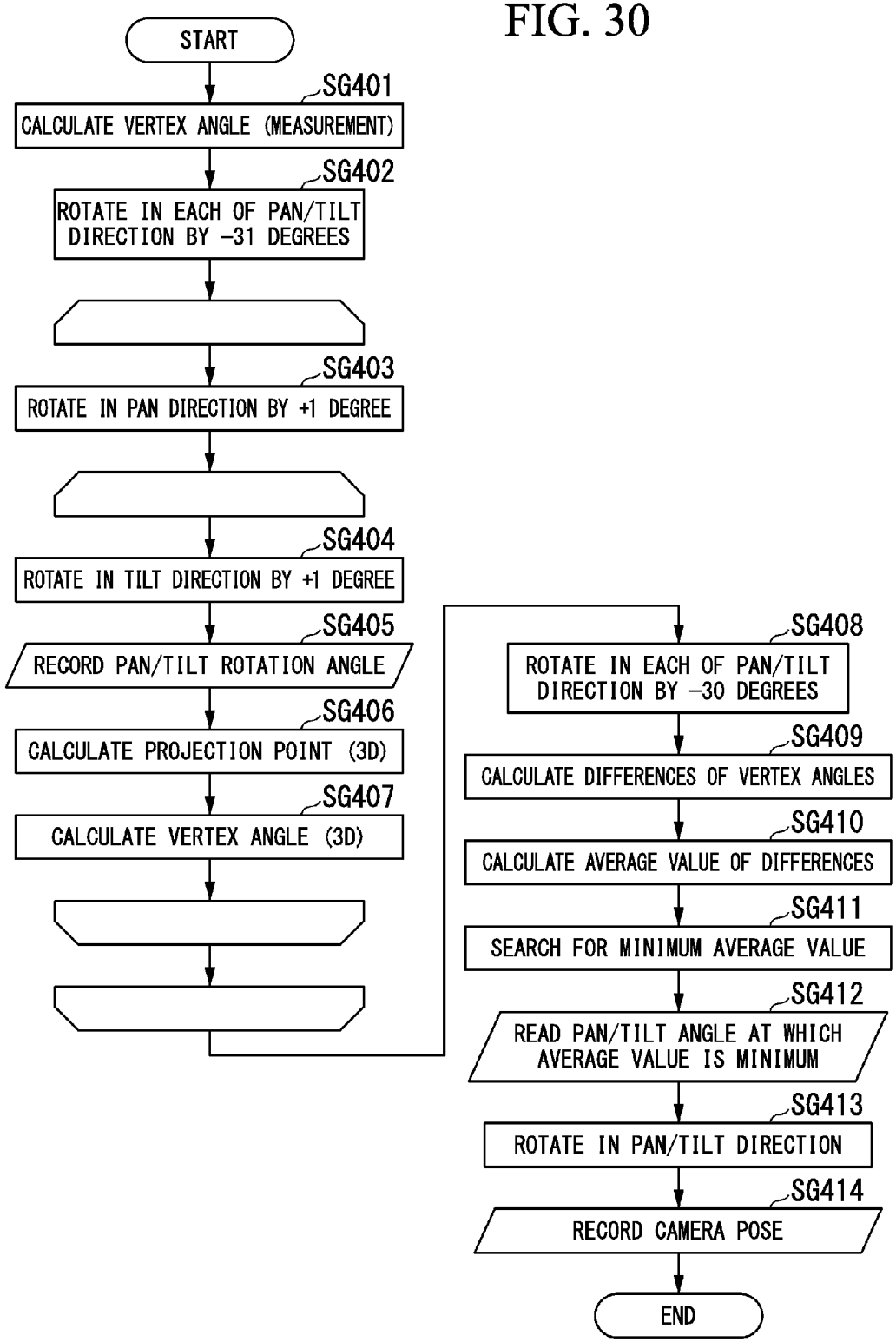
FIG. 30 is a flowchart illustrating a process of an operation performed by the 3D measurement software according to the embodiment of the present invention.

Next, the flow of the pan/tilt direction-matching process of step SG4 will be described with reference to FIG. 30. The purpose of the pan/tilt direction-matching process is to find a camera pose in which a triangle configured with the reference points (measurement) is most similar and closest to a triangle configured with projection points obtained by bringing the reference points (3D) down onto the screen plane. When the triangles are similar and close to each other, a pan/tilt direction of a line of sight when the inspection object shown in the measurement image is imaged almost matches a pan/tilt direction of a line of sight in which the 3D object is observed.

Figure 31A:
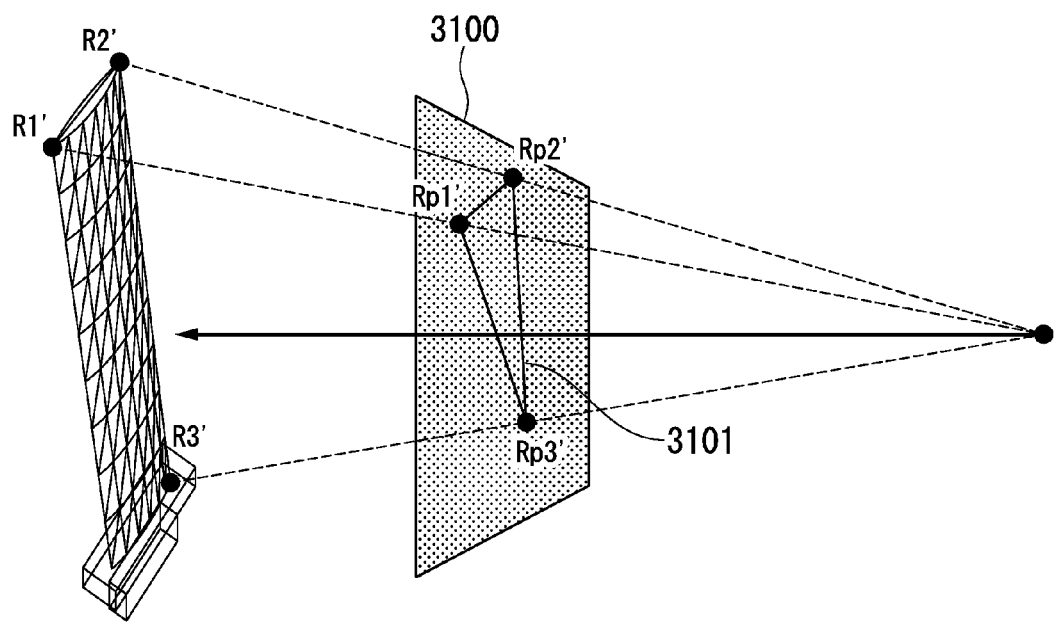
FIG. 31A is a reference diagram illustrating a reference point and a reference figure according to the embodiment of the present invention.
Figure 31B:
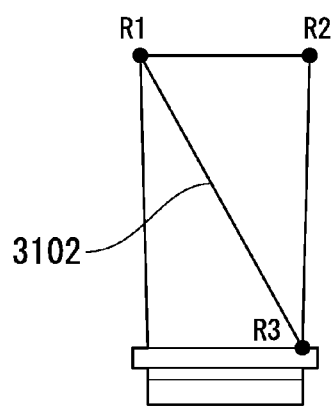
FIG. 31B is a reference diagram illustrating the reference point and the reference figure according to the embodiment of the present invention.

Hereinafter, projection points Rp1' to Rp3' obtained by bringing reference points (3D) R1' to R3' down onto a screen plane 3100 are referred to as projection points (3D) as illustrated in FIG. 31A. Further, a triangle 3102 configured with reference points (measurement) R1 to R3 is referred to as a reference figure (measurement) as illustrated in FIG. 31B, and a triangle 3101 configured with projection points (3D) Rp1' to Rp3' is referred to as a reference figure (3D) as illustrated in FIG. 31A.

Figure 32A:
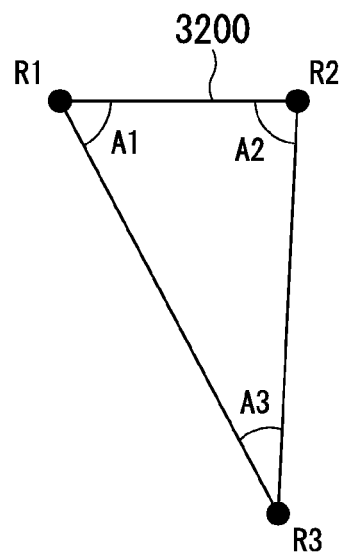
FIG. 32A is a reference diagram for describing content of a pan/tilt direction-matching process according to the embodiment of the present invention.

In step SG401, the CPU 34c calculates vertex angles (measurement), and records the calculated vertex angles (measurement) in the RAM 34a. The vertex angles (measurement) are angles A1 to A3 of three vertexes R1 to R3 of a reference figure (measurement) 3200 as illustrated in FIG. 32A.

Figure 32B:
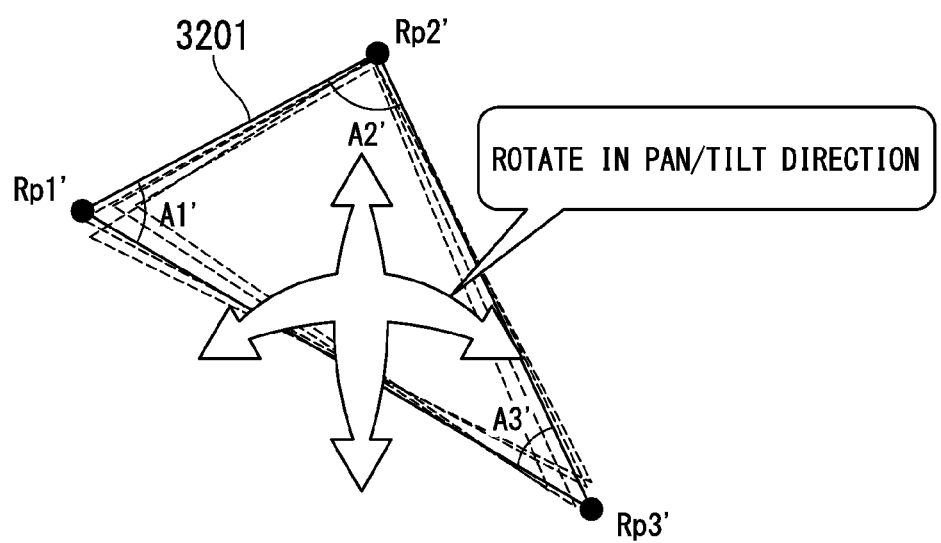
FIG. 32B is a reference diagram for describing the content of the pan/tilt direction-matching process according to the embodiment of the present invention.

In step SG402, the CPU 34c rotates the camera pose by −31 degrees in each of the pan/tilt direction. The repetitive process is performed in steps SG403 to SG407 to sequentially calculate vertex angles (3D) while rotating the camera pose in the pan/tilt direction as illustrated in FIG. 32B. The vertex angles (3D) are angles A1' to A3' of three projection points (3D) Rp1' to Rp3' of a reference figure (3D) 3201 as illustrated in FIG. 32B.

As described above, the reference points (measurement) and the reference points (3D) are associated with each other in the order in which the reference points are designated, and the angles A1 to A3 are also associated with the angles A1' to A3' in the order. In FIGS. 32A to 32D, the angle A1 is associated with the angle A1', the angle A2 is associated with the angle A2', and the angle A3 is associated with the angle A3'.

In step SG403, the CPU 34c rotates the camera pose by +1 degree in the pan direction. Then, in steps SG403 to SG407, the CPU 34c performs the repetitive process until the rotational angle of the camera pose in the pan direction becomes +30 degrees. Since the CPU 34c rotates the camera pose by +1 degree in the pan direction from −30 degrees to +30 degrees, a series of processes of steps SG403 to SG407 is consequently repeated 61 times.

In step SG404, the CPU 34c rotates the camera pose by +1 degree in the tilt direction. Then, in steps SG404 to SG407, the CPU 34c performs the repetitive process until the rotational angle of the camera pose in the tilt direction becomes +30 degrees. Since the CPU 34c rotates the camera pose by +1 degree in the tilt direction from −30 degrees to +30 degrees, a series of processes of steps SG404 to SG407 is consequently repeated 61 times. Further, in the repetitive process of steps SG403 to SG407, the camera pose is rotated from −30 degrees to +30 degrees, but the range in which the camera pose is rotated is not always necessarily to be limited to the range.

When the user changes the camera pose in the camera-pose-setting process of step SD, a range necessary to rotate the camera pose in the repetitive process of steps SG403 to SG407 changes according to a degree by which the inspection object shown in the measurement image and the 3D object match. When the range is large, although it is desirable for the user to perform rough matching, a processing time of 3D matching also increases. When the range is small, although a processing time of 3D matching is short, the user needs to perform matching in detail to some extent.

In step SG405, the CPU 34*c* records the current rotational angle in the pan/tilt direction in the RAM 34*a*. FIGS. 33A to 33C illustrate the rotational angle recorded in the RAM 34*a*. In step SG405, the CPU 34*c* does not record the rotational angle in the RAM 34*a* in the overwriting manner, but each time the camera pose is rotated in the pan/tilt direction, the current rotational angle in the pan/tilt direction is added in a data list prepared in the RAM 34*a* row-by-row as illustrated in FIG. 33A. As will be described later, various kinds of data such as the vertex angles (3D) can be recorded in the data list in association with the rotational angle in the pan/tilt direction.

In step SG406, the CPU 34*c* calculates projection points (3D), and records the calculated projection points (3D) in the RAM 34*a*. In step SG407, the CPU 34*c* calculates the vertex angles (3D), and records the calculated vertex angles (3D) in the RAM 34*a*. At this time, the CPU 34*c* adds and records the vertex angles (3D) in the data list row-by-row in association with the rotational angle in the pan/tilt direction as illustrated in FIG. 33B.

When the repetitive process of steps SG403 to SG407 ends, the process proceeds to step SG408. At this point in time, the data list is configured with data corresponding to 61×61 rows as illustrated in FIG. 33C. In step SG408, the CPU 34*c* rotates the camera pose in each of the pan/tilt direction by −30 degrees. When the repetitive process of steps SG403 to SG407 ends, the rotational angle in each of the pan/tilt direction is +30 degrees, and when rotation of −30 degrees is performed, the camera pose returns to the original state.

In step SG409, the CPU 34*c* calculates differences between the vertex angles (measurement) and the vertex angles (3D). Specifically, the CPU 34*c* calculates absolute values D1 to D3 of differences between the vertex angles (measurement) A1 to A3 and the vertex angles (3D) A1' to A3' as in Equations (1) to (3):

$$D1 = |A1 - A1'| \quad (1)$$

$$D2 = |A2 - A2'| \quad (2)$$

$$D3 = |A3 - A3'| \quad (3)$$

Figure 34A:
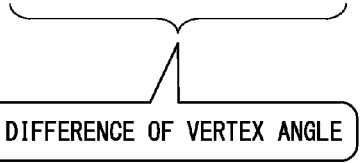
FIG. 34A is a reference diagram illustrating a data list according to the embodiment of the present invention.

Further, the CPU 34*c* adds and records the differences between the vertex angles in the data list in association with the rotational angle in the pan/tilt direction as illustrated in FIG. 34A.

Figure 34B:
FIG. 34B is a reference diagram illustrating the data list according to the embodiment of the present invention.

In step SG410, the CPU 34*c* calculates an average value of the differences D1 to D3. Further, the CPU 34*c* adds and records the average value in the data list in association with the rotational angle in the pan/tilt direction as illustrated in FIG. 34B.

In step SG411, the CPU 34*c* searches for a minimum average value from the data list. FIG. 35 illustrates an example in which 0.5 is searched as a minimum value in the data list.

In step SG412, the CPU 34*c* reads the rotational angle in the pan/tilt direction at which the average value is minimum from the data list. Specifically, the CPU 34*c* reads the rotational angle in the pan/tilt direction associated with the minimum average value from the data list as illustrated in FIG. 35.

In step SG413, the CPU 34*c* rotates the camera pose in the pan/tilt direction by the rotational angle read in step SG412.

Figure 32C:
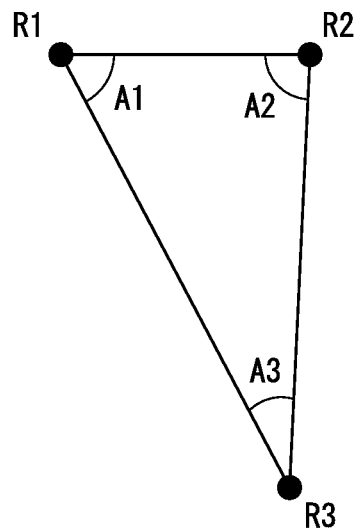
FIG. 32C is a reference diagram for describing the content of the pan/tilt direction-matching process according to the embodiment of the present invention.
Figure 32D:
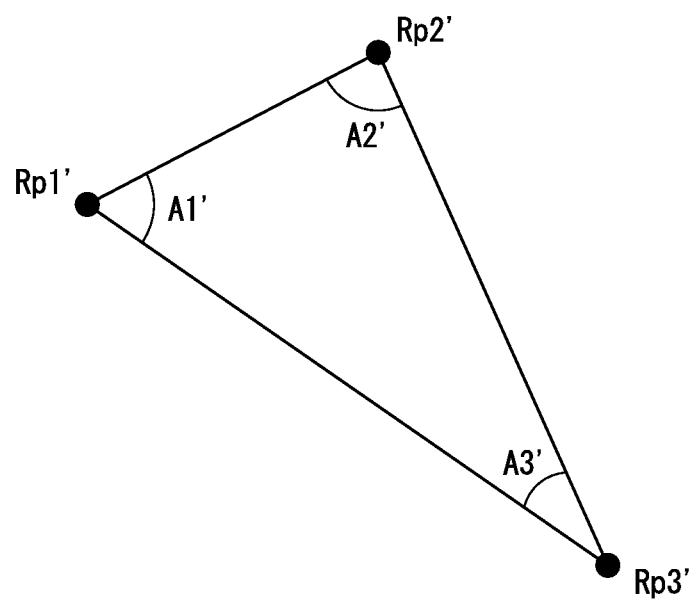
FIG. 32D is a reference diagram for describing the content of the pan/tilt direction-matching process according to the embodiment of the present invention.

When the 3D object is displayed with the camera pose, the vertex angle (measurement) matches the vertex angle (3D) well after the rotation as illustrated in FIGS. 32C and 32D, and thus the reference figure (measurement) is similar to the reference figure (3D).

In step SG414, the CPU 34*c* records the camera pose at the time in the RAM 34*a* in the overwriting manner as the current camera pose. Here, a re-display of the 3D object based on the current camera pose is not performed. When the process of step SG414 ends, the pan/tilt direction-matching process ends.

Figure 36:
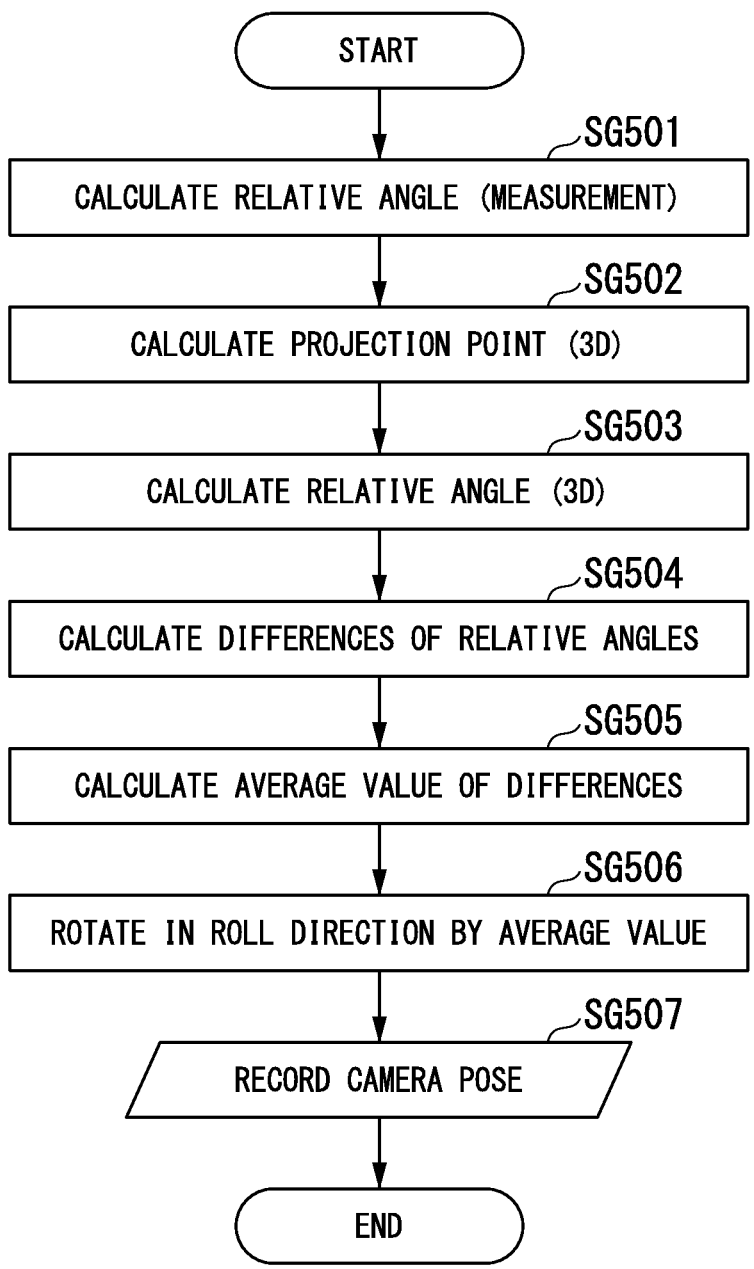
FIG. 36 is a flowchart illustrating a process of an operation performed by the 3D measurement software according to the embodiment of the present invention.

Next, the flow of the roll direction-matching process of step SG5 will be described with reference to FIG. 36. The purpose of the roll direction-matching process is to find a camera pose in which the reference figure (measurement) best matches the reference figure (3D) in the rotational direction angle. When the rotational direction angles of the reference figures are close to each other, a rotational angle of a line of sight in which the inspection object shown in the measurement image is observed in the roll direction approximately matches a rotational angle of a line of sight in which the 3D object is observed in the roll direction.

Figure 37A:
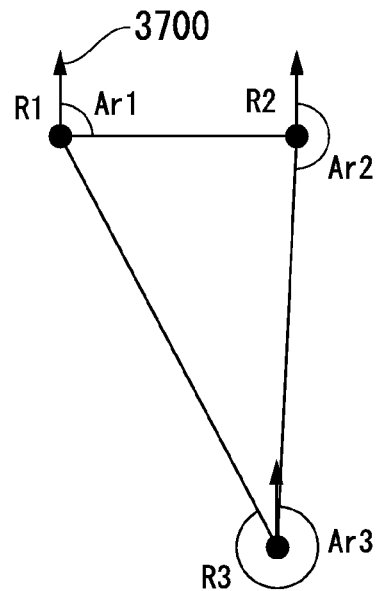
FIG. 37A is a reference diagram for describing content of a roll direction-matching process according to the embodiment of the present invention.

In step SG501, the CPU 34*c* calculates relative angles (measurement), and records the calculated relative angles (measurement) in the RAM 34*a*. The relative angles (measurement) are angles Ar1 to Ar3 between a straight line 3700 extending in the vertical direction in the measurement image and three sides of the reference figure (measurement) as illustrated in FIG. 37A. At this time, the relative angle (measurement) is an angle between the straight line 3700 and the side in the clockwise direction.

Figure 37B:
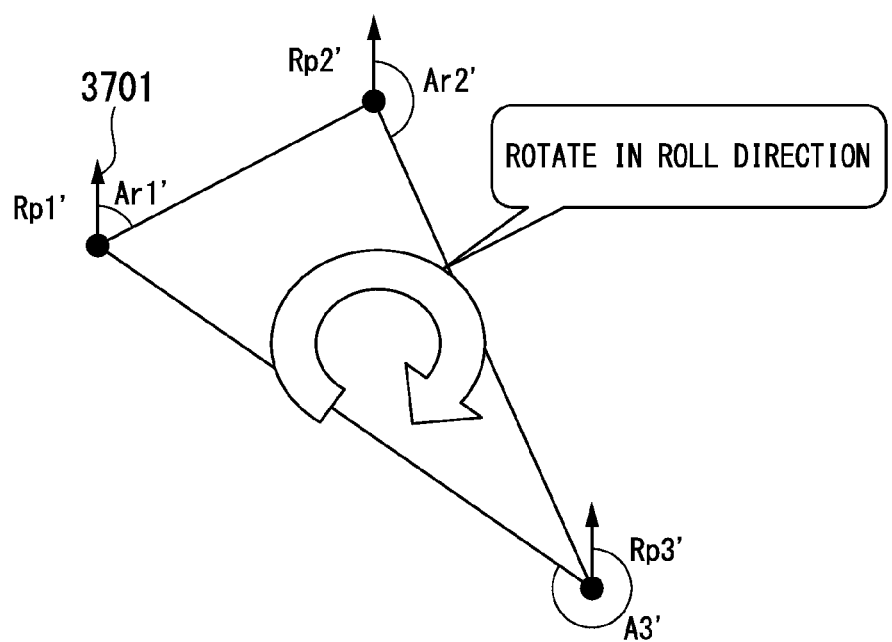
FIG. 37B is a reference diagram for describing the content of the roll direction-matching process according to the embodiment of the present invention.

In step SG502, the CPU 34*c* calculates projection points (3D), and records the calculated projection points (3D) in the RAM 34*a*. In step SG503, the CPU 34*c* calculates relative angles (3D), and records the calculated relative angles (3D) in the RAM 34*a*. The relative angles (3D) are angles Ar1' to Ar3' between a straight line 3701 extending in the vertical direction in the screen plane and three sides of the reference figure (3D) as illustrated in FIG. 37B. The screen plane corresponds to the [Image & 3D-Object] box 611 in which the measurement image is displayed, and thus the straight line 3700 is in a same direction with the straight line 3701. Further, at this time, the relative angle (3D) is an angle between the straight line 3701 and the side in the clockwise direction.

In step SG504, the CPU 34*c* calculates differences between the relative angles (measurement) and the relative angles (3D). Specifically, the CPU 34*c* calculates differences Dr1 to Dr3 between the relative angles (measurement) Ar1 to Ar3 and the relative angle (3D) Ar1' to Ar3' as in Equations (4) to (6):

$$Dr1 = Ar1 - Ar1' \quad (4)$$

$$Dr2 = Ar2 - Ar2' \quad (5)$$

$$Dr3 = Ar3 - Ar3' \quad (6)$$

Figure 37C:
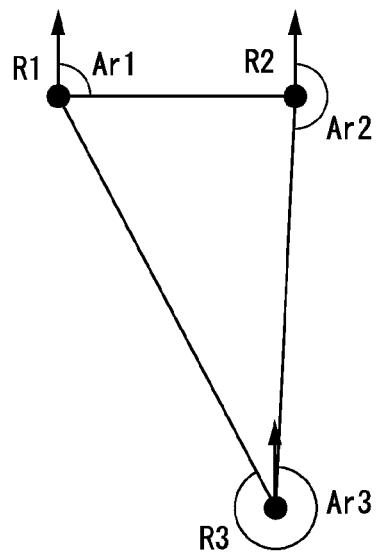
FIG. 37C is a reference diagram for describing the content of the roll direction-matching process according to the embodiment of the present invention.
Figure 37D:
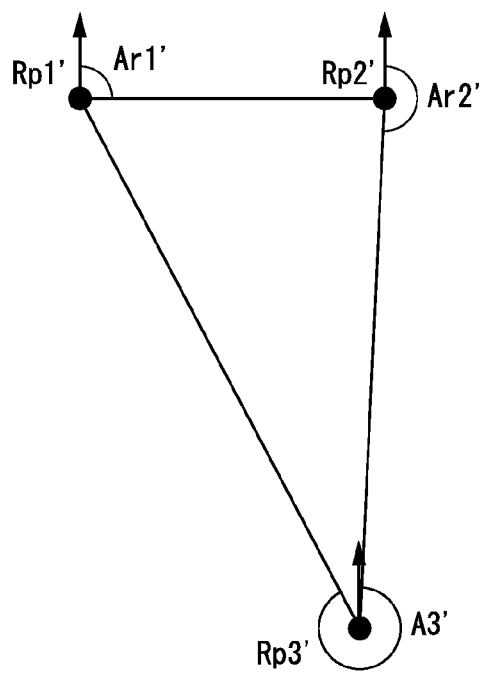
FIG. 37D is a reference diagram for describing the content of the roll direction-matching process according to the embodiment of the present invention.

In step SG505, the CPU 34*c* calculates an average value of the differences Dr1 to Dr3, and records the calculated average value in the RAM 34*a*. In step SG506, the CPU 34*c* rotates the camera pose in the roll direction by the average value calculated in step SG505. When the 3D object is displayed with the camera pose, the relative angle (measurement) matches the relative angle (3D) well after the rotation as illustrated in FIGS. 37C and 37D.

In step SG507, the CPU 34*c* records the camera pose at this time in the RAM 34*a* in the overwriting manner as the current camera pose. Here, a re-display of the 3D object based on the current camera pose is not performed. When the process of step SG507 ends, the roll direction-matching process ends.

Figure 38:
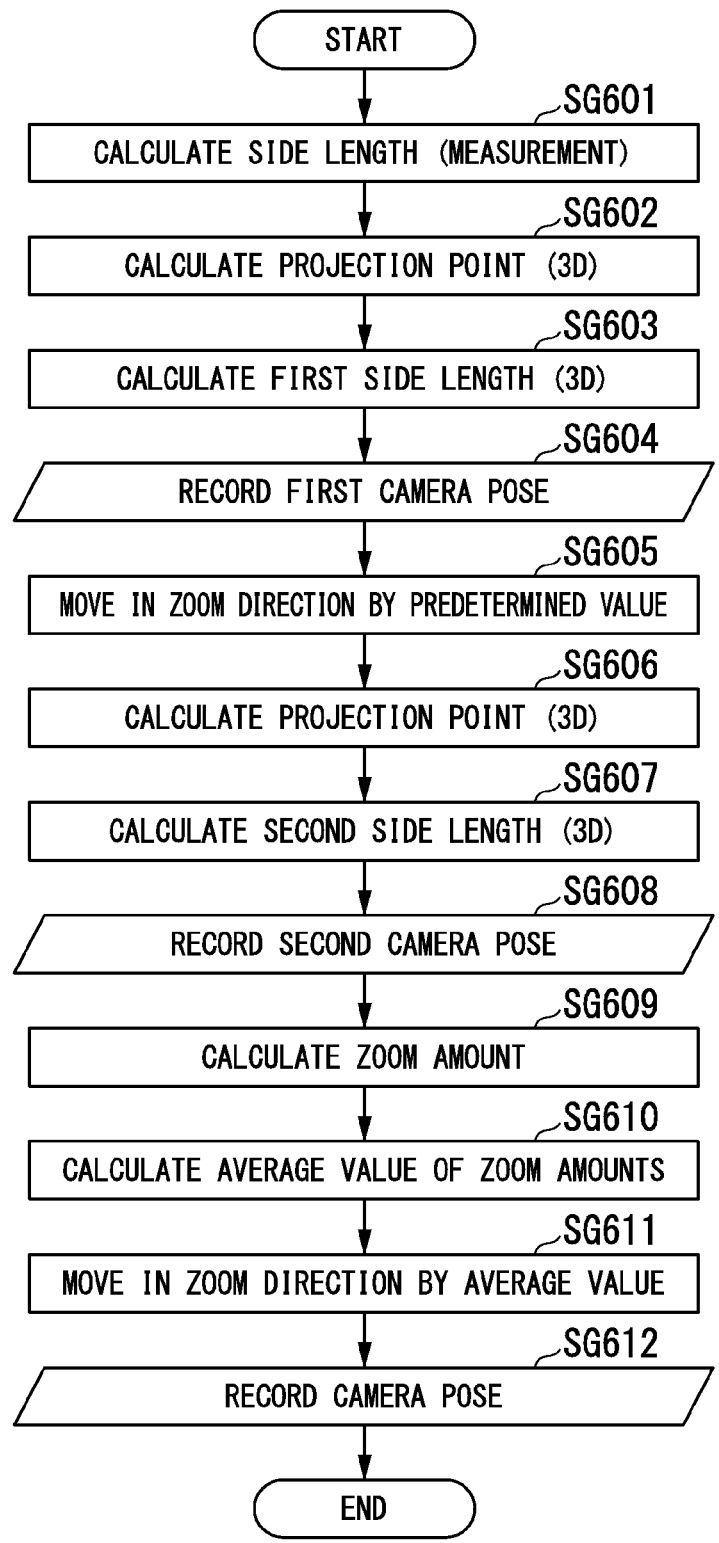
FIG. 38 is a flowchart illustrating a process of an operation performed by the 3D measurement software according to the embodiment of the present invention.

Next, the flow of the zoom direction-matching process of step SG6 will be described with reference to FIG. 38. The purpose of the zoom direction-matching process is to find a camera pose in which the size of the reference figure (measurement) best matches the size of the reference figure (3D). When the sizes of the reference figures are close to each other, a position of a sight-line in which the inspection object shown in the measurement image is observed in the zoom direction approximately matches a position of a sight-line in which the 3D object is observed in the zoom direction.

Figure 39A:
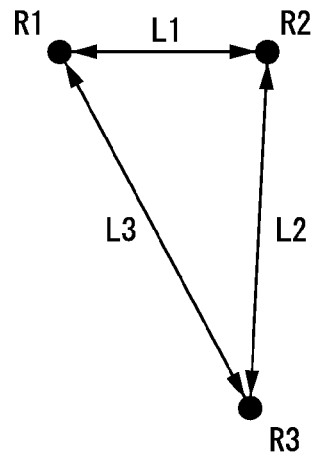
FIG. 39A is a reference diagram for describing content of a zoom direction-matching process according to the embodiment of the present invention.

In step SG601, the CPU 34*c* calculates side lengths (measurement), and records the calculated side lengths (measurement) in the RAM 34*a*. The side lengths (measurement) are lengths L1 to L3 of three sides of a triangle configured with the reference points (measurement) R1 to R3 as illustrated in FIG. 39A.

Figure 39B:
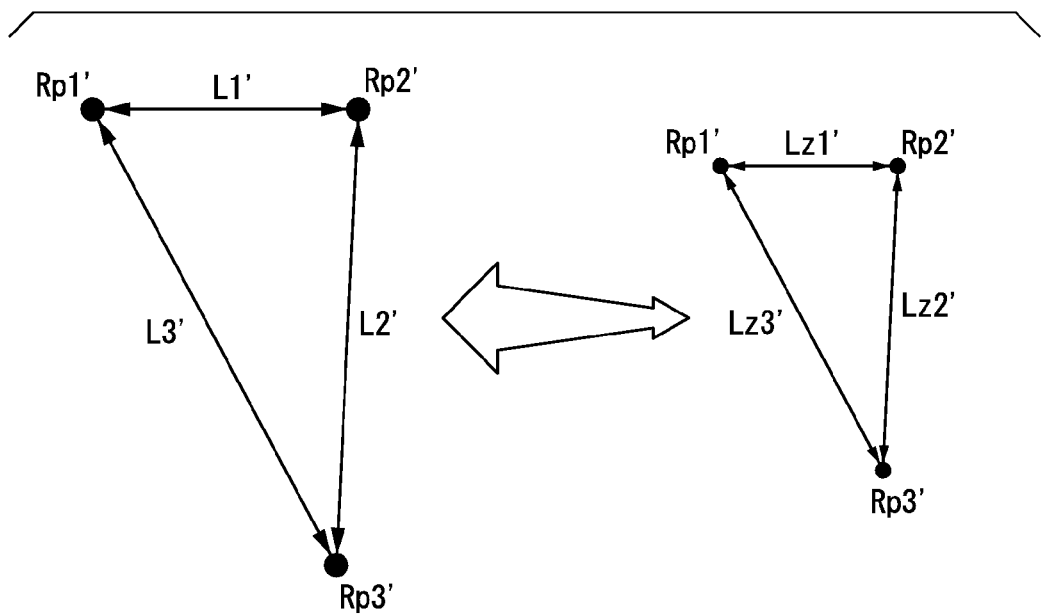
FIG. 39B is a reference diagram for describing the content of the zoom direction-matching process according to the embodiment of the present invention.

In step SG602, the CPU 34*c* calculates projection points (3D), and records the calculated projection points (3D) in the RAM 34*a*. In step SG603, the CPU 34*c* calculates first side lengths (3D), and records the calculated first side lengths (3D) in the RAM 34*a*. The first side lengths (3D) are lengths L1' to L3' of the three sides of the reference figure (3D) as illustrated in FIG. 39B.

In step SG604, the CPU 34*c* records a camera pose at this time in the RAM 34*a* in the overwriting manner as a first camera pose. In step SG605, the CPU 34*c* moves the camera pose in the zoom direction by a predetermined value as illustrated in FIG. 39B.

In step SG606, the CPU 34*c* calculates projection points (3D), and records the calculated projection points (3D) in the RAM 34*a*. In step SG607, the CPU 34*c* calculates second side lengths (3D), and records the calculated second side lengths (3D) in the RAM 34*a*. The second side lengths (3D) are lengths Lz1' to Lz3' of three sides of the reference figure (3D) after the camera pose is moved in the zoom direction by a predetermined value as illustrated in FIG. 39B. In step SG608, the CPU 34*c* records a camera pose at this time in the RAM 34*a* in the overwriting manner as a second camera pose.

In step SG609, the CPU 34*c* calculates a zoom amount, and records the calculated zoom amount in the RAM 34*a*. The zoom amount represents a movement distance of a camera pose in the zoom direction in which the side length (3D) matches the side length (measurement). The zoom amount is calculated based on a relationship between the first and second side lengths (3D) and the first and second camera poses. Since there are three sides, three zoom amounts are calculated.

FIG. 40 illustrates a relationship between the side length (3D) and the zoom direction position of the camera pose. As illustrated in a graph 4000 of FIG. 40, both are in a linearly proportional relationship. Using the graph 4000, when the side length (3D) matches the side length (measurement), the movement distance for moving the camera pose in the zoom direction is capable of being calculated.

Figure 39C:
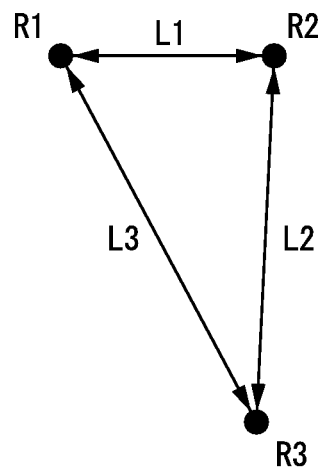
FIG. 39C is a reference diagram for describing the content of the zoom direction-matching process according to the embodiment of the present invention.
Figure 39D:
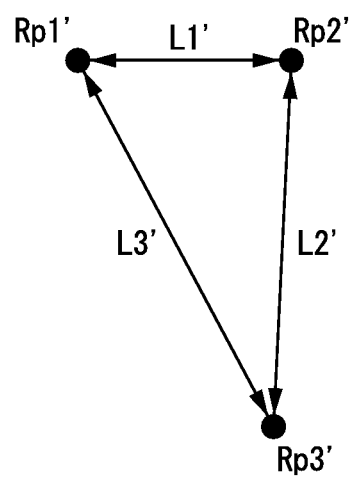
FIG. 39D is a reference diagram for describing the content of the zoom direction-matching process according to the embodiment of the present invention.

In step SG610, the CPU 34*c* calculates an average value of the three zoom amounts, and records the calculated average value in the RAM 34*a*. In step SG611, the CPU 34*c* moves the camera pose in the zoom direction by the average value calculated in step SG610. When the 3D object is displayed with this camera pose, the side length (measurement) matches the side length (3D) well after the movement as illustrated in FIGS. 39C and 39D.

In step SG612, the CPU 34*c* records a camera pose at this time in the RAM 34*a* in the overwriting manner as a current camera pose. Here, a re-display of the 3D object based on the current camera pose is not performed. When the process of step SG612 ends, the zoom direction-matching process ends.

Figure 41:
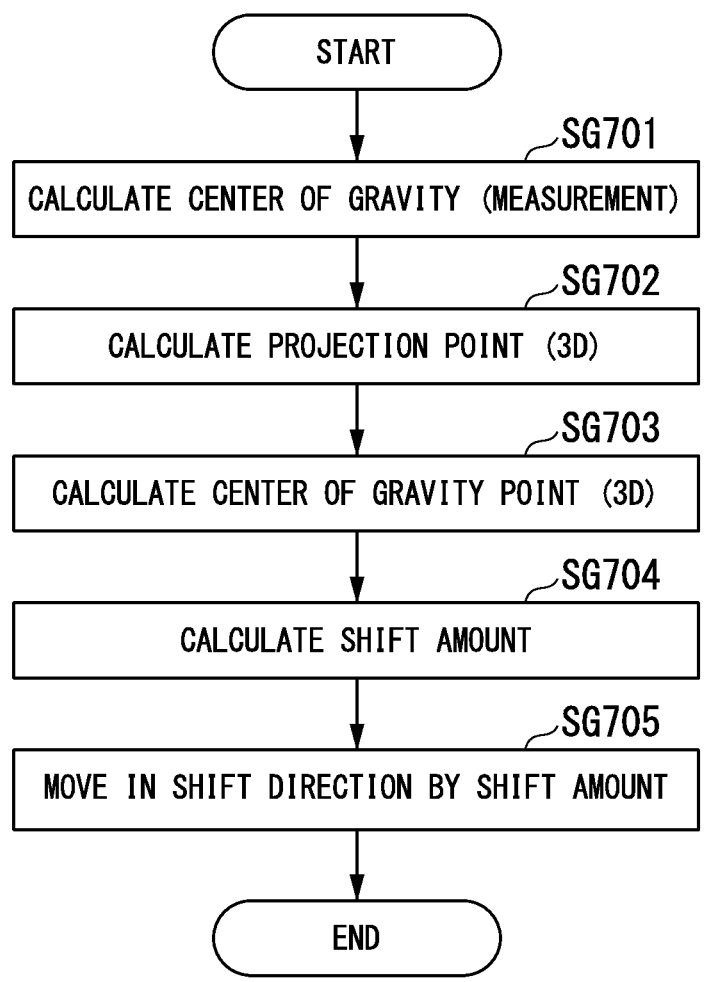
FIG. 41 is a flowchart illustrating a process of an operation performed by the 3D measurement software according to the embodiment of the present invention.

Next, the flow of the shift direction-matching process of step SG7 will be described with reference to FIG. 41. The purpose of the shift direction-matching process is to move the 3D object in the shift direction in the [Image & 3D-Object] box 611 so that the inspection object shown in the measurement image and the 3D object match. The present process is for determining the shift position of the 3D object, and thus a calculation of the camera pose is not performed.

Figure 42A:
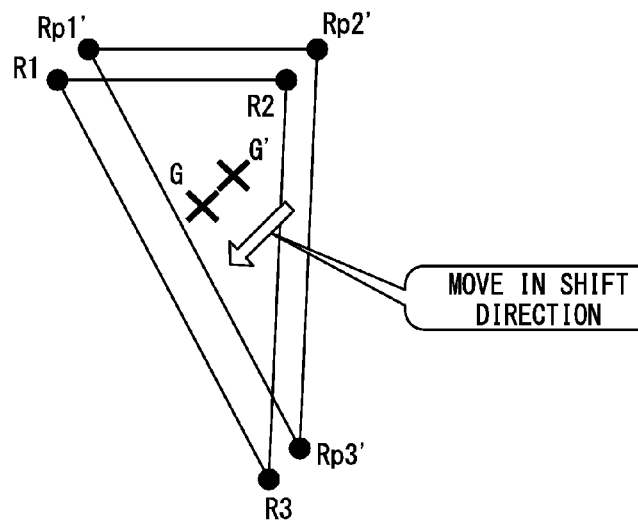
FIG. 42A is a reference diagram for describing content of a shift direction-matching process according to the embodiment of the present invention.

In step SG701, the CPU 34*c* calculates a center of gravity point (measurement), and records the calculated center of gravity point (measurement) in the RAM 34*a*. The center of gravity point (measurement) is a center of gravity point G of a triangle configured with reference points (measurement) R1 to R3 as illustrated in FIG. 42A.

In step SG702, the CPU 34*c* calculates projection points (3D), and records the calculated projection points (3D) in the RAM 34*a*. In step SG703, the CPU 34*c* calculates a center of gravity point (3D), and records the calculated center of gravity point (3D) in the RAM 34*a*. The center of gravity point (3D) is a center of gravity point G' of a triangle configured with projection points (3D) Rp1' to Rp3' as illustrated in FIG. 42A.

In step SG704, the CPU 34*c* calculates a shift amount, and records the calculated shift amount in the RAM 34*a*. The shift amount is a relative position (the plane coordinate system, in units of pixels) of the center of gravity point (measurement) relative to the center of gravity point (3D). In step SG705, the CPU 34*c* moves the 3D object in the shift direction only by the shift amount calculated in step SG704.

Figure 42B:
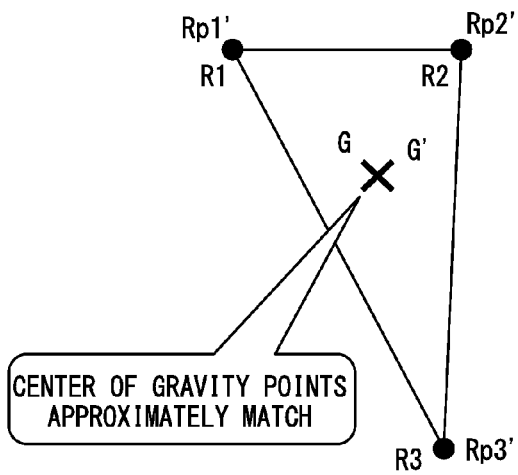
FIG. 42B is a reference diagram for describing the content of the shift direction-matching process according to the embodiment of the present invention.

When the 3D object is displayed with the camera pose, the center of gravity point (measurement) matches the center of gravity point (3D) well as illustrated in FIG. 42B. When the process of step SG705 ends, the shift direction-matching process ends.

In the present embodiment, when the 3D-matching process is executed, only a simple geometric calculation is needed to be performed based on a reference figure of a plain shape designated by the user, and thus processing time is capable of being significantly reduced. Further, a re-display of the 3D object may be performed only once after the 3D-matching process ends.

Next, a modified example of the present embodiment will be described. In the above description, the CPU 34*c* performs the 3D-matching process based on the three reference points, but in the present modified example, the CPU 34*c* performs the 3D-matching process based on four reference points. In the pan/tilt direction-matching process of step SG4, the CPU 34*c* calculates the rotational angle of the camera pose in the pan/tilt direction in which the reference figure (measurement) is most similar and closest to the reference figure (3D). However, even when a rotational angle in which only a pair of reference figures (triangles) are similar and closest to each other is calculated, the matching accuracy is not always necessarily to be high, and a clearly erroneous rotational angle may be calculated. Further, in the matching processes of steps SG5 to SG7, an erroneous rotational angle and an erroneous movement distance may be similarly calculated.

Figure 43A:
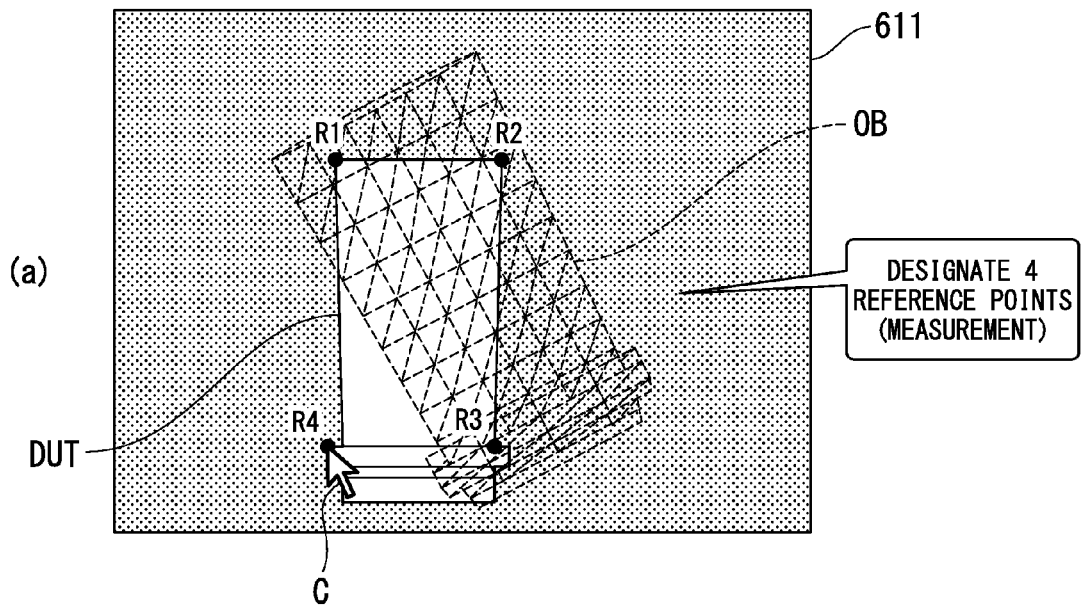
FIG. 43A is a reference diagram for describing a modified example of the embodiment of the present invention.
Figure 43B:
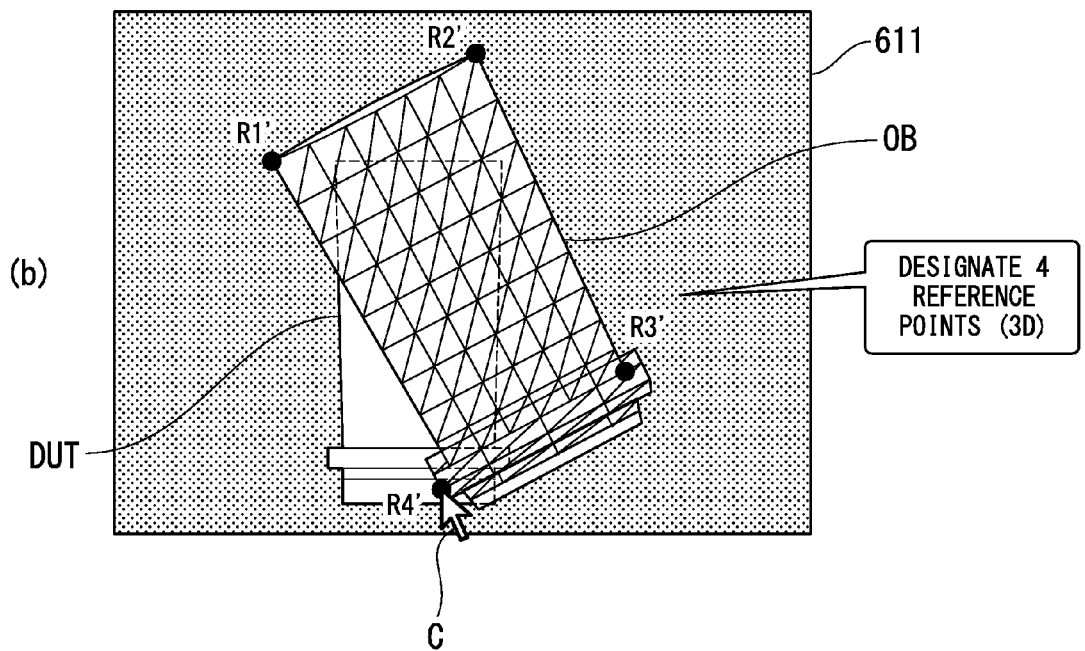
FIG. 43B is a reference diagram for describing the modified example of the embodiment of the present invention.

According to the present modified example, the matching accuracy of the 3D-matching process is improved. In the present modified example, in the reference point (measurement) setting process of step SE, the user designates four reference points (measurement) R1 to R4 as illustrated in FIG. 43A. Further, in the reference point (3D) setting process of step SF, the user designates four reference points (3D) R1' to R4' as illustrated in FIG. 43B. Further, in the present modified example, in the 3D-matching process of step SG, the CPU 34*c* calculates a reference figure based on the four reference points.

Figure 44:
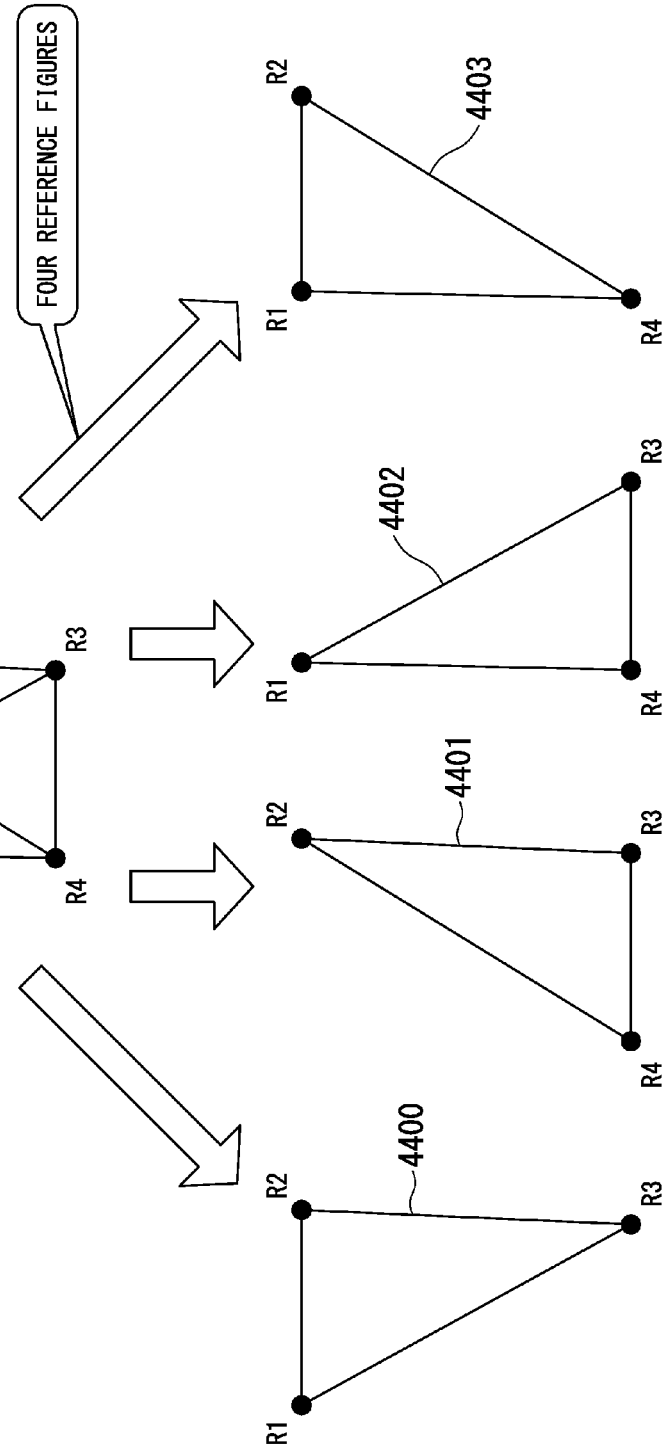
FIG. 44 is a reference diagram for describing another modified example of the embodiment of the present invention.
Figure 45:
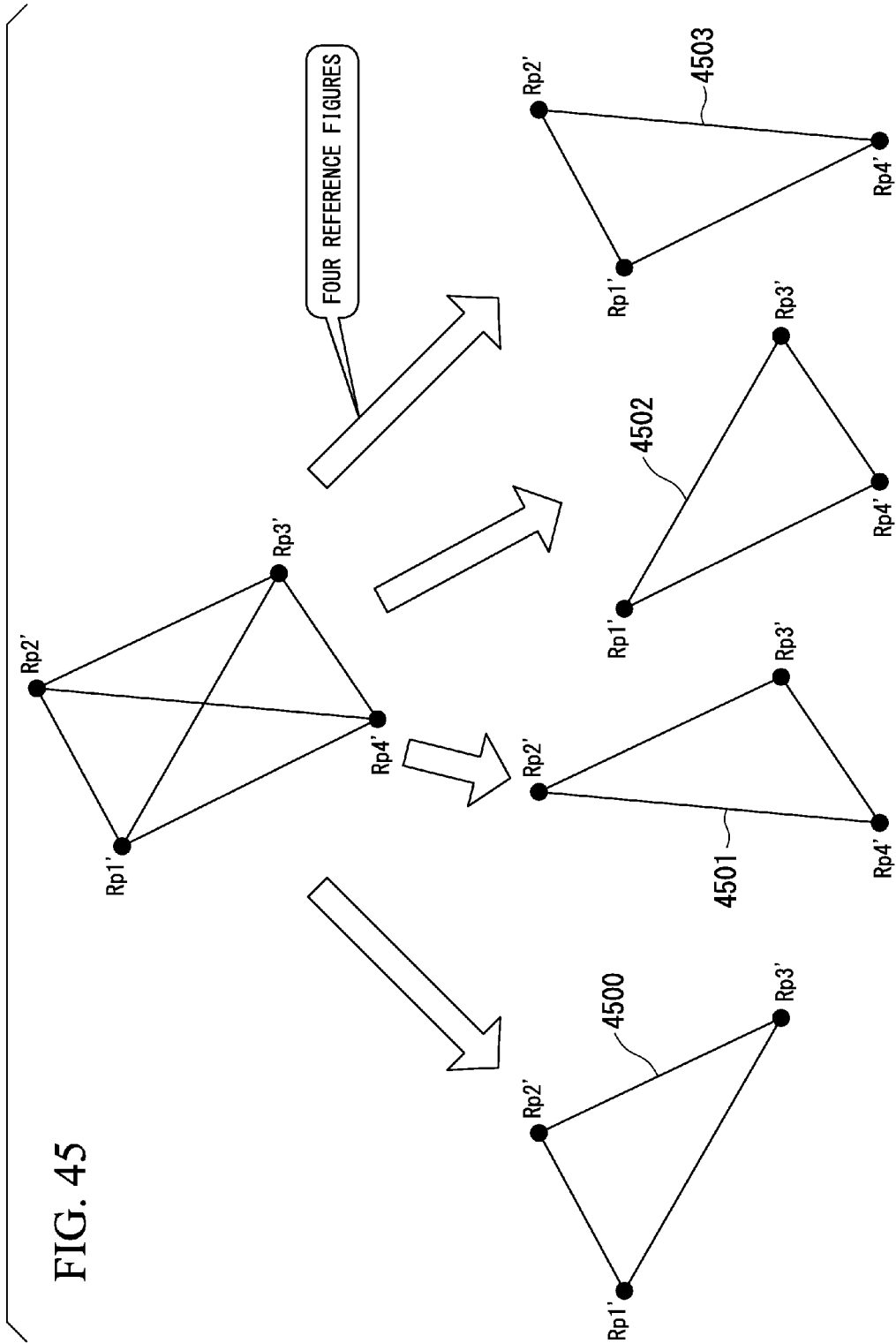
FIG. 45 is a reference diagram for describing another modified example of the embodiment of the present invention.

FIG. 44 illustrates the reference figure (measurement) calculated in step SG Four triangles 4400, 4401, 4402, and 4403 are configured with three points among the four reference points (measurement) R1 to R4 as the reference figures (measurement). FIG. 45 illustrates the reference figure (3D) calculated in step SG Four triangles 4500, 4501, 4502, and 4503 are configured with three points among the four reference points (3D) Rp1' to Rp4' as the reference figure (3D).

In the present modified example, in the 3D-matching process of step SG, the CPU 34*c* performs the 3D-matching process based on the four triangles. For example, in the pan/tilt direction-matching process of step SG4, the CPU 34*c* calculates the rotational angle of the camera pose in the pan/tilt direction. However, an average value of the rotational angles calculated based on each of the four triangles is finally used as the rotational angle. In the matching processes of steps SG5 to SG7, the CPU 34*c* uses an average value of the rotational angles and an average value of the movement distances calculated based on each of the four triangles as a final rotational angle and a final movement distance.

In the present modified example, as the user designates the four reference points, the CPU 34*c* performs the 3D-matching process based on the four reference figures configured with the reference points. Thus, the CPU 34*c* can use many parameters when performing the 3D-matching process. As a result, the matching accuracy can be improved.

Figure 46:
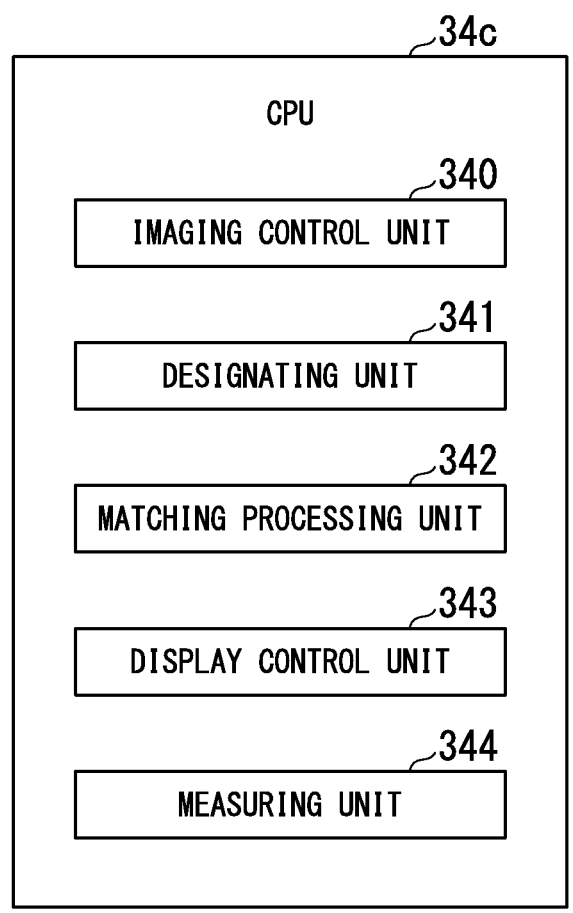
FIG. 46 is a block diagram illustrating a functional configuration of a CPU of a control computer equipped in the blade inspection system according to the embodiment of the present invention.

In the present embodiment, the measurement is performed such that the CPU 34*c* performs the above-described process according to the 3D measurement software which is the software (program) in which a procedure and content of a series of processes related to the measurement are specified. FIG. 46 illustrates functional configurations necessary for the CPU 34*c*. In FIG. 46, only functional components related to the measurement of the present embodiment are illustrated, and other functional configurations are omitted. The CPU 34*c* includes an imaging control unit 340, a designating unit 341, a matching processing unit 342, a display control unit 343, and a measuring unit 344 as functional components.

The imaging control unit 340 performs control of the light source 32 and the curvature control unit 33 or control of the imaging element 30*b*. The designating unit 341 designates (sets) a reference point (measurement), a reference point (3D), or a measurement point corresponding to a designated position on a measurement image or a 3D object image based on an instruction input through the remote controller 23 by the user. The matching processing unit 342 calculates the reference figure (measurement) and the reference figure (3D) based on the reference point (measurement) and the reference point (3D) designated through the designating unit 341, and calculates an amount of change in a camera pose necessary for matching through a geometric calculation of the reference figure (measurement) and the reference figure (3D).

The display control unit 343 controls, for example, content or a display status of an image to be displayed on the monitor 22. Particularly, the display control unit 343 causes the measurement image and the 3D object to be displayed in the matched state by adjusting the pose and the position of the 3D object based on the amount of change in the camera pose calculated through the matching processing unit 342. In the above description, the pose and the position of only the 3D object are adjusted, but the present invention is not limited to the example, and the pose and the position of only the measurement image may be adjusted, or the poses and the positions of both the measurement image and the 3D object may be adjusted. The measuring unit 344 performs the measurement process based on the measurement point designated through the designating unit 341. All or some of the functional components illustrated in FIG. 46 may be replaced with specific hardware configured such that an analog circuit or a digital circuit for implementing a function necessary for measurement is arranged.

As described above, according to the present embodiment, a geometric calculation of a reference figure (measurement) and a reference figure (3D) is performed, and a pose or a position of at least one of a measurement image and a 3D object is adjusted based on a result of the geometric calculation, and thus a processing time necessary for matching can be reduced.

Further, the reference points (measurement) are associated with the reference points (3D) based on the order in which the reference points (measurement) and the reference points (3D) are designated, and thus both can be associated by an easy method, and a processing time necessary for matching can be reduced.

Further, matching is performed by a geometric calculation of a reference figure (measurement) on a measurement image and a reference figure (3D) obtained such that a triangle configured with reference points (measurement) on a 3D object is projected onto a screen plane, and thus a processing time necessary for matching can be reduced while maintaining the matching accuracy.

Further, when the user designates the reference point (measurement), the transparency of the 3D object is set high, thus the user can clearly view the measurement image and easily designate the reference point (measurement).

Further, a re-display of a 3D object having a high processing load is performed when the 3D-matching process ends instead of being performed during the 3D-matching process, processing time necessary for matching can be reduced.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An image processing apparatus, comprising:
  a display unit configured to display an image of a measurement object and an image of an object which corresponds to the measurement object and has a 3-dimensional (3D) shape which is calculated in advance;
  a designating unit configured to designate first points on the image of the measurement object and second points on the image of the object having the 3D shape based on an instruction input through an input device, the first points including three or more points, and the second points including three or more points;
  a calculating unit configured to perform a calculation of a rotational angle by which an angle of view of at least one of the image of the measurement object and the image of the object having the 3D shape is to be adjusted to thereby adjust a pose or a position of said at last one of the image of the measurement object and the image of the object having the 3D shape, wherein the calculating unit performs the calculation of the rotational angle by performing a geometric calculation to achieve a minimum difference between (i) a first vertex angle included in a first figure formed by the first points designated on the image of the measurement object and (ii) a second vertex angle included in a second figure formed by the second points designated on the image of the object having the 3D shape, wherein the second vertex angle in the second figure corresponds to the first vertex angle in the first figure;

an adjusting unit configured to adjust the pose or the position of said at least one of the image of the measurement object and the image of the object having the 3D shape at least by adjusting the angle of view by the rotational angle that achieves the minimum difference between the first vertex angle and the second vertex angle, according to a result of the geometric calculation; and a measuring unit configured to calculate spatial coordinates on the object corresponding to a measurement position designated based on an instruction input through the input device after the pose or the position is adjusted, and to calculate a size of the measurement object based on the calculated spatial coordinates.

2. The image processing apparatus according to claim 1, wherein the calculating unit performs the geometric calculation such that the first points are associated with the second points based on an order in which the first points are designated and an order in which the second points are designated.

3. The image processing apparatus according to claim 1, wherein the designating unit further sets a transparency of the image of the object having the 3D shape such that when the first points are designated, the transparency of the image of the object having the 3D shape is set to be higher than the transparency of the image of the object having the 3D shape which is set when the second points are designated.

4. The image processing apparatus according to claim 1, wherein the display unit maintains poses and positions of the image of the measurement object and the image of the object having the 3D shape until the geometric calculation ends after displaying the image of the measurement object and the image of the object having the 3D shape, and re-displays the image of the measurement object and the image of the object having the 3D shape whose pose or position has been adjusted after the geometric calculation ends.

5. The image processing apparatus according to claim 1, wherein the calculating unit performs the calculation of the rotational angle by performing the geometric calculation to achieve a minimum average of the difference between the first vertex angle and the second vertex angle corresponding to the first vertex angle.

6. The image processing apparatus according to claim 1,
wherein the angle of view is rotated according to the calculated rotational angle in at least one of a pan direction and a tilt direction, and
wherein the pose or the position of said at least one of the image of the measurement object and the image of the object having the 3D shape is adjusted in accordance with the angle of view which is rotated in said at least one of the pan direction and the tilt direction according to the rotational angle.

7. The image processing apparatus according to claim 1,
wherein the calculating unit further performs a calculation of a second rotational angle by performing a geometric calculation to achieve a minimum difference between a first relative angle and a second relative angle corresponding to the first relative angle,
wherein the first relative angle is an angle formed by the first figure with respect to a predetermined direction and the second relative angle is an angle formed by the second figure with respect to the predetermined direction,
wherein the angle of view is rotated according to the calculated second rotational angle in a roll direction, and
wherein the pose or the position of said at least one of the image of the measurement object and the image of the object having the 3D shape is adjusted in accordance with the angle of view which is rotated in the roll direction.

8. An image processing method, comprising:
displaying, on a display, an image of a measurement object and an image of an object which corresponds to the measurement object and has a 3-dimensional (3D) shape which is calculated in advance;
designating first points on the image of the measurement object and second points on the image of the object having the 3D shape based on an instruction input through an input device, the first points including three or more points, and the second points including three or more points;
performing a calculation of a rotational angle by which an angle of view of at least one of the image of the measurement object and the image of the object having the 3D shape is to be adjusted to thereby adjust a pose or a position of said at last one of the image of the measurement object and the image of the object having the 3D shape, wherein the calculation of the rotational angle is performed by performing a geometric calculation to achieve a minimum difference between (i) a first vertex angle included in a first figure formed by the first points designated on the image of the measurement object and (ii) a second vertex angle included in a second figure formed by the second points designated on the image of the object having the 3D shape, wherein the second vertex angle in the second figure corresponds to the first vertex angle in the first figure;
adjusting the pose or the position of said at least one of the image of the measurement object and the image of the object at least by adjusting the angle of view by the rotational angle that achieves the minimum difference between the first vertex angle and the second vertex angle, according to a result of the geometric calculation; and
calculating spatial coordinates on the object corresponding to a measurement position designated based on an instruction input through the input device after the pose or the position is adjusted, and calculating a size of the measurement object based on the calculated spatial coordinates.

* * * * *